United States Patent [19]

Bouchard et al.

[11] Patent Number: 5,333,296
[45] Date of Patent: Jul. 26, 1994

[54] COMBINED QUEUE FOR INVALIDATES AND RETURN DATA IN MULTIPROCESSOR SYSTEM

[75] Inventors: Gregg Bouchard, Clinton; Lawrence Chisvin, Sudbury, both of Mass.

[73] Assignee: Digital Equipment Corporation, Maynard, Mass.

[21] Appl. No.: 103,816

[22] Filed: Aug. 9, 1993

Related U.S. Application Data

[63] Continuation of Ser. No. 547,850, Jun. 29, 1990, abandoned.

[51] Int. Cl.⁵ .................... G06F 12/00; G06F 13/00
[52] U.S. Cl. .................... 395/425; 364/DIG. 1; 364/247.7.239.8; 364/243.41; 364/254.5
[58] Field of Search ............. 395/425, 400; 364/200 MS File, 400 MS File, 247.7, 243.44, 254.5, 246.2

[56] References Cited

U.S. PATENT DOCUMENTS

| | | | |
|---|---|---|---|
| 4,543,626 | 9/1985 | Bean et al. | 395/200 |
| 4,600,986 | 7/1986 | Scheuneman et al. | 395/425 |
| 4,674,032 | 6/1987 | Michaelson | 395/425 |
| 4,855,904 | 8/1989 | Daberkow et al. | 395/375 |
| 4,949,301 | 8/1990 | Joshi et al. | 395/425 |
| 4,995,401 | 2/1991 | Hetherington et al. | 371/40.1 |
| 5,019,965 | 5/1991 | Webb, Jr. et al. | 395/550 |
| 5,023,828 | 6/1991 | Grundmann et al. | 395/375 |
| 5,058,006 | 10/1991 | Durdan et al. | 395/325 |
| 5,101,486 | 3/1992 | Okamoto | 395/400 |
| 5,107,457 | 4/1992 | Hayes et al. | 395/800 |
| 5,109,495 | 4/1992 | Fite et al. | 395/375 |
| 5,133,062 | 7/1992 | Joshi et al. | 395/425 |

*Primary Examiner*—Joseph L. Dixon
*Assistant Examiner*—Frank J. Asta
*Attorney, Agent, or Firm*—Arnold, White & Durkee

[57] ABSTRACT

A pipelined CPU executing instructions of variable length, and referencing memory using various data widths. Macroninstruction pipelining is employed (instead of microinstruction pipelining), with queuing between units of the CPU to allow flexibility in instruction execution times. A wide bandwidth is available for memory access; fetching 64-bit data blocks on each cycle. A hierarchical cache arrangement is used, increasing the likelihood of a cache hit. A writeback cache is used (instead of writethrough) and writeback is allowed to proceed even though other accesses are suppressed due to queues being full. Separate queues are provided for the return data from memory and cache invalidates, yet the order or bus transactions is maintained by a pointer arrangement. The bus protocol used by the CPU to communicate with the system bus is of the pended type, with transactions on the bus identified by an ID field specifying the originator, and arbitration for bus grant goes one simultaneously with address-/data transactions on the bus.

20 Claims, 18 Drawing Sheets

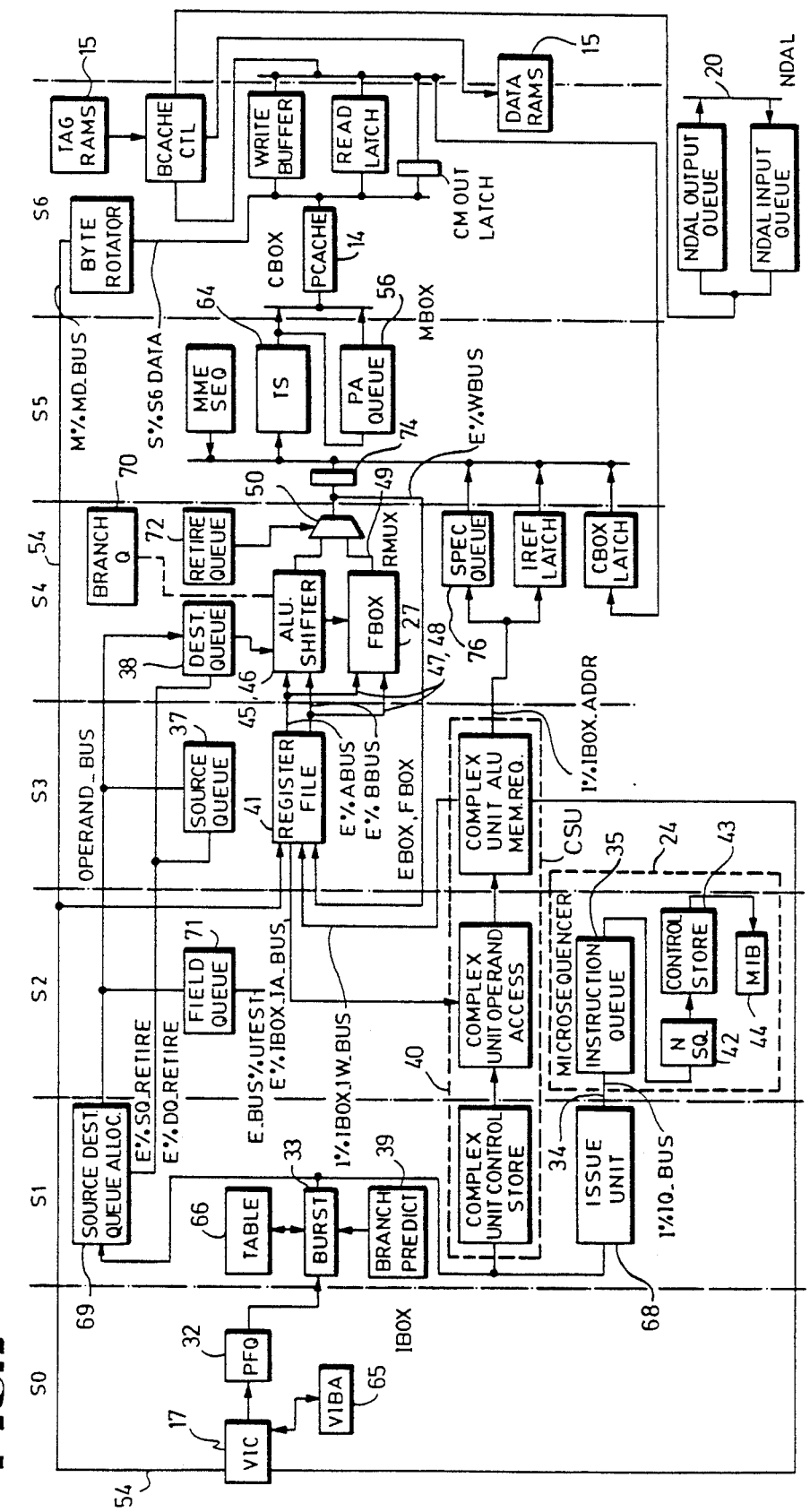

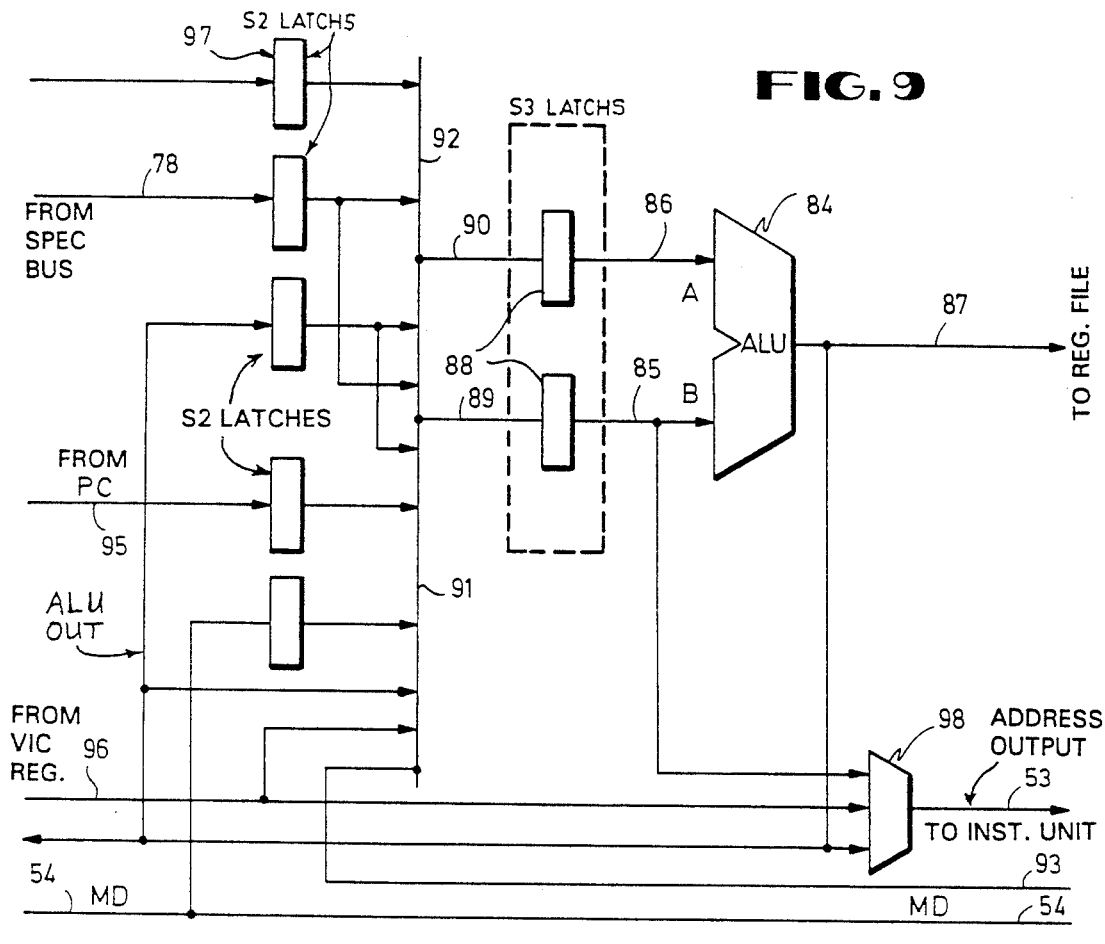
FIG.9
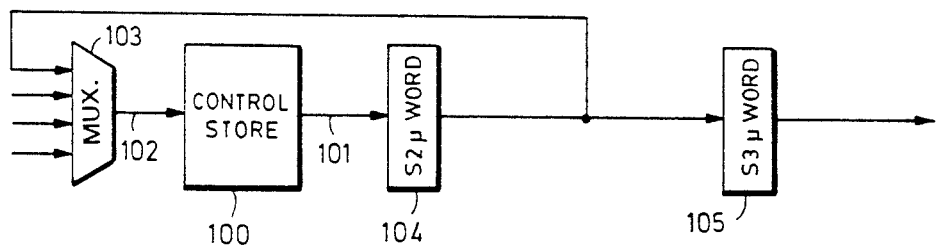
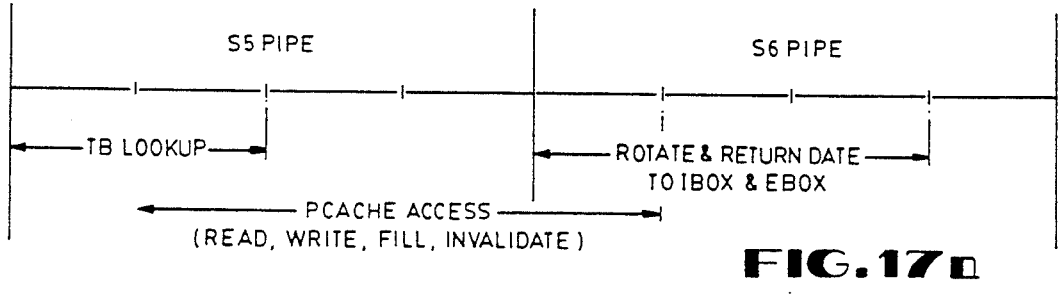
FIG.17a

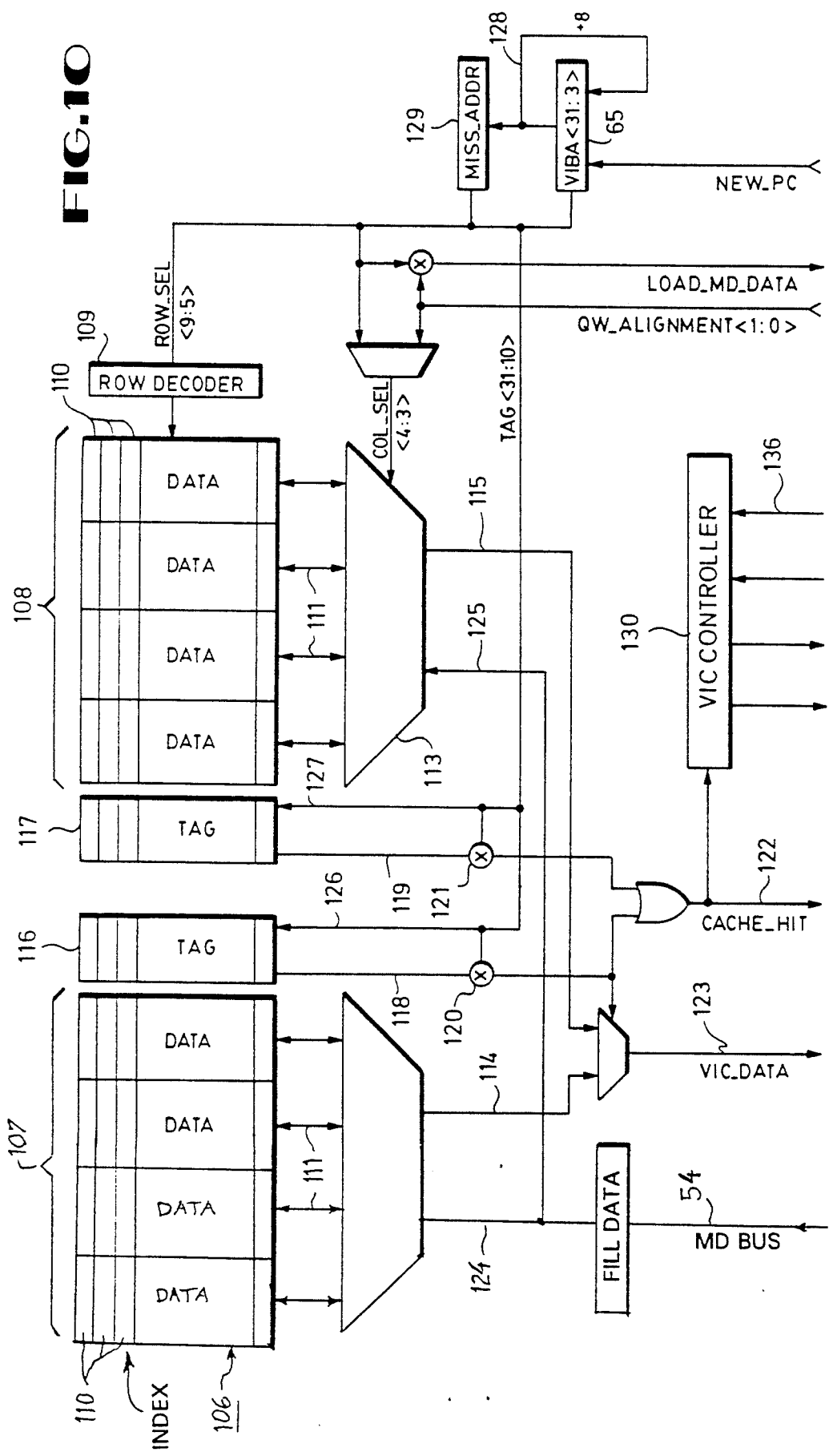

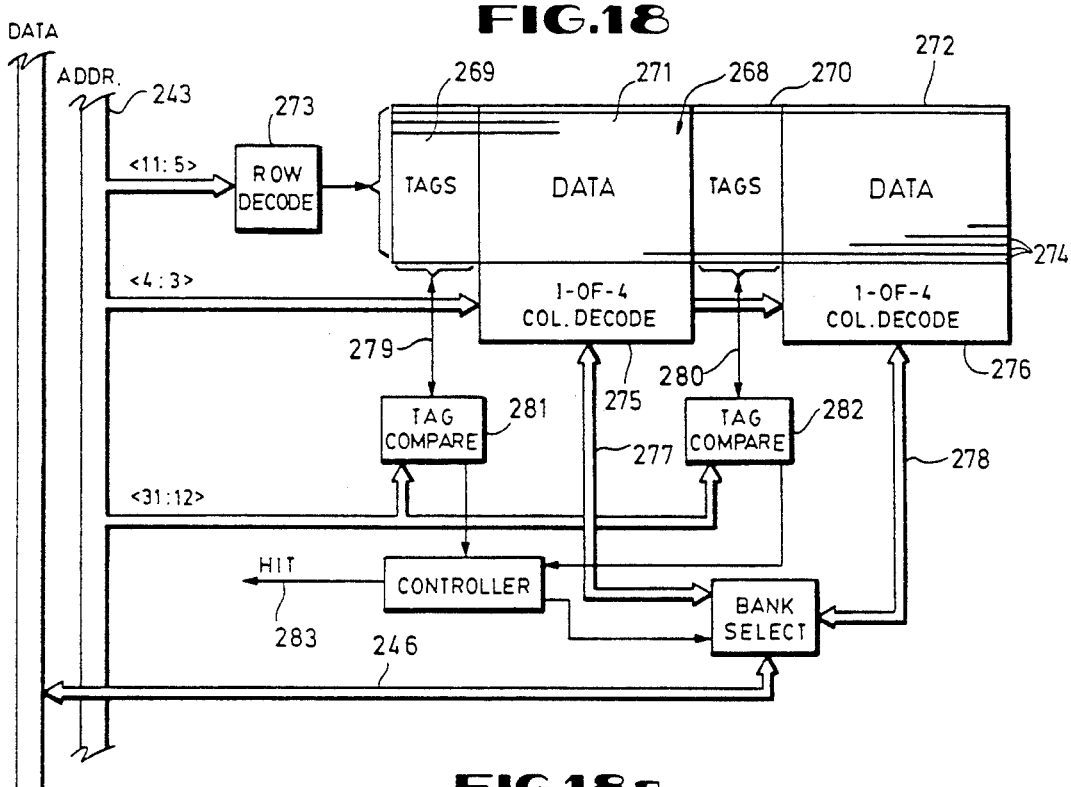
FIG.18
FIG.18a
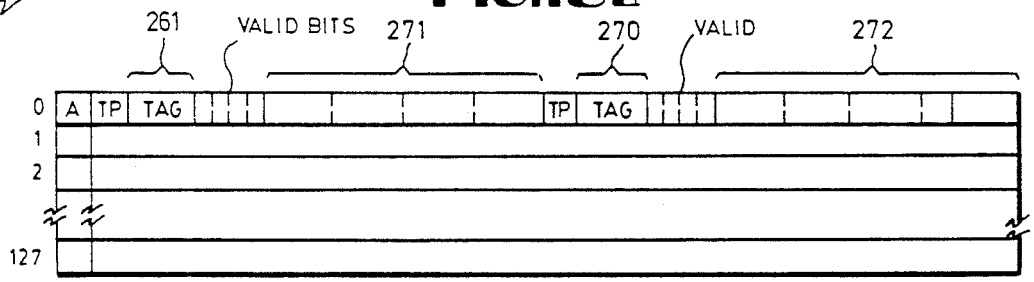
FIG.15

COMBINED QUEUE FOR INVALIDATES AND
RETURN DATA IN MULTIPROCESSOR SYSTEM

This application is a continuation of application Ser. No. 07/547,850 filed Jun. 29, 1990, now abandoned.

RELATED CASES

This application discloses subject matter also disclosed in the following copending applications, filed herewith and assigned to Digital Equipment Corporation, the assignee of this invention:

Ser. No. 547,824, filed Jun. 29, 1990, entitled CACHE SET SELECTION FOR HIGH-PERFORMANCE PROCESSOR, by William Wheeler and Jeanne Meyer, inventors;

Ser. No. 547,804, filed Jun. 29, 1990, entitled BRANCH PREDICTION UNIT FOR HIGH-PERFORMANCE PROCESSOR, by John Brown, III, Jeanne Meyer and Shawn Persels, inventors;

Ser. No. 547,944, filed Jun. 29, 1990, entitled HIGH-PERFORMANCE MULTI-PROCESSOR HAVING FLOATING POINT UNIT, by Anil Jain, David Deverell and Gilbert Wolrich, inventors;

Ser. No. 547,603, Jun. 29, 1990, entitled MASK PROCESSING UNIT FOR HIGH-PERFORMANCE PROCESSOR, by Elizabeth Cooper and Robert Supnik, inventors;

Ser. No. 547,699, filed Jun. 29, 1990, entitled BUS PROTOCOL FOR HIGH-PERFORMANCE PROCESSOR, by Rebecca Stamm, David Archer, John Edmondson, Samyojita Nadkarni and Raymond Strouble, inventors;

Ser. No. 547,995 filed Jun. 29, 1990, entitled CONVERSION OF INTERNAL PROCESSOR REGISTER COMMANDS TO I/O SPACE ADDRESSES, by Rebecca Stamm and G. Michael Uhler, inventors;

Ser. No. 547,597, filed Jun. 29, 1990, entitled ERROR TRANSITION MODE FOR MULTI-PROCESSOR SYSTEM, by Rebecca Stamm, Iris Bahar, Michael Callander, Linda Chao, Dirk Meyer, Douglas Sanders, Richard Sites, Raymond Strouble & Nicholas Wade, inventor.

BACKGROUND OF THE INVENTION

This invention is directed to digital computers, and more particularly to improved CPU devices of the type constructed as single-chip integrated circuits.

A large part of the existing software base, representing a vast investment in writing code, database structures and personnel training, is for complex instruction set or CISC type processors. These types of processors are characterized by having a large number of instructions in their instruction set, often including memory-to-memory instructions with complex memory accessing modes. The instructions are usually of variable length, with simple instructions being only perhaps one byte in length, but the length ranging up to dozens of bytes. The VAX TM instruction set is a primary example of CISC and employs instructions having one to two byte opcodes plus from zero to six operand specifiers, where each operand specifier is from one byte to many bytes in length. The size of the operand specifier depends upon the addressing mode, size of displacement (byte, word or longword), etc. The first byte of the operand specifier describes the addressing mode for that operand, while the opcode defines the number of operands: one, two or three. When the opcode itself is decoded, however, the total length of the instruction is not yet known to the processor because the operand specifiers have not yet been decoded. Another characteristic of processors of the VAX type is the use of byte or byte string memory references, in addition to quadword or longword references; that is, a memory reference may be of a length variable from one byte to multiple words, including unaligned byte references.

The variety of powerful instructions, memory accessing modes and data types available in a VAX type of architecture should result in more work being done for each line of code (actually, compilers do not produce code taking full advantage of this). Whatever gain in compactness of source code is accomplished at the expense of execution time. Particularly as pipelining of instruction execution has become necessary to achieve performance levels demanded of systems presently, the data or state dependencies of successive instructions, and the vast differences in memory access time vs. machine cycle time, produce excessive stalls and exceptions, slowing execution.

When CPUs were much faster than memory, it was advantageous to do more work per instruction, because otherwise the CPU would always be waiting for the memory to deliver instructions - this factor lead to more complex instructions that encapsulated what would be otherwise implemented as subroutines. When CPU and memory speed became more balanced, the advantages of complex instructions is lessened, assuming the memory system is able to deliver one instruction and some data in each cycle. Hierarchical memory techniques, as well as faster access cycles, and greater memory access bandwidth, provide these faster memory speeds. Another factor that has influenced the choice of complex vs. simple instruction type is the change in relative cost of off-chip vs. on-chip interconnection resulting from VLSI construction of CPUs. Construction on chips instead of boards changes the economics—first it pays to make the architecture simple enough to be on one chip, then more on-chip memory is possible (and needed) to avoid going off-chip for memory references. A further factor in the comparison is that adding more complex instructions and addressing modes as in a CISC solution complicates (thus slows down) stages of the instruction execution process. The complex function might make the function execute faster than an equivalent sequence of simple instructions, but it can lengthen the instruction cycle time, making all instructions execute slower; thus an added function must increase the overall performance enough to compensate for the decrease in the instruction execution rate.

Despite the performance factors that detract from the theoretical advantages of CISC processors, the existing software base as discussed above provides a long-term demand for these types of processors, and of course the market requires ever increasing performance levels. Business enterprises have invested many years of operating background, including operator training as well as the cost of the code itself, in applications programs and data structures using the CISC type processors which were the most widely used in the past ten or fifteen years. The expense and disruption of operations to rewrite all of the code and data structures to accommodate a new processor architecture may not be justified, even though the performance advantages ultimately expected to be achieved would be substantial. Accordingly, it is the objective to provide high-level performance in a CPU which executes an instruction set of the type using variable length instructions and variable data widths in memory accessing.

The typical VAX implementation has three main parts, the I-box or instruction unit which fetches and decodes instructions, the E-box or execution unit which performs the operations defined by the instructions, and the M-box or memory management unit which handles memory and I/O functions. An example of these VAX systems is shown in U.S. Pat. No. 4,875,160, issued Oct. 17, 1989 to John F. Brown and assigned to Digital Equipment Corporation. These machines are constructed using a single-chip CPU device, clocked at very high rates, and are microcoded and pipelined.

Theoretically, if the pipeline can be kept full and an instruction issued every cycle, a processor can execute one instruction per cycle. In a machine having complex instructions, there are several barriers to accomplishing this ideal. First, with variable-sized instructions, the length of the instruction is not known until perhaps several cycles into its decode. The number of opcode bytes can vary, the number of operands can vary, and the number of bytes used to specify an operand can vary. The instructions must be decoded in sequence, rather than parallel decode being practical. Secondly, data dependencies create bubbles in the pipeline as results generated by one instruction but not yet available are needed by are subsequent instruction which is ready to execute. Third, the wide variation in instruction complexity makes it impractical to implement the execution without either lengthening the pipeline for every instruction (which worsens the data dependency problem) or stalling entry (which creates bubbles).

Thus, in spite of the use of contemporary semiconductor processing and high clock rates to achieve the most aggressive performance at the device level, the inherent characteristics of the architecture impede the overall performance, and so a number of features must be taken advantage of in an effort to provide system performance as demanded.

SUMMARY OF THE INVENTION

In accordance with one embodiment of the invention, which exhibits a number of distinctive features, a pipelined CPU is provided which can execute instructions of variable length, and which can reference memory using various data widths. The performance is enhanced by a number of the features.

Macroinstruction pipelining is employed (instead of microinstruction pipelining), so that a number of macroinstructions can be at various stages of the pipeline at a given time. Queueing is provided between units of the CPU so that there is some flexibility in instruction execution times; the execution of stages of one instruction need not always wait for the completion of these stages by a preceding instruction. Instead, the information produced by one stage can be queued until the next stage is ready.

Another feature is the use of a wide bandwidth for memory access; fetching 64-bit data blocks on each cycle of the system bus or caches, at faster cycle times, provides enhanced performance. Nevertheless, byte and byte string type of memory references are still available so that existing software and data structures are not obsoleted. However, the wider data paths and memory bandwidth, as well as hierarchical memory organization, increase the likelihood of cache hits and so reduce the burden imposed by the byte operations to memory.

The hierarchical cache arrangement used in the CPU of the example disclosed, as well as an improved method of cache set selection, increase the likelihood that any memory references are to data that is in cache instead of in memory. In particular, a set selection technique employs a not-last-used fill algorithm, enhanced to direct a fill to a block in cache that has been the target of an invalidate, and so the most-likely to be used data blocks stay in cache rather than being overwritten by a fill.

An additional feature is the use of a writeback cache for at least part of the hierarchical memory (instead of writethrough, which requires more memory references) and allowing writeback to proceed even though other accesses are suppressed due to queues being full. Thus, a feature is the ability to separate writeback operations to proceed in a writeback cache environment, while other types of data accesses are delayed at the CPU-to-bus interface.

A particular improvement is obtained by a branch prediction method included in the CPU in one embodiment. Branches degrade performance from a cycles-per-instruction standpoint in a pipelined processor because, whenever a branch is taken, the prefetched instructions in the pipeline must be flushed and a new instruction stream started. By employing a branch history table which records the taken vs. not-taken history of branch opcodes recently used, and using an empirical algorithm to predict which way the next occurrence of this branch will go, based upon the history table, an improved prediction result is obtained. Therefore, performance is enhanced by lessening the chances that the instruction stream has to be re-directed.

A floating point processor function is integrated on-chip in the example embodiment, rather than being off-chip. The speed of execution of floating point instruction is thus enhanced, since the burden of going through two bus interfaces and an external bus is eliminated, and bandwidth of the external bus is not used for this purpose. In addition, the number of cycles of delay from the time an operation is sent to the on-chip floating point unit before a result is sent back is reduced by a bypass technique. It is noted that in the most commonly used functions the rounding operation need only be performed on the low-order bits instead of the entire data width, so a trial mini-rounding can be done to see if the result is correct, and if so, the last stage of the floating point processor can be bypassed, saving one cycle of latency.

One of the events that introduces a delay in execution in a CPU is the occurrence of an instruction such as a CALL, where the state of the CPU must be saved for return. In particular, the prior CPUs of the type herein disclosed, as shown in U.S. Pat. No. 4,875,160, have used microcode sequences to save each of the necessary registers of register set to a stack. In order to determine exactly what registers need be saved, it has been the practice to invoke microcode routines to check each position of a register mask, requiring at least a cycle for each register of the register set. In place of this lengthy procedure, a feature of the CPU herein presented is the facility for determining which registers need to be saved in a minimum number of cycles, by examining groups of the register mask bits at one time. In the most common situations, only a few registers need by saved, and so most of the register mask is zeros and can be scanned in a very few cycles.

To the extent that the size of the chip used for an single-chip CPU device can be reduced, the performance (speed), power dissipation, cost and reliability can be favorably influenced. By reducing the number an length of internal busses and signal paths, the chip area is minimized. One of the techniques for accomplishing this objective in the CPU device herein disclosed is that of accessing internal processor registers with short (byte width) addresses instead of full physical addresses as used for memory and I/O references. There are a number of internal processor registers (non-memory storage for status, controls and the like), some on the chip and some off. Preferably, the off-chip processor registers are memory-mapped and accessed by the same busses using the same controls as the memory and I/O, so a different set of control signals need not be implemented. However, since there are a relatively small number of processor registers, a small address is adequate, and a full address is to be avoided on chip, where added control signal are much less burdensome than on the system bus. Accordingly, a short address and extra control lines are used to access processor registers on chip, but a full address with no added control lines are used for accessing external processor registers. Thus, a reduction in the number of internal lines is accomplished, but yet the external references can be I/O mapped using the bus structure employed for memory and I/O access.

When a writeback cache is used in a hierarchical memory system, the cache can, at times, contain the only valid copy of certain data. If the cache fails, as demonstrated by a non-recoverable error detected by ECC circuits or the like, it is necessary that the data owned by the cache be available to the system, as this may be the only copy. Further, the data in the cache is preferably maintained in an undisturbed condition for diagnostic purposes. Thus the cache cannot be merely turned off, nor can it continue to be operated in the normal manner. Accordingly, an error transition mode is provided wherein the cache operates under limited access rules, allowing a maximum of access by the system to make used of data blocks owned by the cache, but yet minimizing changes to the cache data.

In the computer system set forth herein, data is buffered or queued whenever possible so that the various components can operate independently of one another whenever feasible, allowing many bus transactions to be initiated, for example, without necessarily waiting until a given one is completed before beginning another. Example of bus transactions that are queued are the incoming read-return data and cache invalidate operations. The system bus returns read data whenever the memory completes an access cycle, and an interface is provided to queue these read returns until the CPU can accept them. Meanwhile, all writes occurring on the system bus are monitored by a CPU in a multiprocessor environment to keep its cache updated; each such transaction is called an invalidate, and consists of the address tag (the whole address is not needed) for a data block for which a write to memory by another processor is executed. To maintain cache coherency, the read returns and invalidates must be kept in chronological order, i.e., executed in the cache in the order they appeared on the system bus. Thus, they must be queued in a FIFO type of buffer. However, the data width for an invalidate is much less than that of a read return, and there are many more invalidates than read returns, so chip space is wasted by using a queue width required for the read returns, when little of the width is needed for most of the traffic. To this end, separate queues are provided for the different types of transactions, but yet the order is maintained by a pointer arrangement.

The bus protocol used by the CPU to communicate with the system bus is of the pended type, in that several transactions can be pending on the bus at a given time. The read and write transactions on the bus are identified by an ID field which specifies the originator or original bus commander for each transaction. Therefore, when the read return data appears some cycles after a request, the ID field is recognized by a CPU so that it can accept the data from the bus. Another characteristic of the bus is that arbitration for bus grant goes one simultaneously with address/data transactions on the bus, and so every cycle is an active cycle if traffic demands it.

BRIEF DESCRIPTION OF THE DRAWINGS

The novel features believed characteristic of the invention are set forth in the appended claims. The invention itself, however, as well as other features and advantages thereof, will be best understood by reference to the detailed description of a specific embodiment, when read in conjunction with the accompanying drawings wherein:

FIG. 3 is a diagram of data types used in the system of FIG. 1;

FIG. 7 is an electrical diagram in block form of the CPU of FIG. 1, arranged in time-sequential format, showing the pipelining of the CPU according to FIG. 6;

FIG. 9 is an electrical diagram in block form of the complex specifier unit used in the CPU of FIG. 1;

FIG. 10 is an electrical diagram in block form of the virtual instruction cache used in the CPU of FIG. 1;

FIG. 15 is a diagram of the formats of microinstruction words produced by the control store of FIG. 14;

FIG. 17a is a diagram of an M-Box pipeline.

FIG. 18 is an electrical diagram in block form of the primary cache or P-cache memory of the CPU of FIG. 1;

FIG. 18a is a diagram of the data format stored in the primary cache of FIG. 18;

DETAILED DESCRIPTION OF SPECIFIC EMBODIMENT

Figure 1:
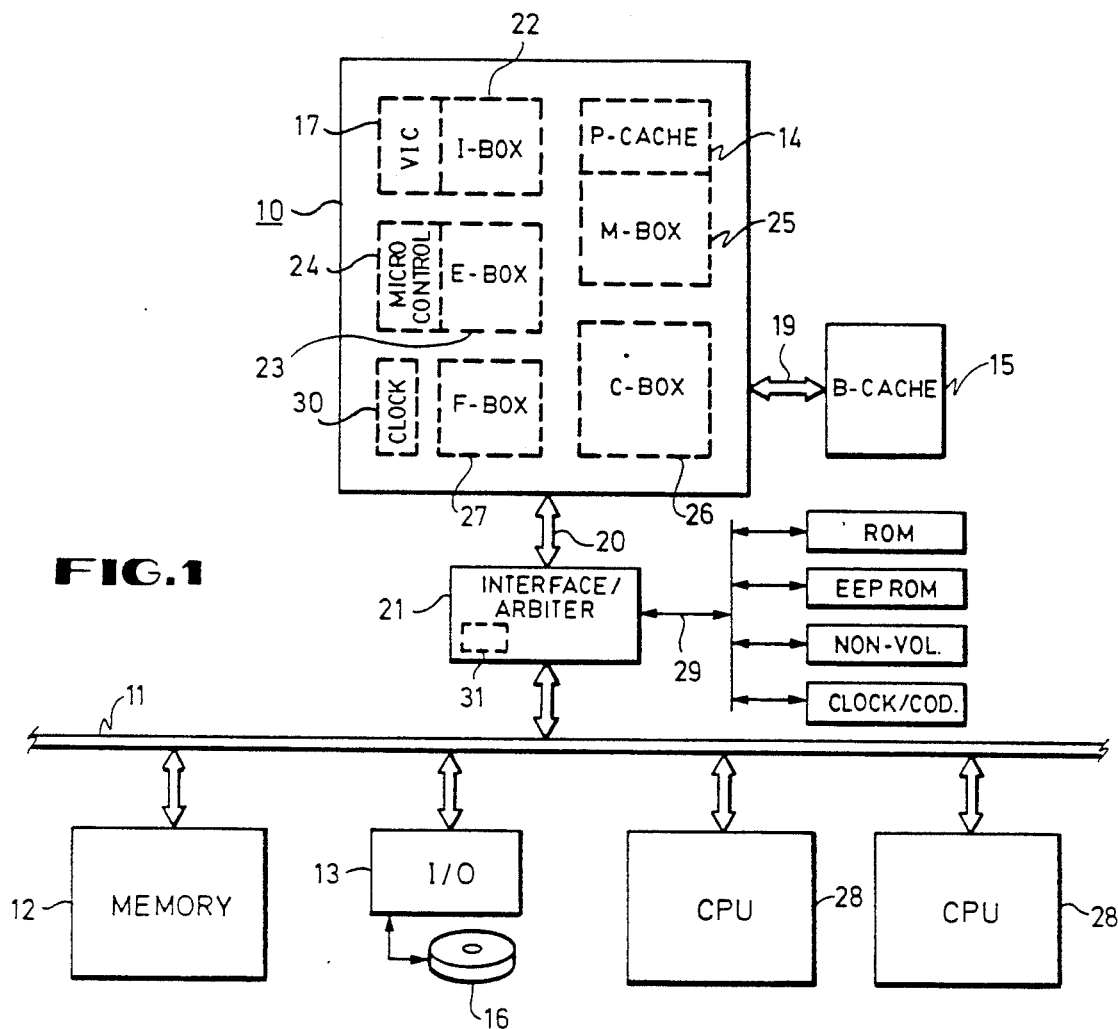
FIG. 1 is an electrical diagram in block form of a computer system including a central processing unit according to one embodiment of the invention.

Referring to FIG. 1, according to one embodiment, a computer system employing features of the invention includes a CPU chip or module 10 connected by a system bus 11 to a system memory 12 and to I/O elements 13. Although in a preferred embodiment the CPU 10 is formed on a single integrated circuit, some concepts as described below may be implemented as a chip set mounted on a single circuit board or multiple boards. When fetching instructions or data, the CPU 10 accesses an internal or primary cache 14, then a larger external or backup cache 15. Thus, a hierarchical memory is employed, the fastest being the primary cache 14, then the backup cache 15, then the main system memory 12, usually followed by a disk memory 16 accessed through the I/O elements 13 by employing an operating system (i.e., software). A virtual memory organization is employed, with page swapping between disk 16 and the memory 12 used to keep the most-likely-to-be-used pages in the physical memory 12. An additional cache 17 in the CPU 10 stores instructions only, using the virtual addresses instead of physical addresses. Physical addresses are used for accessing the primary and backup caches 14 and 15, and used on the bus 11 and in the memory 12. When the CPU 10 fetches an instruction, first the virtual instruction cache 17 is checked, and if a cache miss occurs the address is translated to a physical address and the primary cache 14 is checked. If the instruction is not in the primary cache, the backup cache 15 is accessed, and upon a cache miss in the backup cache the memory 12 is accessed. The primary cache 14 is smaller but faster than the backup cache 15, and the content of the primary cache 14 is a subset of the content of the backup cache 15. The virtual instruction cache 17 differs from the operation of the other two caches 14 and 15 in that there are no writes to the cache 17 from the CPU 10 except when instructions are fetched, and also the content of this cache 17 need not be a subset of the content of the caches 14 or 15, although it may be.

The CPU 10 accesses the backup cache 15 through a bus 19, separate from a CPU bus 20 used to access the system bus 11; thus, a cache controller for the backup cache 15 is included within the CPU chip. Both the CPU bus 20 and the system bus 11 are 64-bit bidirectional multiplexed address/data buses, accompanied by control buses containing request, grant, command lines, etc. The bus 19, however, has a 64-bit data bus and separate address buses. The system bus 11 is interconnected with the CPU bus 20 by an interface unit 21 functioning to arbitrate access by the CPU 10 and the other components on the CPU bus 20.

The CPU 10 includes an instruction unit 22 (referred to as the I-box) functioning to fetch macroinstructions (machine-level instructions) and to decode the instructions, one per cycle, and parse the operand specifiers, then begin the operand fetch. The data or address manipulation commanded by the instructions is done by an execution unit or E-box 23 which includes a register file and an ALU. The CPU is controlled by microcode so a microinstruction control unit 24 including a microsequencer and a control store is used to generate the sequence of microinstructions needed to implement the macroinstructions. A memory management unit or M-box 25 receives instruction read and data read requests from the instruction unit 22, and data read or write requests from the execution unit 23, performs address translation for the virtual memory system to generate physical addresses, and issues requests to the P-cache 14, or in the case of a miss, forwards the requests to the backup cache 15 via a cache controller 26. This cache controller or C-box 26 handles access to the backup (second level) cache 15 in the case of a P-cache miss, or access to the main memory 12 for backup cache misses. An on-chip floating point processor 27 (referred to as the F-box) is an execution unit for floating point and integer multiply instructions, receiving operands and commands from the execution unit 23 and delivering results back to the execution unit.

Although features of the invention may be used with various types of CPUs, the disclosed embodiment was intended to execute the VAX instruction set, so the machine-level or macroinstructions referred to are of variable size. An instruction may be from a minimum of one byte, up to a maximum of dozens of bytes long; the average instruction is about five bytes. Thus, the instruction unit 22 must be able to handle variable-length instructions, and in addition the instructions are not necessarily aligned on word boundaries in memory. The instructions manipulate data also of variable width, with the integer data units being set forth in FIG. 3. The internal buses and registers of the CPU 10 are generally 32-bits wide, 32-bits being referred to as a longword in VAX terminology. Transfers of data to and from the caches 14 and 15 and the memory 12 are usually 64-bits at a time, and the buses 11 and 20 are 64-bits wide, referred to as a quadword (four words or eight bytes). The instruction stream is prefetched as quadwords and stored in a queue, then the particular bytes of the next instruction are picked out by the instruction unit 22 for execution. The instructions make memory references of byte, word, longword or quadword width, and these need not be aligned on longword or quadword boundaries, i.e., the memory is byte addressable. Some of the instructions in the instruction set execute in one machine cycle, but most require several cycles, and some require dozens of cycles, so the CPU 10 must accommodate not only variable sized instructions and instructions which reference variable data widths (aligned or non-aligned), but also instructions of varying execution time.

Even though the example embodiment to be described herein is intended to execute the VAX instruction set, nevertheless there are features of the invention useful in processors constructed to execute other instruction sets, such as those for 80386 or 68030 types. Also, instead of only in complex instruction set computers (CISC type) as herein disclosed, some of the features are useful in reduced instruction set computers (RISC); in a RISC type, the instruction words are always of the same width (number of bytes), and are always executed in a single cycle—only register-to-register or memory-register instructions are allowed in a reduced instruction set.

Additional CPUs 28 may access the system bus 11 in a multiprocessor system. Each additional CPU can include its own CPU chip 10, cache 15 and interface unit 21, if these CPUs 28 are of the same design as the CPU 10. Alteratively, these other CPUs 28 may be of different construction but executing a compatible bus protocol to access the main system bus 11. These other CPUs 28 can access the memory 12, and so the blocks of data in the caches 14 or 15 can become obsolete. If a CPU 28 writes to a location in the memory 12 that happens to be duplicated in the cache 15 (or in the primary cache 14), then the data at this location in the cache 15 is no longer valid. For this reason, blocks of data in the caches 14 and 15 are "invalidated" as will be described, when there is a write to memory 12 from a source other than the CPU 10 (such as the other CPUs 28). The cache 14 operates on a "writethrough" principle, whereas the cache 15 operates on a "writeback" principle. When the CPU 10 executes a write to a location which happens to be in the primary cache 14, the data is written to this cache 14 and also to the backup cache 15 (and sometimes also to the memory 12, depending upon conditions); this type of operation is "writethrough". Mien the CPU 10 executes a write to a location which is in the backup cache 15, however, the write is not necessarily forwarded to the memory 12, but instead is written back to memory 12 only if another element in the system (such as a CPU 28) needs the data (i.e., tries to access this location in memory), or if the block in the cache is displaced (deallocated) from the cache 15.

The interface unit 21 has three bus ports. In addition to the CPU address/data port via bus 20 and the main system bus 11, a ROM bus 29 is provided for accessing a boot ROM as well as EEPROM, non-volatile RAM (with battery back up) and a clock/calendar chip. The ROM bus 29 is only 8-bits wide, as the time demands on ROM bus accesses are less stringent. This ROM bus can also access a keyboard and/or LCD display controller as well as other input devices such as a mouse. A serial input/output port to a console is also included in the interface 21, but will not be treated here.

Figure 2:
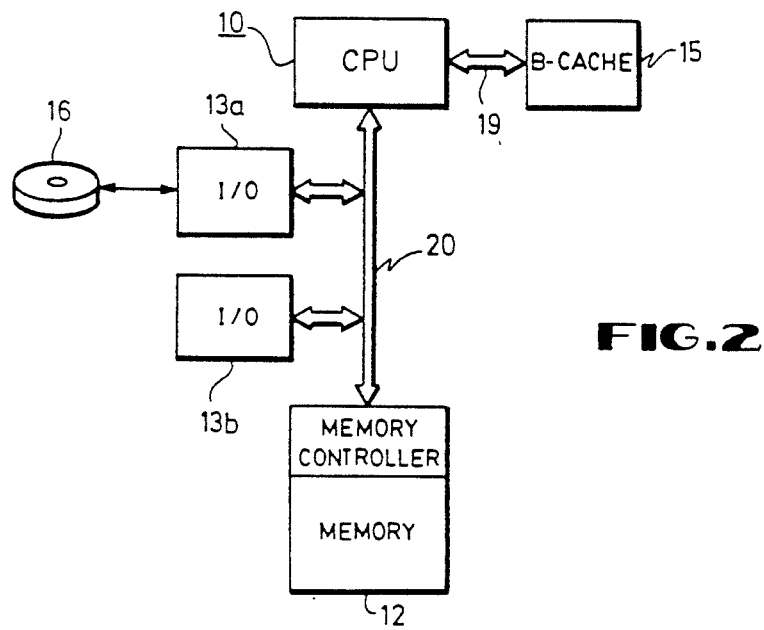
FIG. 2 is an electrical diagram in block form of a computer system as in FIG. 1, according to an alternative configuration.

The bus 20 may have other nodes connected to it; for example, as seen in FIG. 2, a low end configuration of a system using the CPU 10 may omit the interface/arbiter chip 21 and connect the memory 12 to the bus 20 (using a suitable memory interface). In this case the I/O must be connected to the bus 20 since there is no system bus 11. To this end, the disk 16 or other I/O is connected to one or two I/O nodes 13a and 13b, and each one of these can request and be granted ownership of the bus 20. All of the components on the bus 20 in the case of FIG. 2 are synchronous and operating under clock control from the CPU 10, whereas in the case of FIG. 1 the system bus 11 is asynchronous to the bus 20 and the CPU 10 and operates on its own clock.

Accordingly, the CPU 10 herein disclosed is useful in many different classes of computer systems, ranging from desktop style workstations or PCs for individual users, to full-scale configurations servicing large departments or entities. In one example, the system of FIG. 1 may have a backup cache 15 of 256 Kbytes, a main memory 20 of 128 Mbytes, and a disk 16 capacity of perhaps 1 Gbyte or more. In this example, the access time of the backup cache 15 may be about 25 nsec (two CPU machine cycles), while the access time of the main memory 20 from the CPU 10 via bus 11 may be ten or twenty times that of the backup cache; the disk 16, of course, has an access time of more than ten times that of the main memory. In a typical system, therefore, the system performance depends upon executing as much as possible from the caches.

Although shown in FIG. 1 as employing a multiplexed 64-bit address/data bus 11 or 20, some features of the invention may be implemented in a system using separate address and data busses as illustrated in U.S. Pat. No. 4,875,160, for example.

Referring to FIG. 3, the integer data types or memory references discussed herein include a byte (eight bits), a word (two bytes), a longword (four bytes), and a quadword (eight bytes or 64-bits). The data paths in the CPU 10 are generally quadword width, as are the data paths of the busses 11 and 20. Not shown in FIG. 3, but referred to herein, is a hexaword, which is sixteen words (32-bytes) or four quadwords.

Clocks and Timing

Figure 4:
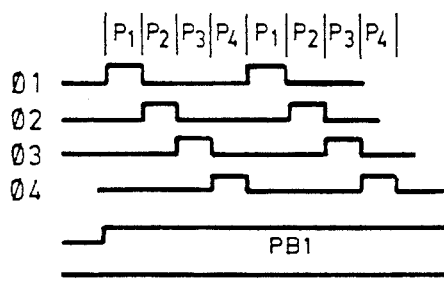
FIG. 4 is a timing diagram of the four-phase clocks produced by a clock generator in the CPU of FIGS. 1 or 2 and used within the CPU, along with a timing diagram of the bus cycle and clocks used to define the bus cycle in the system of FIG. 1.

Referring to FIG. 4, a clock generator 30 in the CPU chip 10 of FIG. 1 generates four overlapping clocks phi1, phi2 phi3 and phi4 used to define four phases P1, P2 P3 and P4 of a machine cycle. In an example embodiment, the machine cycle is nominally 14 nsec, so the clocks phi1, etc., are at about 71 Mhz; alteratively, the machine cycle may be 10 nsec, in which case the clock frequency is 100 MHz. The bus 20 and system bus 11, however, operate on a bus cycle which is three times longer than the machine cycle of the CPU, so in this example the bus cycle, also shown in FIG. 4, is nominally 42 nsec (or, for 100 MHz clocking, the bus cycle would be 30 nsec). The bus cycle is likewise defined by four overlapping clocks Phi1, Phi2, Phi3 and Phi4 produced by the clock generator 30 serving to define four phases PB1, PB2, PB3 and PB4 of the bus cycle. The system bus 11, however, operates on a longer bus cycle of about twice as long as that of the bus 20, e.g., about 64-nsec, and this bus cycle is asynchronous to the CPU 10 and bus 20. The timing cycle of the system bus 11 is controlled by a clock generator 31 in the interface unit 21.

The CPU Chip

Figure 5:
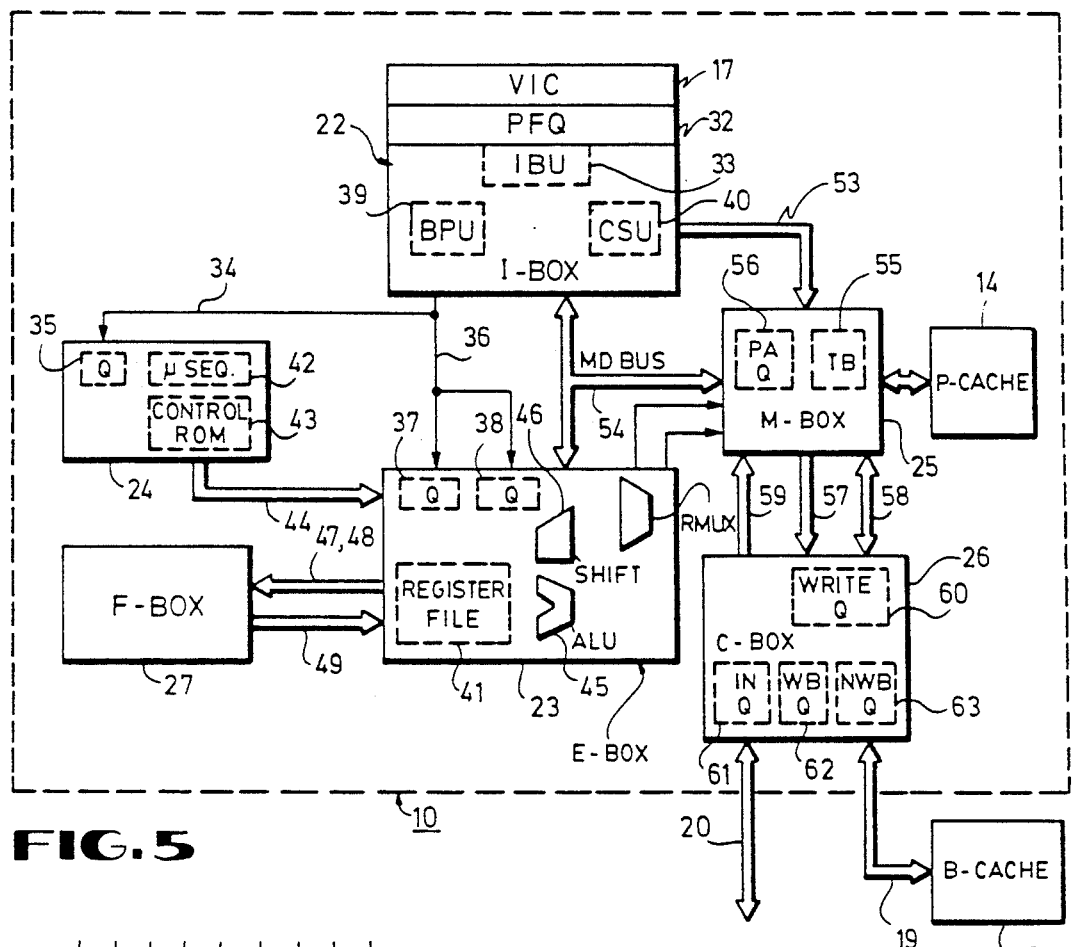
FIG. 5 is an electrical diagram in block form of the central processing unit (CPU) of the system of FIGS. 1 or 2, according to one embodiment of the invention.

Referring to FIG. 5, the internal construction of the CPU chip 10 is illustrated in general form. The instruction unit 22 includes the virtual instruction cache 17 which is a dedicated instruction-stream-only cache of 2 Kbyte size, in this example, storing the most recently used blocks of the instruction stream, using virtual addresses rather than physical addresses as are used for accessing the caches 14 and 15 and the main memory 12. That is, an address for accessing the virtual instruction cache 17 does not need address translation as is done in the memory management unit 25 for other memory references. Instructions are loaded from the instruction cache 17 to a prefetch queue 32 holding sixteen bytes. The instruction unit 22 has an instruction burst unit 33 which breaks an instruction into its component parts (opcode, operand specifiers, specifier extensions, etc.), decodes macroinstructions and parses operand specifiers, producing instruction control (such as dispatch addresses) which is sent by a bus 34 to an instruction queue 35 in the microinstruction controller 24. Information from the specifiers needed for accessing the operands is sent by a bus 36 to a source queue 37 and a destination queue 38 in the execution unit 23. The instruction unit 22 also includes a branch prediction unit 39 for predicting whether or not a conditional branch will be taken, and for directing the addressing sequence of the instruction stream accordingly. A complex specifier unit 40 in the instruction unit 22 is an auxiliary address processor (instead of using the ALU in the execution unit 23) for accessing the register file and otherwise producing the addresses for operands before an instruction is executed in the execution unit 23.

The execution unit 23 (under control of the microinstruction control unit 24) performs the actual "work" of the macroinstructions, implementing a four-stage micropipelined unit having the ability to stall and to trap. These elements dequeue the instruction and operand information provided by the instruction unit 22 via the queues 35, 37 and 38. For literal types of operands, the source queue 37 contains the actual operand value from the instruction, while for register or memory type operands the source queue 37 holds a pointer to the data in a register file 41 in the execution unit 23.

The microinstruction control unit 24 contains a microsequencer 42 functioning to determine the next microword to be fetched from a control store 43. The control store is a ROM or other memory of about 1600-word size producing a microcode word of perhaps 61-bits width, one each machine cycle, in response to an 11-bit address generated by the microsequencer 42. The microsequencer receives an 11-bit entry point address from the instruction unit 22 via the instruction queue 35 to begin a microroutine dictated by the macroinstruction. The microinstructions produced in each cycle by from the control store 43 are coupled to the execution unit 23 by a microinstruction bus 44.

The register file 41 contained in the execution unit 23 includes fifteen general purpose registers, a PC (program counter), six memory data registers, six temporary or working registers and ten state registers. The execution unit 23 also contains a 32-bit ALU 45 and a 64-bit shifter 46 to perform the operation commanded by the macroinstruction, as defined by the microinstructions received on the bus 44.

The floating point unit 27 receives 32- or 64-bit operands on two 32-bit buses 47 and 48 from the A and B inputs of the ALU 45 in the execution unit 23, and produces a result on a result bus 49 going back to the execution unit 23. The floating point unit 27 receives a command for the operation to be performed, but then executes this operation independently of the execution unit 23, signalling and delivering the operand when it is finished. As is true generally in the system of FIG. 1, the floating point unit 27 queues the result to be accepted by the execution unit 23 when ready. The floating point unit 27 executes floating point adds in two cycles, multiplies in two cycles and divides in seventeen to thirty machine cycles, depending upon the type of divide.

The output of the floating point unit 27 on bus 49 and the outputs of the ALU 45 and shifter 46 are merged (one is selected in each cycle) by a result multiplexer or Rmux 50 in the execution unit 23. The selected output from the Rmux is either written back to the register file 45, or is coupled to the memory management unit 25 by a write bus 51, and memory requests are applied to the memory management unit 25 from the execution unit 23 by a virtual address bus 52.

The memory management unit 25 receives read requests from the instruction unit 22 (both instruction stream and data stream) by a bus 53 and from the execution unit 23 (data stream only) via address bus 52. A memory data bus 54 delivers memory read data from the memory management unit 25 to either the instruction unit 22 (64-bits wide) or the execution unit 23 (32-bits wide). The memory management unit 25 also receives write/store requests from the execution unit 23 via write data bus 51, as well as invalidates, primary cache 14 fills and return data from the cache controller unit 26. The memory management unit 25 arbitrates between these requesters, and queues requests which cannot currently be handled. Once a request is started, the memory management unit 25 performs address translation, mapping virtual to physical addresses, using a translation buffer or address cache 55. This lookup in the address cache 55 takes one machine cycle if there are no misses. In the case of a miss in the TB 55, the memory management circuitry causes a page table entry to be read from page tables in memory and a TB fill performed to insert the address which missed. This memory management circuitry also performs all access checks to implement the page protection function, etc. The P-cache 14 referenced by the memory management unit 25 is a two-way set associative write-through cache with a block and fill size of 32-bytes. The P-cache state is maintained as a subset of the backup cache 15. The memory management unit 25 circuitry also ensures that specifier reads initiated by the instruction unit 22 are ordered correctly when the execution unit 23 stores this data in the register file 41; this ordering, referred to as "scoreboarding", is accomplished by a physical address queue 56 which is a small list of physical addresses having a pending execution unit 23 store. Memory requests received by the memory management unit 25 but for which a miss occurs in the primary cache 14 are sent to the cache controller unit 26 for execution by a physical address bus 57, and (for writes) a data bus 58. Invalidates are received by the memory management unit 25 from the cache controller unit 26 by an address bus 59, and fill data by the data bus 58.

The cache controller unit 26 is the controller for the backup cache 15, and interfaces to the external CPU bus 20. The cache controller unit 26 receives read requests and writes from the memory management unit 25 via physical address bus 57 and data bus 58, and sends primary cache 14 fills and invalidates to the memory management unit 25 via address bus 59 and data bus 58. The cache controller unit 26 ensures that the primary cache 14 is maintained as a subset of the backup cache 15 by the invalidates. The cache controller unit 26 receives cache coherency transactions from the bus 20, to which it responds with invalidates and writebacks, as appropriate. Cache coherence in the system of FIGS. 1 and 5 is based upon the concept of ownership; a hexaword (16-word) block of memory may be owned either by the memory 12 or by a backup cache 15 in a CPU on the bus 11 - in a multiprocessor system, only one of the caches, or memory 12, may own the hexaword block at a given time, and this ownership is indicated by an ownership bit for each hexaword in both memory 12 and the backup cache 15 (1 for own, 0 for not-own). Both the tags and data for the backup cache 15 are stored in off-chip RAMS, with the size and access time selected as needed for the system requirements. The backup cache 15 may be of a size of from 128K to 2 Mbytes, for example. With access time of 28 nsec, the cache can be referenced in two machine cycles, assuming 14 nsec machine cycle for the CPU 10. The cache controller unit 26 packs sequential writes to the same quadword in order to minimize write accesses to the backup cache. Multiple write commands from the memory management unit 25 are held in an eight-word write queue 60. The cache controller unit 26 is also the interface to the multiplexed address/data bus 20, and an input data queue 61 loads fill data and writeback requests from the bus 20 to the CPU 10. A non-writeback queue 62 and a write-back queue 63 in the cache controller unit 26 hold read requests and writeback data, respectively, to be sent to the main memory 12 over the bus 20.

Pipelining in the CPU

Figure 6:
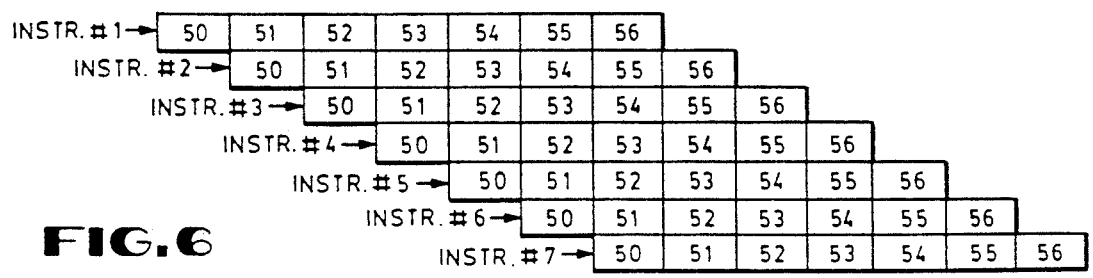
FIG. 6 is a timing diagram showing events occurring in the pipelined CPU 10 of FIG. 1 in successive machine cycles.

The CPU 10 is pipelined on a macroinstruction level. An instruction requires seven pipeline segments to finish execution, these being generally an instruction fetch segment S0, an instruction decode segment S1, an operand definition segment S2, a register file access segment S3, an ALU segment S4, an address translation segment S5, and a store segment S6, as seen in FIG. 6. In an ideal condition where there are no stalls, the overlap of sequential instructions #1 to #7 of FIG. 6 is complete, so during segment S6 of instruction #1 the S0 segment of instruction #7 executes, and the instructions #2 to #6 are in intermediate segments. When the instructions are in sequential locations (no jumps or branches), and the operands are either contained within the instruction stream or are in the register file 41 or in the primary cache 14, the CPU 10 can execute for periods of time in the ideal instruction-overlap situation as depicted in FIG. 6. However, when an operand is not in a register 43 or primary cache 14, and must be fetched from backup cache 15 or memory 12, or various other conditions exist, stalls are introduced and execution departs from the ideal condition of FIG. 6.

Referring to FIG. 7, the hardware components of each pipeline segment S0-S6 are shown for the CPU 10 in general form. The actual circuits are more complex, as will appear below in more detailed description of the various components of the CPU 10. It is understood that only macroinstruction pipeline segments are being referred to here; there is also micropipelining of operations in most of the segments, i.e., if more than one operation is required to process a macroinstruction, the multiple operations are also pipelined within a section.

If an instruction uses only operands already contained within the register file 41, or literals contained within the instruction stream itself, then it is seen from FIG. 7 that the instruction can execute in seven successive cycles, with no stalls. First, the flow of normal macroinstruction execution in the CPU 10 as represented in FIG. 7 will be described, then the conditions which will cause stalls and exceptions will be described.

Execution of macroinstructions in the pipeline of the CPU 10 is decomposed into many smaller steps which are implemented in various distributed sections of the chip. Because the CPU 10 implements a macroinstruction pipeline, each section is relatively autonomous, with queues inserted between the sections to normalize the processing rates of each section.

The instruction unit 22 fetches instruction stream data for the next instruction, decomposing the data into opcode and specifiers, and evaluating the specifiers with the goal of prefetching operands to support execution unit 23 execution of the instruction. These functions of the instruction unit 22 are distributed across segments S0 through S3 of the pipeline, with most of the work being done in S1. In S0, instruction stream data is fetched from the virtual instruction cache 17 using the address contained in the virtual instruction buffer address (VIBA) register 65. The data is written into the prefetch queue 32 and VIBA 65 is incremented to the next location. In segment S1, the prefetch queue 32 is read and the burst unit 33 uses internal state and the contents of a table 66 (a ROM and/or PLA to look up the instruction formats) to select from the bytes in queue 32 the next instruction stream component—either an opcode or specifier. Some instruction components take multiple cycles to burst; for example, a two-byte opcode, always starting with FDhex in the VAX instruction set, requires two burst cycles: one for the FD byte, and one for the second opcode byte. Similarly, indexed specifiers require at least two burst cycles: one for the index byte, and one or more for the base specifier.

When an opcode is decoded by the burst unit 33, the information is passed via bus 67 to an issue unit 68 which consults the table 66 for the initial address (entry point) in the control store 43 of the routine which will process the instruction. The issue unit 68 sends the address and other instruction-related information to the instruction queue 35 where it is held until the execution unit 23 reaches this instruction.

When a specifier is decoded, the information is passed via the bus 67 to the operand queue unit 69 for allocation to the source and destination queues 37 and 38 and, potentially, to the pipelined complex specifier unit 40. The operand queue unit 69 allocates the appropriate number of entries for the specifier in the source and destination queues 37 and 38 in the execution unit 23. These queues 37 and 38 contain pointers to operands and results. If the specifier is not a short literal or register specifier, these being referred to as simple specifiers, it is thus considered to be a complex specifier and is processed by the microcode-controlled complex specifier unit 40, which is distributed in segments S1 (control store access), S2 (operand access, including register file 41 read), and S3 (ALU 45 operation, memory management unit 25 request, GPR write) of the pipeline. The pipeline of the complex specifier unit 40 computes all specifier memory addresses, and makes the appropriate request to the memory management unit 25 for the specifier type. To avoid reading or writing a GPR which is interlocked by a pending execution unit 23 reference, the complex specifier unit 40 pipe includes a register scoreboard which detects data dependencies. The pipeline of the complex specifier unit 40 also supplies to the execution unit 23 operand information that is not an explicit part of the instruction stream; for example, the PC is supplied as an implicit operand for instructions that require it.

During S1, the branch prediction unit 39 watches each opcode that is decoded looking for conditional and unconditional branches. For unconditional branches, the branch prediction unit 39 calculates the target PC and redirects PC and VIBA to the new path. For conditional branches, the branch prediction unit 39 predicts whether the instruction will branch or not based on previous history. If the prediction indicates that the branch will be taken, PC and VIBA are redirected to the new path. The branch prediction unit 39 writes the conditional branch prediction flag into a branch queue 70 in the execution unit 23, to be used by the execution unit 23 in the execution of the instruction. The branch prediction unit 39 maintains enough state to restore the correct instruction PC if the prediction turns out to be incorrect.

The microinstruction control unit 24 operates in segment S2 of the pipeline and functions to supply to the execution unit 23 the next microinstruction to execute. If a macroinstruction requires the execution of more than one microinstruction, the microinstruction control unit 24 supplies each microinstruction in sequence based on directive included in the previous microinstruction. At macroinstruction boundaries, the microinstruction control unit 24 removes the next entry from the instruction queue 35, which includes the initial microinstruction address for the macroinstruction. If the instruction queue 35 is empty, the microinstruction control unit 24 supplies the address of the no-op microinstruction. The microinstruction control unit 24 also evaluates all exception requests, and provides a pipeline flush control signal to the execution unit 23. For certain exceptions and interrupts, the microinstruction control unit 24 injects the address of an appropriate microinstruction handler that is used to respond to the event.

The execution unit 23 executes all of the non-floating point instructions, delivers operands to and receives results from the floating point unit 27 via buses 47, 48 and 49, and handles non-instruction events such as interrupts and exceptions. The execution unit 23 is distributed through segments S3, S4 and S5 of the pipeline; S3 includes operand access, including read of the register file 41; S4 includes ALU 45 and shifter 46 operation, RMUX 50 request; and S5 includes RMUX 50 completion, write to register file 41, completion of memory management unit 25 request. For the most part, instruction operands are prefetched by the instruction unit 22, and addressed indirectly through the source queue 37. The source queue 37 contains the operand itself for short literal specifiers, and a pointer to an entry in the register file 41 for other operand types.

An entry in a field queue 71 is made when a field-type specifier entry is made into the source queue 37. The field queue 71 provides microbranch conditions that allow the microinstruction control unit 42 to determine if a fieldtype specifier addresses either a GPR or memory. A microbranch on a valid field queue entry retires the entry from the queue.

The register file 41 is divided into four parts: the general processor registers (GPRs), memory data (MD) registers, working registers, and CPU state registers. For a register-mode specifier, the source queue 37 points to the appropriate GPR in the register file 41, or for short literal mode the queue contains the operand itself; for the other specifier modes, the source queue 37 points to an MD register containing the address of the specifier (or address of the address of the operand, etc.). The MD Register is either written directly by the instruction unit 22, or by the memory management unit 25 as the result of a memory read generated by the instruction unit 22.

In the S3 segment of the execution unit 23 pipeline, the appropriate operands for the execution unit 23 and floating point unit 27 execution of instructions are selected. Operands are selected onto ABUS and BBUS for use in both the execution unit 23 and floating point unit 27. In most instances, these operands come from the register file 41, although there are other data path sources of non-instruction operands (such as the PSL).

The execution unit 23 computation is done by the ALU 45 and the shifter 46 in the S4 segment of the pipeline on operands supplied by the S3 segment. Control of these units is supplied by the microinstruction which was originally supplied to the S3 segment by the control store 43, and then subsequently moved forward in the microinstruction pipeline.

The S4 segment also contains the Rmux 50 which selects results from either the execution unit 23 or floating point unit 27 and performs the appropriate register or memory operation. The Rmux inputs come from the ALU 45, shifter 46, and floating point unit 27 result bus 49 at the end of the cycle. The Rmux 50 actually spans the S4/S5 boundary such that its outputs are valid at the beginning of the S5 segment. The Rmux 50 is controlled by the retire queue 72, which specifies the source (either execution unit 23 or floating point unit 27) of the result to be processed (or retired) next. Non-selected Rmux sources are delayed until the retire queue 72 indicates that they should be processed. The retire queue 72 is updated from the order of operations in the instructions of the instruction stream.

As the source queue 37 points to instruction operands, so the destination queue 38 points to the destination for instruction results. If the result is to be stored in a GPR, the destination queue 38 contains a pointer to the appropriate GPR. If the result is to be stored in memory, the destination queue 38 indicates that a request is to be made to the memory management unit 25, which contains the physical address of the result in the PA queue 56. This information is supplied as a control input to the Rmux 50 logic.

Once the Rmux 50 selects the appropriate source of result information, it either requests memory management unit 25 service, or sends the result onto the write bus 73 to be written back the register file 41 or to other data path registers in the S5 segment of the pipeline. The interface between the execution unit 23 and memory management unit 25 for all memory requests is the EM-latch 74, which contains control information and may contain an address, data, or both, depending on the type of request. In addition to operands and results that are prefetched by the instruction unit 22, the execution unit 23 can also make explicit memory requests to the memory management unit 25 to read or write data.

The floating point unit 27 executes all of the floating point instructions in the instruction set, as well as the longword-length integer multiply instructions. For each instruction that the floating point unit 27 is to execute, it receives from the microinstruction control unit 24 the opcode and other instruction-related information. The floating point unit 27 receives operand data from the execution unit 23 on buses 47 and 48. Execution of instructions is performed in a dedicated floating point unit 27 pipeline that appears in segment S4 of FIG. 7, but is actually a minimum of three cycles in length. Certain instructions, such as integer multiply, may require multiple passes through some segments of the floating point unit 27 pipeline. Other instructions, such as divided, are not pipelined at all. The floating point unit 27 results and status are returned in S4 via result bus 49 to the Rmux 50 in the execution unit 23 for retirement. When an Fbox instruction is next to retire as defined by the retire queue 72, the Rmux 50, as directed by the destination queue 38, sends the results to either the GPRs for register destinations, or to the memory management unit 25 for memory destinations.

The memory management unit 25 operates in the S5 and S6 segments of the pipeline, and handles all memory references initiated by the other sections of the chip. Requests to the memory management unit 25 can come from the instruction unit 22 (for virtual instruction cache 17 fills and for specifier references), from the execution unit 23 or floating point unit 27 via the Rmux 50 and the EM-latch 74 (for instruction result stores and for explicit execution unit 23 memory request), from the memory management unit 25 itself (for translation buffer fills and PW reads), or from the cache controller unit 26 (for invalidates and cache fills). All virtual references are translated to a physical address by the TB or translation buffer 64, which operates in the S5 segment of the pipeline. For instruction result references generated by the instruction unit 22, the translated address is stored in the physical address queue 56 (PA queue). These addresses are later matched with data from the execution unit 23 or floating point unit 27, when the result is calculated.

The cache controller unit 26 maintains and accesses the backup cache 15, and controls the off-chip bus (the CPU bus 20). The cache controller unit 26 receives input (memory requests) from the memory management unit 25 in the S6 segment of the pipeline, and usually takes multiple cycles to complete a request. For this reason, the cache controller unit 26 is not shown in specific pipeline segments. If the memory read misses in the Primary cache 14, the request is sent to the cache controller unit 26 for processing. The cache controller unit 26 first looks for the data in the Backup cache 15 and fills the block in the Primary cache 14 from the Backup cache 15 if the data is present. If the data is not present in the Backup cache 15, the cache controller unit 26 requests a cache fill on the CPU bus 20 from memory 12. When memory 12 returns the data, it is written to both the Backup cache 15 and to the Primary cache 14 (and potentially to the virtual instruction cache 17). Although Primary cache 14 fills are done by making a request to the memory management unit 25 pipeline, data is returned to the original requester as quickly as possible by driving data directly onto the data bus 75 and from there onto the memory data bus 54 as soon as the bus is free.

Despite the attempts at keeping the pipeline of FIG. 6 flowing smoothly, there are conditions which cause segments of the pipeline to stall. Conceptually, each segment of the pipeline can be considered as a black box which performs three steps every cycle:

(1) The task appropriate to the pipeline segment is performed, using control and inputs from the previous pipeline segment. The segment then updates local state (within the segment), but not global state (outside of the segment).

(2) Just before the end of the cycle, all segments send stall conditions to the appropriate state sequencer for that segment, which evaluates the conditions and determines which, if any, pipeline segments must stall.

(3) If no stall conditions exist for a pipeline segment, the state sequencer allows it to pass results to the next segment and accept results from the previous segment. This is accomplished by updating global state.

The sequence of steps maximizes throughout by allowing each pipeline segment to assume that a stall will not occur (which should be the common case). If a stall does occur at the end of the cycle, global state updates are blocked, and the stalled segment repeats the same task (with potentially different inputs) in the next cycle (and the next, and the next) until the stall condition is removed. This description is over-simplified in some cases because some global state must be updated by a segment before the stall condition is known. Also, some tasks must be performed by a segment once and only once. These are treated specially on a case-by-case basis in each segment.

Within a particular section of the chip, a stall in one pipeline segment also causes stalls in all upstream segments (those that occur earlier in the pipeline) of the pipeline. Unlike the system of U.S. Pat. No. 4,875,160, stalls in one segment of the pipeline do not cause stalls in downstream segments of the pipeline. For example, a memory data stall in that system also caused a stall of the downstream ALU segment. In the CPU 10, a memory data stall does not stall the ALU segment (a no-op is inserted into the S5 segment when S4 advances to S5).

There are a number of stall conditions in the chip which result in a pipeline stall. Each is discussed briefly below.

In the S0 and S1 segments of the pipeline, stalls can occur only in the instruction unit 22. In S0, there is only one stall that can occur:

(1) Prefetch queue 32 full: In normal operation, the virtual instruction cache 17 is accessed every cycle using the address in VIBA 65, the data is sent to the prefetch queue 32, and VIBA 65 is incremented. If the prefetch queue 32 is full, the increment of VIBA is blocked, and the data is referenced in the virtual instruction cache 17 each cycle until there is room for it in the prefetch queue 32. At that point, prefetch resumes.

In the S1 segment of the pipeline there are seven stalls that can occur in the instruction unit 22:

(1) Insufficient data in the prefetch queue 32: The burst unit 33 attempts to decode the next instruction component each cycle. If there are insufficient prefetch queue 32 bytes valid to decode the entire component, the burst unit 33 stalls until the required bytes are delivered from the virtual instruction cache 17.

(2) Source queue 37 or destination queue 38 full: During specifier decoding, the source and destination queue allocation logic must allocate enough entries in each queue to satisfy the requirements of the specifier being parsed. To guarantee that there will be sufficient resources available, there must be at least two free source queue entries and two free destination queue entries to complete the burst of the specifier. If there are insufficient free entries in either queue, the burst unit 33 stalls until free entries become available.

(3) MD file full: When a complex specifier is decoded, the source queue 37 allocation logic must allocate enough memory data registers in the register file 41 to satisfy the requirements of the specifier being parsed. To guarantee that there will be sufficient resources available, there must be at least two free memory data registers available in the register file 41 to complete the burst of the specifier. If there are insufficient free registers, the burst unit 33 stalls until enough memory data registers become available.

(4) Second conditional branch decoded: The branch prediction unit 39 predicts the path that each conditional branch will take and redirects the instruction stream based on that prediction. It retains sufficient state to restore the alternate path if the prediction was wrong. If a second conditional branch is decoded before the first is resolved by the execution unit 23, the branch prediction unit 39 has nowhere to store the state, so the burst unit 33 stalls until the execution unit 23 resolves the actual direction of the first branch.

(5) Instruction queue full: When a new opcode is decoded by the burst unit 33, the issue unit 68 attempts to add an entry for the instruction to the instruction queue 35. If there are no free entries to the instruction queue 35, the burst unit 33 stalls until a free entry becomes available, which occurs when an instruction is retired through the Rmux 50.

(6) Complex specifier unit busy: If the burst unit 33 decodes an instruction component that must be processed by the pipeline of the complex specifier unit 40, it makes a request for service by the complex specifier unit 40 through an S1 request latch. If this latch is still valid from a previous request for service (either due to a multi-cycle flow or a complex specifier unit 40 stall), the burst unit 33 stalls until the valid bit in the request latch is cleared.

(7) Immediate data length not available: The length of the specifier extension for immediate specifiers is dependent on the data length of the specifier for that specific instruction. The data length information comes from the instruction ROM/PLA table 66 which is accessed based on the opcode of the instruction. If the table 66 access is not complete before an immediate specifier is decoded (which would have to be the first specifier of the instruction), the burst unit 33 stalls for one cycle.

In the S2 segment of the pipeline, stalls can occur in the instruction unit 22 or microcode controller 24. In the instruction unit 22 two stalls can occur:

(1) Outstanding execution unit 23 or floating point unit 27 GPR write: In order to calculate certain specifier memory addresses, the complex specifier unit 40 must read the contents of a GPR from the register file 41. If there is a pending execution unit 23 or floating point unit 27 write to the register, the instruction unit 22 GPR scoreboard prevents the GPR read by stalling the S2 segment of the pipeline of the complex specifier unit 40. The stall continues until the GPR write completes.

(2) Memory data not valid: For certain operations, the instruction unit 22 makes an memory management unit 25 request to return data which is used to complete the operation (e.g., the read done for the indirect address of a displacement deferred specifier). The instruction unit 22 MD register contains a valid bit which is cleared when a request is made, and set when data returns in response to the request. If the instruction unit 22 references the instruction unit 22 MD register when the valid bit is off, the S2 segment of the pipeline of the complex specifier unit 40 stalls until the data is returned by the memory management unit 25.

In the microcode controller 24, one stall can occur during the S2 segment:

(1) Instruction queue empty: The final microinstruction of an execution flow of a macroinstruction is indicated in the execution unit 23 when a last-cycle microinstruction is decoded by the microinstruction control unit 24. In response to this event, the execution unit 23 expects to receive the first microinstruction of the next macroinstruction flow based on the initial address in the instruction queue 35. If the instruction queue 35 is empty, the microinstruction control unit 24 supplies the instruction queue stall microinstruction in place of the next macroinstruction flow. In effect, this stalls the microinstruction control unit 24 for one cycle.

In the S3 segment of the pipeline, stalls can occur in the instruction unit 22, in the execution unit 23 or in either execution unit 23 or instruction unit 22. In the instruction unit 22, there are three possible S3 stalls:

(1) Outstanding execution unit 23 GPR read: In order to complete the processing for auto-increment, auto-decrement, and auto-increment deferred specifiers, the complex specifier unit 40 must update the GPR with the new value. If there is a pending execution unit 23 read to the register through the source queue 37, the instruction unit 22 scoreboard prevents the GPR write by stalling the S3 segment of the pipeline of the complex specifier unit 40. The stall continues until the execution unit 23 reads the GPR.

(2) Specifier queue full: For most complex specifiers, the complex specifier unit 40 makes a request for memory management unit 25 service for the memory request required by the specifier. If there are no free entries in a specifier queue 75, the S3 segment of the pipeline of the complex specifier unit 40 stalls until a free entry becomes available.

(3) RLOG full: Auto-increment, auto-decrement, and auto-increment deferred specifiers require a free register log (RLOG) entry in which to log the change to the GPR. If there are no free RLOG entries when such a specifier is decoded, the S3 segment of the pipeline of the complex specifier unit 40 stalls until a free entry becomes available.

In the execution unit 23, four stalls can occur in the S3 segment:

(1) Memory read data not valid: In some instances, the execution unit 23 may make an explicit read request to the memory management unit 25 to return data in one of the six execution unit 23 working registers in the register file 41. When the request is made, the valid bit on the register is cleared. When the data is written to the register, the valid bit is set. If the execution unit 23 references the working register in the register file 41 when the valid bit is clear, the S3 segment of the execution unit 23 pipeline stalls until the entry becomes valid.

(2) Field queue not valid: For each macroinstruction that includes a field-type specifier, the microcode microbranches on the first entry in the field queue 71 to determine whether the field specifier addresses a GPR or memory. If the execution unit 23 references the working register when the valid bit is clear, the S3 segment of the execution unit 23 pipeline stalls until the entry becomes valid.

(3) Outstanding Fbox GPR write: Because the floating point unit 27 computation pipeline is multiple cycles long, the execution unit 23 may start to process subsequent instructions before the floating point unit 27 completes the first. If the floating point unit 27 instruction result is destined for a GPR in the register file 41 that is referenced by a subsequent execution unit 23 microword, the S3 segment of the execution unit 23 pipeline stalls until the floating point unit 27 write to the GPR occurs.

(4) Fbox instruction queue full: When an instruction is issued to the floating point unit 27, an entry is added to the floating point unit 27 instruction queue. If there are no free entries in the queue, the S3 segment of the execution unit 23 pipeline stalls until a free entry becomes available.

Two stalls can occur in either execution unit 23 or floating point unit 27 in S3:

(1) Source queue empty: Most instruction operands are prefetched by the instruction unit 22, which writes a pointer to the operand value into the source queue 37. The execution unit 23 then references up to two operands per cycle indirectly through the source queue 37 for delivery to the execution unit 23 or floating point unit 27. If either of the source queue entries referenced is not valid, the S3 segment of the execution unit 23 pipeline stalls until the entry becomes valid.

(2) Memory operand not valid: Memory operands are prefetched by the instruction unit 22, and the data is written by the either the memory management unit 25 or instruction unit 22 into the memory data registers in the register file 41. If a referenced source queue 37 entry points to a memory data register which is not valid, the S3 segment of the execution unit 23 pipeline stalls until the entry becomes valid.

In segment S4 of the pipeline, two stalls can occur in the execution unit 23, one in the floating point unit 27, and four in either execution unit 23 or floating point unit 27. In the execution unit 23:

(1) Branch queue empty: When a conditional or unconditional branch is decoded by the instruction unit 22, an entry is added to the branch queue 70. For conditional branch instructions, the entry indicates the instruction unit 22 prediction of the branch direction. The branch queue is referenced by the execution unit 23 to verify that the branch displacement was valid, and to compare the actual branch direction with the prediction. If the branch queue entry has not yet been made by the instruction unit 22, the S4 segment of the execution unit 23 pipeline stalls until the entry is made.

(2) Fbox GPR operand scoreboard full: The execution unit 23 implements a register scoreboard to prevent the execution unit 23 from reading a GPR to which there is an outstanding write by the floating point unit 27. For each floating point unit 27 instruction which will write a GPR result, the execution unit 23 adds an entry to the floating point unit 27 GPR scoreboard. If the scoreboard is full when the execution unit 23 attempts to add an entry, the S4 segment of the execution unit 23 pipeline stalls until a free entry becomes available.

In the floating point unit 27, one stall can occur in S4:

(1) Fbox operand not valid: Instructions are issued to the floating point unit 27 when the opcode is removed from the instruction 35 queue by the microinstruction control unit 24. Operands for the instruction may not arrive via busses 47, 48 until some time later. If the floating point unit 27 attempts to start the instruction execution when the operands are not yet valid, the floating point unit 27 pipeline stalls until the operands become valid.

In either the execution unit 23 or floating point unit 27, these four stalls can occur in pipeline segment S4:

(1) Destination queue empty: Destination specifiers for instructions are processed by the instruction unit 22, which writes a pointer to the destination (either GPR or memory) into the destination queue 38. The destination queue 38 is referenced in two cases: When the execution unit 23 or floating point unit 27 store instruction results via the Rmux 50, and when the execution unit 23 tries to add the destination of floating point unit 27 instructions to the execution unit 23 GPR scoreboard. If the destination queue entry is not valid (as would be the case if the instruction unit 22 has not completed processing the destination specifier), a stall occurs until the entry becomes valid.

(2) PA queue empty: For memory destination specifiers, the instruction unit 22 sends the virtual address of the destination to the memory management unit 25, which translates it and adds the physical address to the PA queue 56. If the destination queue 38 indicates that an instruction result is to be written to memory, a store request is made to the memory management unit 25 which supplies the data for the result. The memory management unit 25 matches the data with the first address in the PA queue 56 and performs the write. If the PA queue is not valid when the execution unit 23 or floating point unit 27 has a memory result ready, the Rmux 50 stalls until the entry becomes valid. As a result, the source of the Rmux input (execution unit 23 or floating point unit 27) also stalls.

(3) EM-latch full: All implicit and explicit memory requests made by the execution unit 23 or floating point unit 27 pass through the EM-latch 74 to the memory management unit 25. If the memory management unit 25 is still processing the previous request when a new request is made, the Rmux 30 stalls until the previous request is completed. As a result, the source of the Rmux 50 input (execution unit 23 or floating point unit 27) also stalls.

(4) Rmux selected to other source: Macroinstructions must be completed in the order in which they appear in the instruction stream. The execution unit 23 retire queue 72 determines whether the next instruction to complete comes from the execution unit 23 or the floating point unit 27. If the next instruction should come from one course and the other makes a Rmux 50 request, the other source stalls until the retire queue indicates that the next instruction should come from that source.

In addition to stalls, pipeline flow can depart from the ideal by "exceptions". A pipeline exception occurs when a segment of the pipeline detects an event which requires that the normal flow of the pipeline be stopped in favor of another flow. There are two fundamental types of pipeline exceptions: those that resume the original pipeline flow once the exception is corrected, and those that require the intervention of the operating system. A miss in the translation buffer 55 on a memory reference is an example of the first type, and an access control (memory protection) violation is an example of the second type.

Restartable exceptions are handled entirely within the confines of the section that detected the event. Other exceptions must be reported to the execution unit 23 for processing. Because the CPU 10 is macropipelined, exceptions can be detected by sections of the pipeline long before the instruction which caused the exception is actually executed by the execution unit 23 or floating point unit 27. However, the reporting of the exception is deferred until the instruction is executed by the execution unit 23 or floating point unit 27. At that point, an execution unit 23 handler is invoked to process the event.

Because the execution unit 23 and floating point unit 27 are micropipelined, the point at which an exception handler is invoked must be carefully controlled. For example, three macroinstructions may be in execution in segments S3, S4 and S5 of the execution unit 23 pipeline. If an exception is reported for the macroinstruction in the S3 segment, the two macroinstructions that are in the S4 and S5 segments must be allowed to complete before the exception handler is invoked.

To accomplish this, the S4/S5 boundary in the execution unit 23 is defined to be the commit point for a microinstruction. Architectural state is not modified before the beginning of the S5 segment of the pipeline, unless there is some mechanism for restoring the original state if an exception is detected (the instruction unit 22 RLOG is an example of such a mechanism.) Exception reporting is deferred until the microinstruction to which the event belongs attempts to cross the S4/S5 boundary. At that point, the exception is reported and an exception handler is invoked. By deferring exception reporting to this point, the previous microinstruction (which may belong to the previous macroinstruction) is allowed to complete.

Most exceptions are reported by requesting a microtrap from the microinstruction control unit 24. When the microinstruction control unit 24 receives a microtrap request, it causes the execution unit 23 to break all its stalls, aborts the execution unit 23 pipeline, and injects the address of a handler for the event into an address latch for the control store 43. This starts an execution unit 23 microcode routine which will process the exception as appropriate. Certain other kinds of exceptions are reported by simply injecting the appropriate handler address into the control store 43 at the appropriate point.

In the CPU 10 exceptions are of two types: faults and traps. For both types, the microcode handler for the exception causes the instruction unit 22 to back out all GPR modifications that are in the RLOG, and retrieves the PC from the PC queue. For faults, the PC returned is the PC of the opcode of the instruction which caused the exception. For traps, the PC returned is the PC of the opcode of the next instruction to execute. The microcode then constructs the appropriate exception frame on the stack, and dispatches to the operating system through an appropriate vector.

The Instruction Unit (I-box)

Figure 8:
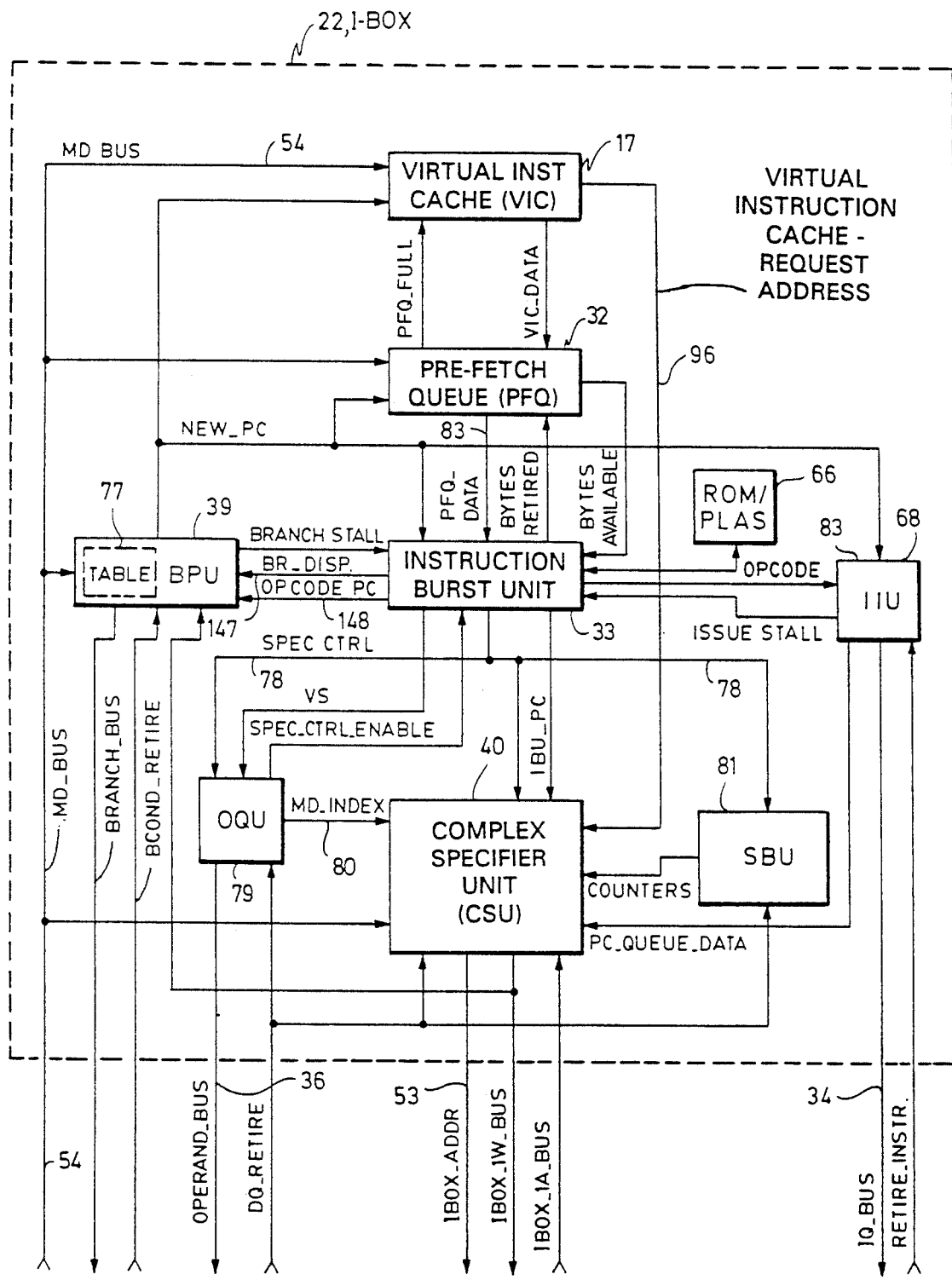
FIG. 8 is an electrical diagram in block form of the instruction unit of the CPU of FIG. 1.

Referring to FIG. 8, the instruction unit 22 is shown in more detail. The instruction unit 22 functions to fetch, parse and process the instruction stream, attempting to maintain a constant supply of parsed macroinstructions available to the execution unit 23 for execution. The pipelined construction of the CPU 10 allows multiple macroinstructions to reside within the CPU at various stages of execution, as illustrated in FIG. 6. The instruction unit 22, running semi-autonomously to the execution unit 23, parses the macroinstructions following the instruction that is currently executing in the execution unit 23. Improved performance is obtained when the time for parsing in the instruction unit 22 is hidden during the execution time in the execution unit 23 of an earlier instruction. The instruction unit 22 places into the queues 35, 37 and 38 the information generated while parsing ahead in the instruction stream. The instruction queue 35 contains instruction-specific information including the opcode (one or two bytes), a flag indicating floating point instruction, and an entry point for the microinstruction sequencer 42. The source queue 37 contains information about each one of the source operands for the instructions in the instruction queue 35, including either the actual operand (as in a short literal contained in the instruction stream itself) or a pointer to the location of the operand. The destination queue 38 contains information required for the execution unit 23 to select the location for storage of the results of execution. These three queues allow the instruction unit 22 to work in parallel with the execution unit 23; as the execution unit 23 consumes the entries in the queues, the instruction unit 22 parses ahead adding more—in the ideal case, the instruction unit 22 would stay far enough ahead of the execution unit 23 such that the execution unit 23 would never have to stall because of an empty queue.

The instruction unit 22 needs access to memory for instruction and operand data; requests for this data are made by the instruction unit 22 through a common port, read-request bus 53, sending addresses to the memory management unit 25. All data for both the instruction unit 22 and execution unit 23 is returned on the shared memory data bus 54. The memory management unit 25 contains queues to smooth the memory request traffic over time. A specifier request latch or spec-queue 75 holds requests from the instruction unit 22 for operand data, and the instruction request latch or I-ref latch 76 holds requests from the instruction unit 22 for instruction stream data; these two latches allow the instruction unit 22 to issue memory requests via bus 53 for both instruction and operand data even though the memory management unit 25 may be processing other requests.

The instruction unit 22 supports four main functions: instruction stream prefetching, instruction parsing, operand specifier processing and branch prediction. Instruction stream prefetching operates to provide a steady source of instruction stream data for instruction parsing. While the instruction parsing circuitry works on one instruction, the instruction prefetching circuitry fetches several instructions ahead. The instruction parsing function parses the incoming instruction stream, identifying and beginning the processing of each of the instruction's components - opcode, specifiers, etc. Opcodes and associated information are passed directly into the instruction queue 35 via bus 36. Operand specifier information is passed on to the circuitry which locates the operands in register file 41, in memory (cache or memory 12), or in the instruction stream (literals), and places the information in the queues 37 and 38 and makes the needed memory requests via bus 53 and spec-queue 75. When a conditional branch instruction is encountered, the condition is not known until the instruction reaches the execution unit 23 and all of the condition codes are available, so when in the instruction unit 22 it is not known whether the branch will be taken or not taken. For this reason, branch prediction circuitry 39 is employed to select the instruction stream path to follow when each conditional branch is encountered. A branch history table 77 is maintained for every conditional branch instruction of the instruction set, with entries for the last four occurrences of each conditional branch indicating whether the branch was taken or not taken. Based upon this history table 77, a prediction circuit 78 generates a "take" or "not take" decision when a conditional branch instruction is reached, and begins a fetch of the new address, flushing the instructions already being fetched or in the instruction cache if the branch is to be taken. Then, after the instruction is executed in the execution unit 23, the actual take or not take decision is updated in the history table 77.

The spec-control bus 78 is applied to a complex specifier unit 40, which is itself a processor containing a microsequencer and an ALU and functioning to manipulate the contents of registers in the register file 45 and access memory via the memory data bus 54 to produce the operands subsequently needed by the execution unit to carry out the macroinstruction. The spec-control bus 78 is also applied to an operand queue unit 69 which handles "simple" operand specifiers by passing the specifiers to the source and destination queues 37 and 38 via bus 36; these simple operands include literals (the operand is present in the instruction itself) or register mode specifiers which contain a pointer to one of the registers of the register file 41. For complex specifiers the operand queue unit 79 sends an index on a bus 80 to the complex specifier unit 40 to define the first one of the memory data registers of the register file 41 to be used as a destination by the complex specifier unit 40 in calculating the specifier value. The operand queue unit 79 can send up to two source queue 37 entries and two destination queue entries by the bus 36 in a single cycle. The spec-control bus 78 is further coupled to a scoreboard unit 81 which keeps track of the number of outstanding references to general purpose registers in the register file 41 contained in the source and destination queues 37 and 38; the purpose is to prevent writing to a register to which there is an outstanding read, or reading from a register for which there is an outstanding write. When a specifier is retired, the execution unit 23 sends information on which register to retire by bus 82 going to the complex specifier unit 40, the operand queue unit 79 and the scoreboard unit 81. The content of the spec-control bus 78 for each specifier includes the following: identification of the type of specifier; data if the specifier is a short literal; the access type and data length of the specifier; indication if it is a complex specifier; a dispatch address for the control ROM in the complex specifier unit 40. The instruction burst unit 33 derives this information from a new opcode accepted from the prefetch queue 32 via lines 83, which produces the following information: the number of specifiers for this instruction; identification of a branch displacement and its size, access type and data length for each one of up to six specifiers, indication if this is an floating point unit 27 instruction, dispatch address for the control ROM 43, etc. Each cycle, the instruction burst unit 33 evaluates the following information to determine if an operand specifier is available and how many prefetch queue 32 bytes should be retired to get to the next opcode or specifier: (1) the number of prefetch queue 32 bytes available, as indicated by a value of 1-to-6 provided by the prefetch queue 32; (2) the number of specifiers left to be parsed in the instruction stream for this instruction, based on a running count kept by the instruction burst unit 33 for the current instruction; (3) the data length of the next specifier; (4) whether the complex specifier unit 40 (if being used for this instruction) is busy; (5) whether data-length information is available yet from the table 66; etc.

Some instructions have one- or two-byte branch displacements, indicated from opcode-derived outputs from the table 66. The branch displacement is always the last piece of data for an instruction and is used by the branch prediction unit 39 to compute the branch destination, being sent to the unit 39 via busses 22bs and 22bq. A branch displacement is processed if the following conditions are met: (1) there are no specifiers left to be processed; (2) the required number of bytes (one or two) is available in the prefetch queue 32, (3) branch-stall is not asserted, which occurs when a second conditional branch is received before the first one is cleared.

Referring to FIG. 9, the complex specifier unit 40 is shown in more detail. The complex specifier unit 40 is a three-stage (S1, S2, S3) microcoded pipeline dedicated to handling operand specifiers which require complex processing and/or access to memory. It has read and write access to the register file 41 and a port to the memory management unit 25. Memory requests are received by the complex specifier unit 40 and forwarded to the memory management unit 25 when there is a cycle free of specifier memory requests; i.e., operand requests for the current instructions are attempted to be completed before new instructions are fetched. The complex specifier unit 40 contains an ALU 84 which has A and B input busses 85 and 86, and has an output bus 87 writing to the register file 41 in the execution unit 23; all of these data paths are 32-bit. The A and B inputs are latched in S3 latches 88, which are driven during S2 by outputs 89 and 90 from selectors 91 and 92. These selectors receive data from the spec-data bus 78, from the memory data bus 54, from the register file 41 via bus 93, the output bus 87 of the ALU 84, the PC via line 95, the virtual instruction cache 17 request bus 96, etc. Some of these are latched in S2 latches 97. The instruction unit 22 address output 53 is produced by a selector 98 receiving the ALU output 87, the virtual instruction cache 17 request 96 and the A bus 85. The operations performed in the ALU 84 and the selections made by the selectors 91, 92 and 98 are controlled by a microsequencer including a control store 100 which produces a 29-bit wide microword on bus 101 in response to a microinstruction address on input 102. The control store contains 128 words, in one example. The microword is generated in S1 based upon an address on input 102 from selector 103, and latched into pipeline latches 104 and 105 during S2 and S3 to control the operation of the ALU 84, etc.

The instruction unit 22 performs its operations in the first four segments of the pipeline, S0-S4. In S0, the virtual instruction cache 17 is accessed and loaded to the prefetch queue 32; the virtual instruction cache 17 attempt to fill the prefetch queue 32 with up to eight bytes of instruction stream data. It is assumed that the virtual instruction cache 17 has been previously loaded with instruction stream blocks which include the sequential instructions needed to fill the prefetch queue 32. In S1, the instruction burst unit 33 parses, i.e., breaks up the incoming instruction data into opcodes, operand specifiers, specifier extensions, and branch displacements and passes the results to the other parts of the instruction unit 22 for further processing, then the instruction issue unit 68 takes the opcodes provided by the instruction issue unit 83 and generates microcode dispatch addresses and other information needed by the microinstruction unit 24 to begin instruction execution. Also in S1, the branch prediction unit 39 predicts whether or not branches will be taken and redirects instruction unit 22 instruction processing as necessary, the operand queue unit 79 produces output on bus 36 to the source and destination queues 37 and 38, and the scoreboard unit 81 keeps track of outstanding read and write references to the GPRs in the register file 41. In the complex specifier unit 40, the microsequencer accesses the control store 100 to produce a microword on lines 101 in S1. In the S2 pipe stage, the complex specifier unit 40 performs its read operation, accessing the necessary registers in register file 41, and provides the data to its ALU 84 in the next pipe stage. Then in the S3 stage, the ALU 84 performs its operation and writes the result either to a register in the register file 41 or to local temporary registers; this segment also contains the interface to the memory management unit 25—requests are sent to the memory management unit 25 for fetching operands as needed (likely resulting in stalls while waiting for the data to return).

The Virtual Instruction Cache (VIC)

Referring to FIG. 10, the virtual instruction cache 17 is shown in more detail. The virtual instruction cache 17 includes a 2 Kbyte data memory 106 which also stores 64 tags. The data memory is configured as two blocks 107 and 108 of thirty-two rows. Each block 107, 108 is 256-bits wide so it contains one hexaword of instruction stream data (four quadwords). A row decoder 109 receives bits <9:5> of the virtual address from the VIBA register 65 and selects 1-of-32 indexes 110 (rows) to output two hexawords of instruction stream data on column lines 111 from the memory array. Column decoders 112 and 113 select 1-of-4 based on bits <4:3> of the virtual address. So, in each cycle, the virtual instruction cache 17 selects two hexaword locations to output on busses 114 and 115. The two 22-bit tags from tag stores 116 and 117 selected by the 1-of-32 row decoder 109 are output on lines 118 and 119 for the selected index and compared to bits <31:10> of the address in the VIBA register 65 by tag compare circuits 120 and 121. If either tag generates a match, a hit is signalled on line 122, and the quadword is output on bus 123 going to the prefetch queue 32. If a miss is signalled (cache-hit not asserted on 122) then a memory reference is generated by sending the VIBA address to the address bus 53 via bus 96 and the complex specifier unit 40 as seen in FIG. 8; the instruction stream data is thus fetched from cache, or if necessary, an exception is generated to fetch instruction stream data from memory 12. After a miss, the virtual instruction cache 17 is filled from the memory data bus 54 by inputs 124 and 125 to the data store blocks via the column decoders 112 and 113, and the tag stores are filled from the address input via lines 126 and 127. After each cache cycle, the VIBA 65 is incremented (by +8, quadword granularity) via path 128, but the VIBA address is also saved in register 129 so if a miss occurs the VIBA is reloaded and this address is used as the fill address for the incoming instruction stream data on the MD bus 54. The virtual instruction cache 17 controller 130 receives controls from the prefetch queue 32, the cache hit signal 122, etc., and defines the cycle of the virtual instruction cache 17.

The Prefetch Queue (PFQ)

Figure 11:
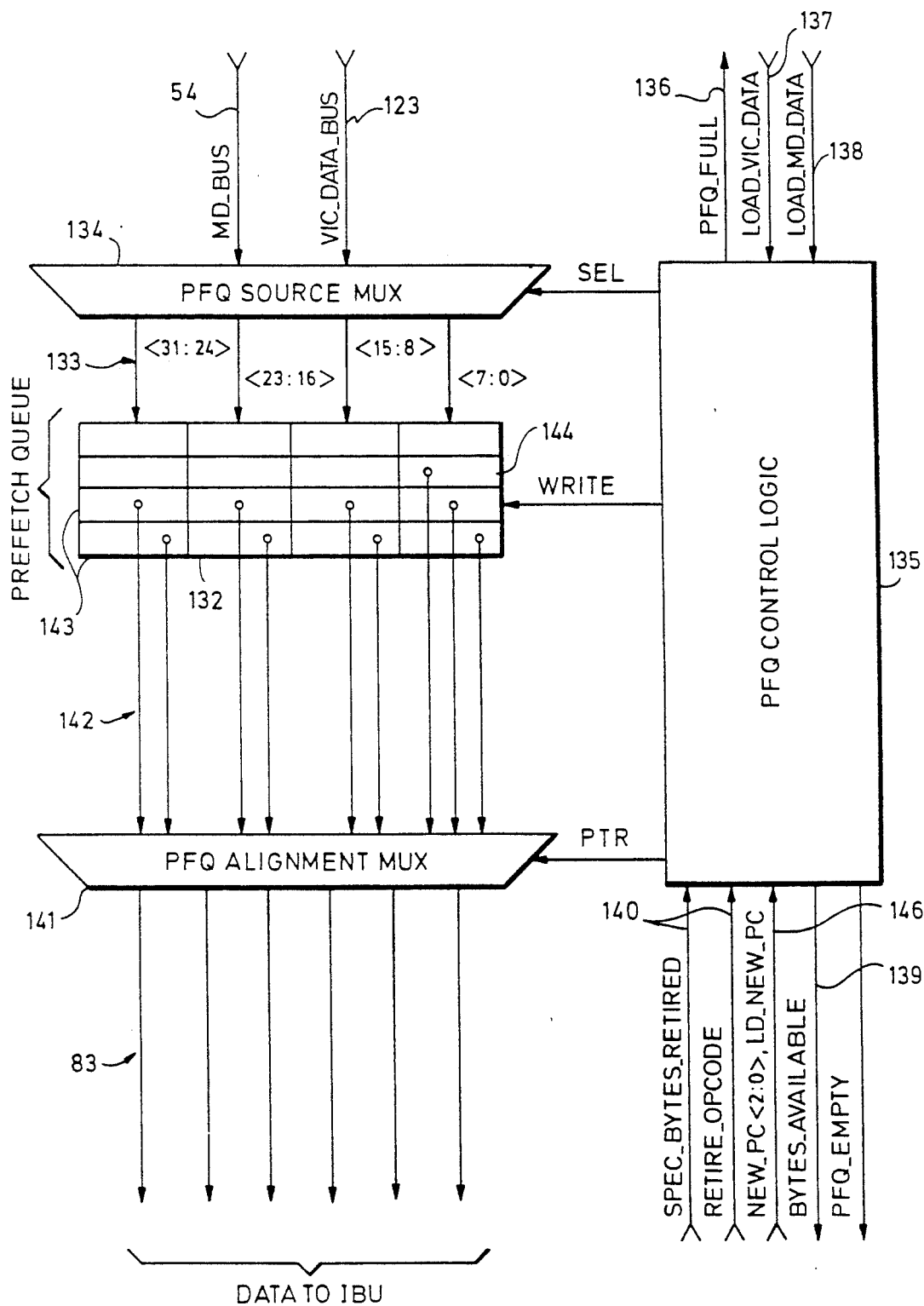
FIG. 11 is an electrical diagram in block form of the prefetch queue used in the CPU of FIG. 1.

Referring to FIG. 11, the prefetch queue 32 is shown in more detail. A memory array 132 holds four longwords, arranged four bytes by four bytes. The array 132 can accept four bytes of data in each cycle via lines 133 from a source multiplexer 134. The inputs to the multiplexer 134 are the memory data bus 54 and the virtual instruction cache 17 data bus 123. When the prefetch queue 32 contains insufficient available space to load another quadword of data from the virtual instruction cache 17 the prefetch queue 32 controller 135 asserts a pfq-full signal on the line 136 going to the virtual instruction cache 17. The virtual instruction cache 17 controls the supply of data to the prefetch queue 32, and loads a quadword each cycle unless the pfq-full line 136 is asserted. The controller 135 selects the virtual instruction cache 17 data bus 123 or the memory data bus 54 as the source, via multiplexer 134, in response to load-vic-data or load-md-data signals on lines 137 and 138 from the virtual instruction cache 17 controller 130. The prefetch queue 32 controller 135 determines the number of valid unused bytes of instruction stream data available for parsing and sends this information to the instruction burst unit 33 via lines 139. When the instruction burst unit 33 retires instruction stream data it signals the prefetch queue 32 controller 135 on lines 140 of the number of instruction stream opcode and specifier bytes retired. This information is used to update pointers to the array 132. The output of the array 132 is through a multiplexer 141 which aligns the data for use by the instruction burst unit 33; the alignment multiplexer 141 takes (on lines 142) the first and second longwords 143 and the first byte 144 from the third longword as inputs, and outputs on lines 83 six contiguous bytes starting from any byte in the first longword, based upon the pointers maintained in the controller 135. The prefetch queue 32 is flushed when the branch prediction unit 39 broadcasts a load-new-PC signal on line 146 and when the execution unit 23 asserts load-PC.

The instruction burst unit 33 receives up to six bytes of data from the prefetch queue 32 via lines 83 in each cycle, and identifies the component parts, i.e., opcodes, operand specifiers and branch displacements by reference to the table 66. New data is available to the instruction burst unit 33 at the beginning of a cycle, and the number of specifier bytes being retired is sent back to the prefetch queue 32 via lines 140 so that the next set of new data is available for processing by the next cycle. The component parts extracted by the instruction burst unit 33 from the instruction stream data are sent to other units for further processing; the opcode is sent to the instruction issue unit 83 and the branch prediction unit 39 on bus 147, and the specifiers, except for branch displacements, are sent to the complex specifier unit 40, the scoreboard unit 81 and the operand queue unit 79 via a spec-control bus 78. The branch displacement is sent to the branch prediction unit 39 via bus 148, so the new address can be generated if the conditional branch is to be taken.

Scoreboard Unit

Figure 12:
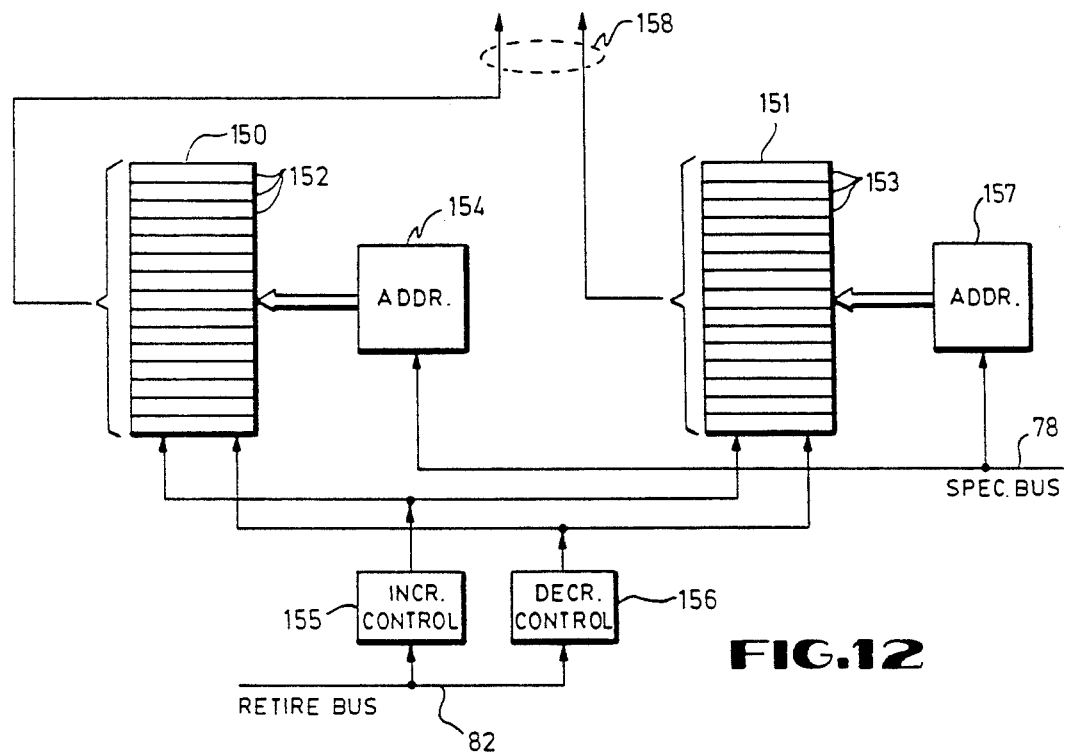
FIG. 12 is an electrical diagram in block form of the scoreboard unit used in the CPU of FIG. 1.

Referring to FIG. 12, the scoreboard unit 81 is shown in more detail. The scoreboard unit 81 keeps track of the number of outstanding references to GPRs in the source and destination queues 37 and 38. The scoreboard unit 81 contains two arrays of fifteen counters: the source array 150 for the source queue 37 and the destination array 151 for the destination queue 38. The counters 152 and 153 in the arrays 150 and 151 map one-to-one with the fifteen GPRs in the register file 41. There is no scoreboard counter corresponding to the PC. The maximum number of outstanding operand references determines the maximum count value for the counters 152, 153, and this value is based on the length of the source and destination queues. The source array counts up to twelve and the destination array counts up to six.

Each time valid register mode source specifiers appear on the spec-bus 78 the counters 152 in the source array 150 that correspond with those registers are incremented, as determined by selector 154 receiving the register numbers as part of the information on the bus 78. At the same time, the operand queue unit 79 inserts entries pointing to these registers in the source queue 37. In other words, for each register mode source queue entry, there is a corresponding increment of a counter 152 in the array 150, by the increment control 155. This implies a maximum of two counters incrementing each cycle when a quadword register mode source operand is parsed (each register in the register file 41 is 32-bits, and so a quadword must occupy two registers in the register file 41). Each counter 152 may only be incremented by one. When the execution unit 23 removes the source queue entries the counters 152 are decremented by decrement control 156. The execution unit 23 removes up to two register mode source queue entries per cycle as indicated on the retire bus 82. The GPR numbers for these registers are provided by the execution unit 23 on the retire bus 82 applied to the increment and decrement controllers 155 and 156. A maximum of two counters 152 may decrement each cycle, or any one counter may be decremented by up to two, if both register mode entries being retired point to the same base register.

In a similar fashion, when a new register mode destination specifier appears on spec-bus 78 the array 151 counter stage 153 that corresponds to that register of the register file 41, as determined by a selector 157, is incremented by the controller 155. A maximum of two counters 153 increment in one cycle for a quadword register mode destination operand. When the execution unit 23 removes a destination queue entry, the counter 153 is decremented by controller 156. The execution unit 23 indicates removal of a register mode destination queue entry, and the register number, on the retire bus 82.

Whenever a complex specifier is parsed, the GPR associated with that specifier is used as an index into the source and destination scoreboard arrays via selectors 154 and 157, and snapshots of both scoreboard counter values are passed to the Complex specifier unit 40 on bus 158. -Re Complex specifier unit 40 stalls if it needs to read a GPR for which the destination scoreboard counter value is non-zero. A non-zero destination counter 153 indicates that there is at least one pointer to that register in the destination queue 38. This means that there is a future execution unit 23 write to that register and that its current value is invalid. -Re Complex specifier unit 40 also stalls if it needs to write a GPR for which the source scoreboard counter value is non-zero. A non-zero source scoreboard value indicates that there is at least one pointer to that register in the source queue 37. This means that there is a future execution unit 23 read to that register and it contents must not be modified. For both scoreboards 150 and 151, the copies in the Complex specifier unit 40 pipe are decremented on assertion of the retire signals on bus 82 from the execution unit 23.

Branch Prediction

Figure 13:
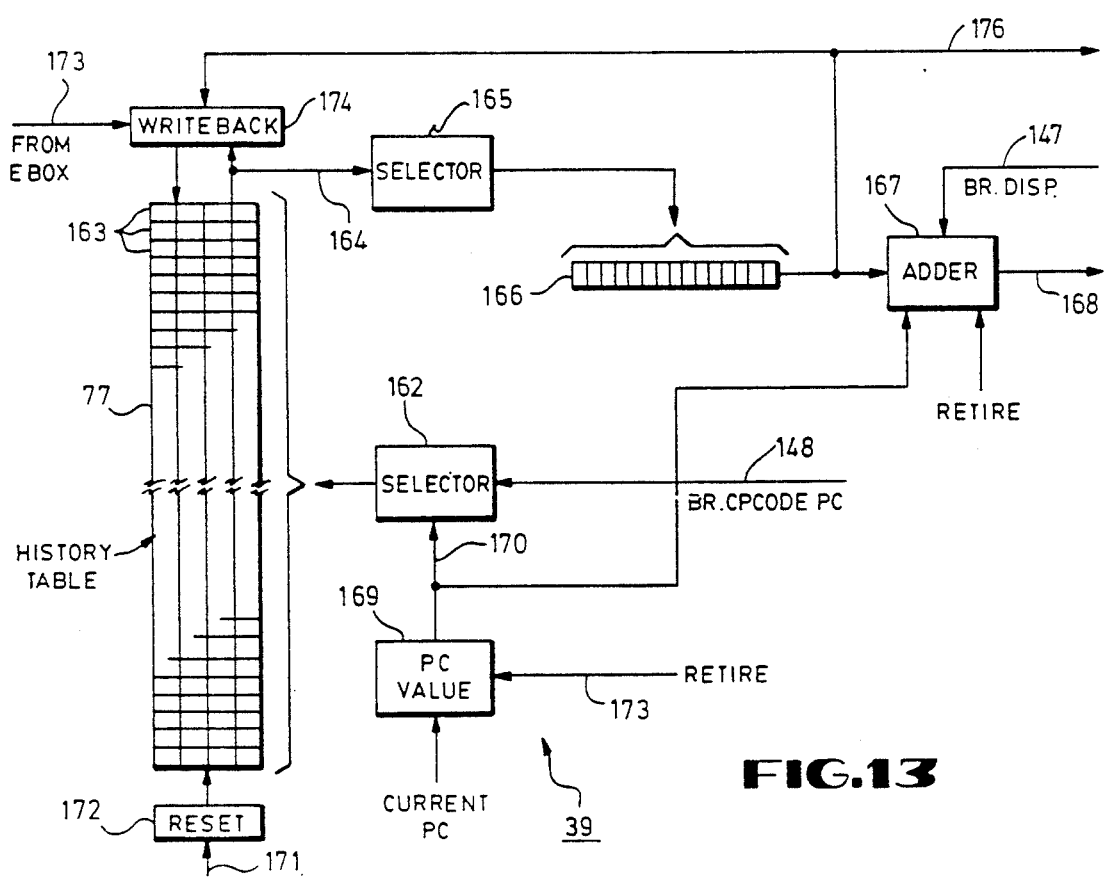
FIG. 13 is an electrical diagram in block form of the branch prediction unit used in the CPU of FIG. 1.

Referring to FIG. 13, the branch prediction unit 39 is shown in more detail. The instruction burst unit 33, using the tables of opcode values in ROM/PLA 66, monitors each instruction opcode as it is parsed, looking for a branch opcode. When a branch opcode is detected, the PC for this opcode is applied to the branch prediction unit 39 via bus 148. This PC value (actually a subset of the address) is used by a selector 162 to address the table 77. The branch history table 77 consists of an array of 512 four-bit registers 163, and the value in the one register 163 selected by 162 is applied by lines 164 to a selector 165 which addresses one of sixteen values in a register 166, producing a one-bit take or not-take output. The branch prediction unit 39 thus predicts whether or not the branch will be taken. If the branch prediction unit 39 predicts the branch will be taken (selected output of the register 166 a "1"), it adds the sign-extended branch displacement on bus 148 to the current PC value on bus 22 in the adder 167 and broadcasts the resulting new PC to the rest of the instruction unit 22 on the new-PC lines 168. The current PC value in register 169 is applied by lines 170 to the selector 162 and the adder 167.

The branch prediction unit 39 constructed in the manner of FIG. 13 uses a "branch history" algorithm for predicting branches. The basic premise behind this algorithm is that branch behavior tends to be patterned. Identifying in a program one particular branch instruction, and tracing over time that instruction's history of branch taken vs. branch not taken, in most cases a pattern develops. Branch instructions that have a past history of branching seem to maintain that history and are more likely to branch than not branch in the future. Branch instructions which follow a pattern such as branch, no branch, branch, no branch etc., are likely to maintain that pattern. Branch history algorithms for branch prediction attempt to take advantage of this "branch inertia".

The branch prediction unit 39 uses the table 77 of branch histories and a prediction algorithm (stored in register 166) based on the past history of the branch. When the branch prediction unit 39 receives the PC of a conditional branch opcode on bus 148, a subset of the opcode's PC bits is used by the selector 162 to access the branch history table 77. The output from the table 77 on lines 164 is a 4-bit field containing the branch history information for the branch. From these four history bits, a new prediction is calculated indicating the expected branch path.

Many different opcode PCs map to each entry of the branch table 77 because only a subset (9-bits) of the PC bits form the index used by the selector 162. When a branch opcode changes outside of the index region defined by this subset, the history table entry that is indexed may be based on a different branch opcode. The branch table 77 relies on the principle of spacial locality, and assumes that, having switched PCs, the current process operates within a small region for a period of time. This allows the branch history table 77 to generate a new pertinent history relating to the new PC within a few branches.

The branch history information in each 4-bit register 163 of the table 77 consists of a string of 1's and 0's indicating what that branch did the last four times it was seen. For example, 1100, read from right to left, indicates that the last time this branch was seen it did not branch. Neither did it branch the time before that. But then it branched the two pervious times. The prediction bit is the result of passing the history bits that were stored through logic which predicts the direction a branch will go, given the history of its last four branches.

The prediction algorithm defined by the register 166 is accessible via the CPU datapaths as an internal processor register (IPR) for testing the contents or for updating the contents with a different algorithm. After powerup, the execution unit 23 microcode initializes the branch prediction algorithm register 166 with a value defining an algorithm which is the result of simulation and statistics gathering, which provides an optimal branch prediction across a given set of general instruction traces. This algorithm may be changed to tune the branch prediction for a specific instruction trace or mix; indeed, the algorithm may be dynamically changed during operation by writing to the register 166. This algorithm is shown in the following table, according to a perferred embodiment:

| Branch History | Prediction for Next Branch |
| --- | --- |
| 0000 | Not Taken |
| 0001 | Taken |

-continued

| Branch History | Prediction for Next Branch |
| --- | --- |
| 0010 | Not Taken |
| 0011 | Taken |
| 0100 | Not Taken |
| 0101 | Not Taken |
| 0110 | Taken |
| 0111 | Taken |
| 1000 | Not Taken |
| 1001 | Taken |
| 1010 | Taken |
| 1011 | Taken |
| 1100 | Taken |
| 1101 | Taken |
| 1110 | Taken |
| 1111 | Taken |

The 512 entries in the branch table 77 are indexed by the opcode's PC bits <8:0>. Each branch table entry 163 contains the previous four branch history bits for branch opcodes at this index. The execution unit 23 asserts a flush-branch-table command on line 171 under microcode control during process context switches. This signal received at a reset control 172 resets all 512 branch table entries to a neutral value: history=0100, which will result in a next prediction of 0 (i.e., not taken).

When a conditional branch opcode is encountered, the branch prediction unit 39 reads the branch table entry indexed by PC<8:0>, using the selector 162. If the prediction logic including the register 166 indicates the branch taken, then the adder 167 sign extends and adds the branch displacement supplied from the instruction burst unit 33 via bus 147 to the current PC, and broadcasts the result to the instruction unit 22 on the new-PC lines 168. If the prediction bit in the register 166 indicates not to expect a branch taken, then the current PC in the instruction unit 22 remains unaffected. The alternate PC in both cases (current PC in predicted taken case, and branch PC in predicted not taken case) is retained in the branch prediction unit 39 in the register 169 until the execution unit 23 retires the conditional branch. When the execution unit 23 retires a conditional branch, it indicates the actual direction of the branch via retire lines 173. The branch prediction unit 39 uses the alternate PC from the register 169 to redirect the instruction unit 22 via another new-PC on lines 168, in the case of an incorrect prediction.

The branch table 77 is written with new history each time a conditional branch is encountered. A writeback circuit 174 receives the four-bit table entry via lines 164, shifts it one place to the left, inserts the result from the prediction logic received on line 175, and writes the new four-bit value back into the same location pointed to by the selector 162. Thus, once a prediction is made, the oldest of the branch history bits is discarded, and the remaining three branch history bits and the new predicted history bit are written back to the table 77 at the same branch PC index. When the execution unit 23 retires a branch queue entry for a conditional branch, if there was not a mispredict, the new entry is unaffected and the branch prediction unit 39 is ready to process a new conditional branch. If a mispredict is signaled via lines 173, the same branch table entry is rewritten by the circuit 174, this time the least significant history bit receives the complement of the predicted direction, reflecting the true direction of the branch.

Each time the branch prediction unit 39 makes a prediction on a branch opcode, it sends information about that prediction to the execution unit 23 on the bus 176. The execution unit 23 maintains a branch queue 70 of branch data entries containing information about branches that have been processed by the branch prediction unit 39 but not by the execution unit 23. The bus 176 is 2-bits wide: one valid bit and one bit to indicate whether the instruction unit 22 prediction was to take the branch or not. Entries are made to the branch queue 70 for both conditional and unconditional branches. For unconditional branches, the value of bit-0 of bus 176 is ignored by the execution unit 23. The length of the branch queue 70 is selected such that it does not overflow, even if the entire instruction queue 35 is filled with branch instructions, and there are branch instructions currently in the execution unit 23 pipeline. At any one time there may be only one conditional branch in the queue 70. A queue entry is not made until a valid displacement has been processed. In the case of a second conditional branch encountered while a first is still outstanding, the entry may not be made until the first conditional branch has been retired.

When the execution unit 23 executes a branch instruction and it makes the final determination on whether the branch should or should not be taken, it removes the next element from the branch queue 70 and compares the direction taken by the instruction unit 22 with the direction that should be taken. If these differ, then the execution unit 23 sends a mispredict signal on the bus 173 to the branch prediction unit 39. A mispredict causes the instruction unit 22 to stop processing, undo any GPR modifications made while parsing down the wrong path, and restart processing at the correct alternate PC.

The branch prediction unit 39 back-pressures the BIU by asserting a branch-stall signal on line 178 when it encounters a new conditional branch with a conditional branch already outstanding. If the branch prediction unit 39 has processed a conditional branch but the execution unit 23 has not yet executed it, then another conditional branch causes the branch prediction unit 39 to assert branch-stall. Unconditional branches that occur with conditional branches outstanding do not create a problem because the instruction stream merely requires redirection. The alternate PC in register 169 remains unchanged until resolution of the conditional branch. The execution unit 23 informs the branch prediction unit 39 via bus 173 each time a conditional branch is retired from the branch queue 70 in order for the branch prediction unit 39 to free up the alternate PC and other conditional branch circuitry.

The branch-stall signal on line 178 blocks the instruction unit 22 from processing further opcodes. When branch-stall is asserted, the instruction burst unit 33 finishes parsing the current conditional branch instruction, including the branch displacement and any assists, and then the instruction burst unit 33 stalls. The entry to the branch queue 70 in the execution unit 23 is made after the first conditional branch is retired. At this time, branch-stall is deasserted and the alternate PC for the first conditional branch is replaced with that for the second.

The branch prediction unit 39 distributes all PC loads to the rest of the instruction unit 22. PC loads to the instruction unit 22 from the complex specifier unit 40 microcode load a new PC in one of two ways. When the complex specifier unit 40 asserts PC-Load-Writebus, it drives a new PC value on the IW-Bus lines. PC-Load- MD indicates that the new PC is on the MD bus lines 54. The branch prediction unit 39 responds by forwarding the appropriate value onto the new-PC lines 168 and asserting load-new-PC. These instruction unit 22 PC loads do not change conditional branch state in the branch prediction unit 39.

The execution unit 23 signals its intent to load a new PC by asserting Load-New-PC. The assertion of this signal indicates that the next piece of IPR data to arrive on the MD bus 54 is the new PC. The next time the memory management unit 25 asserts a write command, the PC is taken from the MD bus 54 and forwarded onto the new-PC lines and a load-new-PC command is asserted.

The branch prediction unit 39 performs unconditional branches by adding the sign extended branch displacement on lines 147 to the current PC on lines 170 in the adder 167, driving the new PC onto the new-PC lines 168 and asserting a signal load-new-PC. Conditional branches load the PC in the same fashion if the logic predicts a branch taken. Upon a conditional branch mispredict or execution unit 23 PC load, any pending conditional branch is cleared, and pending unconditional branches are cleared.

The Microinstruction Control Unit

Figure 14:
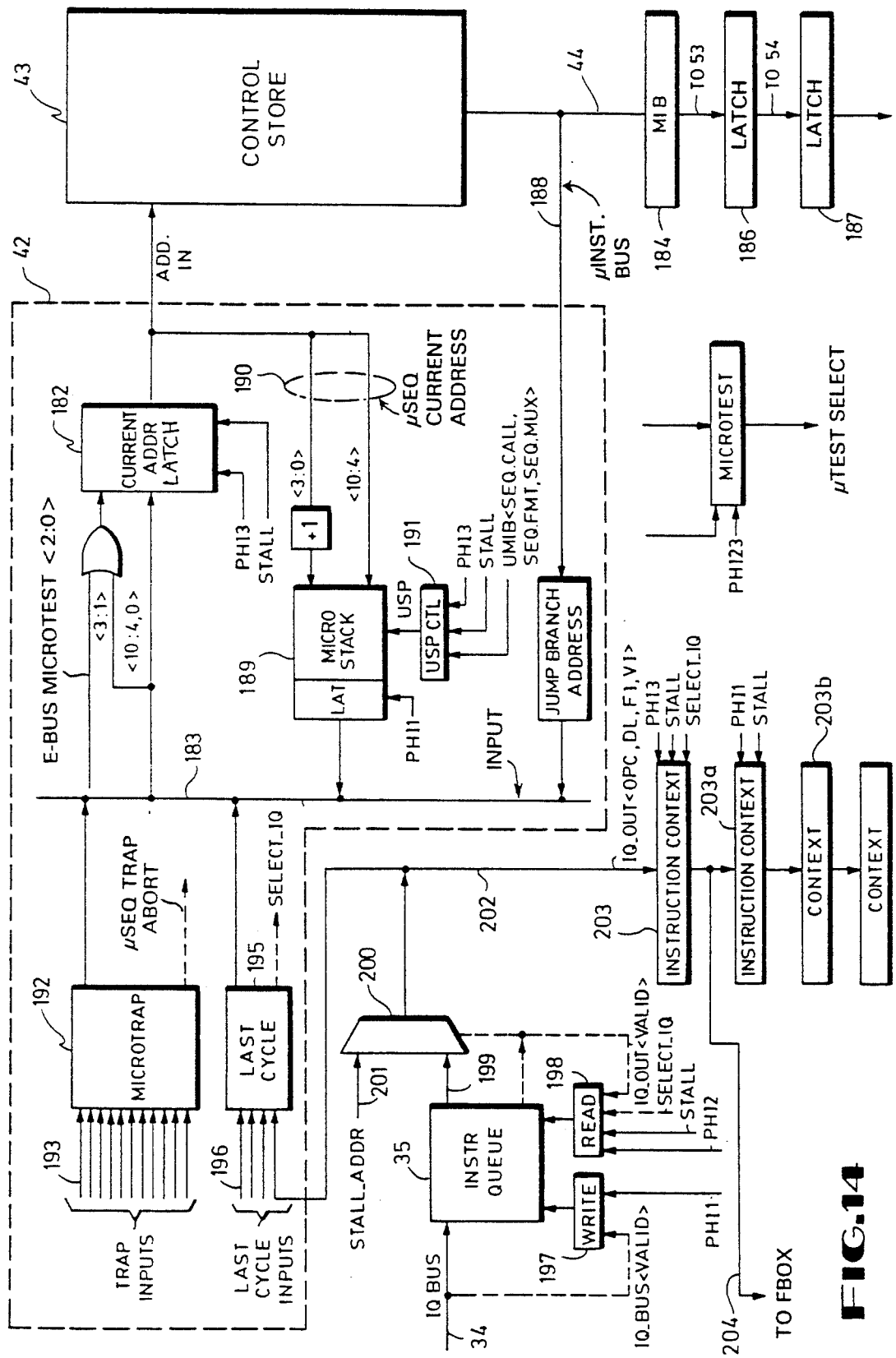
FIG. 14 is an electrical diagram in block form of the microinstruction control unit the CPU of FIG. 1, including the microsequencer and the control store.

Referring to FIG. 14, the microinstruction control unit 24 including the microsequencer 42 and microstore 43 defines a finite state machine that controls three execution unit 23 sections of the CPU 10 pipeline: S3, S4 and S5. The microinstruction control unit 24 itself resides in the S2 section of the pipeline, and accesses microcode contained in the on-chip control store 43. The control store 43 is addressed by an 11-bit bus 181 from the microsequencer 42. The current address for the control store is held in a latch 182, and this latch is loaded from a selector 183 which has several sources for the various addressing conditions, such as jump or branch, microstack, or microtrap. Each microword output on bus 44 from the control store 43 is made up of fields which control all three pipeline stages. A microword is issued at the end of S2 (one every machine cycle) and is stored in latch 184 for applying to microinstruction bus 185 and use in the execution unit 23 during S3, then is pipelined forward (stepped ahead) to sections S3 and S4 via latches 186 and 187 under control of the execution unit 23. Each microword contains a 15-bit field (including an 11-bit address) applied back to the microsequencer 42-on bus 188 for specifying the next microinstruction in the microflow. This field may specify an explicit address contained in the microword from the control store 43, or it may direct the microsequencer 42 to accept an address from another source, e.g., allowing the microcode to conditionally branch on various states in the CPU 10.

Frequently used microcode is usually defined as microsubroutines stored at selected addresses in the control store, and when one of these subroutines is called, the return address is pushed onto a microstack 189 for use upon executing a return. To this end, the current address on the address input bus 181 is applied back to the microstack input 190 after being incremented, since the return will be to the current address plus one. The microstack may contain, for example, six entries, to allow six levels of subroutine nesting. The output of the microstack 189 is applied back to the current address latch 182 via the selector 183 if the commands in the field on the bus 188 direct this as the next address source.

Stalls, which are transparent to the person writing the microcode, occur when a CPU resource is not available, such as when the ALU 50 requires an operand that has not yet been provided by the memory management unit 25. The microsequencer 42 stalls when pipeline segment S3 of the execution unit 23 is stalled. A stall input to the latch 182, the latch 184 or the microstack control 191 causes the control store 43 to not issue a new microinstruction to the bus 44 at the beginning of S3.

Mircotraps allow the microcoder to deal with abnormal events that require immediate service. For example, a microtrap is requested on a branch mispredict, when the branch calculation in the execution unit 23 is different from that predicted by the instruction unit 22 for a conditional branch instruction. A microtrap selector 192 has a number of inputs 193 for various conditions, and applies an address to the selector 183 under the specified conditions. When a microtrap occurs, the microcode control is transferred to the service microroutine beginning at this microtrap address.

The control field (bits <14:0>) of the microword output from the control store 43 on bus 44 via bus 188 is used to define the next address to be applied to the address input 181. The next address is explicitly coded in the current microword; there is no concept of sequential next address (i.e., the output of the latch 182 is not merely incremented). Bit-14 of the control field selects between jump and branch formats. The jump format includes bits <10:0 > as a jump address, bits <12:11 > to select the source of the next address (via selector 183) and bit-13 to control whether a return address is pushed to the microstack 189 via bus 190. The branch format includes bits <7:0> as a branch offset, bits <12:8> to define the source of the microtest input, and again bit-13 to control whether a return address is pushed to the microstack 189 via bus 190. These conditional branch microinstructions are responsive to various states within the CPU 10 such as ALU overflow, branch mispredict, memory management exceptions, reserved addressing modes or faults in the floating point unit 27.

The last microword of a microroutine contains a field identifying it as the last cycle, and this field activates a selector 195 which determines what new microflow is to be started. The alternatives (in order of priority) are an interrupt, a fault handler, a first-part-done handler, or the entry point for a new macroinstruction indicated by the top entry in the instruction queue 35. All of these four alternatives are represented by inputs 196 to the selector 195. If last cycle is indicated, and thee is no microtrap from selector 192, the next address is applied from the selector 195 to the selector 183 for entering into the latch 182.

The instruction queue 35 is a FIFO, six entries deep, filled by the instruction unit 22 via bus 34, permitting the instruction unit 22 to fetch and decode macroinstructions ahead of the execution unit 23 execution. Each entry is 22-bits long, with bits <9:1> being the dispatch address used for the control store address via selector 183 (all the entry points are mapped to these address bits), and bits <21:13> being the opcode itself (the extra bit designating a two-byte opcode). Bit-0 is a valid bit, set if the entry is valid, bit-10 indicates an floating point unit 27 instruction, and bits <12:11> define the initial data length of instruction operands (byte, word, longword, etc.). A write pointer 197 defines the location where a new entry is written from the bus 34 during phi1, and this write pointer 197 is advanced in phi3 of each cycle if the valid bit is set in this new entry. A read pointer 198 defines the location in the instruction queue 35 where the next instruction is to be read during phi2 onto output lines 199 to selector 200. If the valid bit is not set in the instruction queue 35 entry being read out, the selector 200 uses a stall address input 201 for forwarding via selector 195 and selector 183 to the latch 182; the stall microword is thus fetched from the control store 43, and a stall command is sent to the execution unit 23. If the valid bit is set in the entry being read from the instruction queue 35, a first-cycle command is sent to the execution unit 23, and if the floating point unit 27 bit is also set an floating point unit 27 command is sent to the floating point unit 27. The read pointer 198 is advanced in phi4 if the last cycle selector 195 is activated by the microword output in this cycle and the selector 195 selects the output 202 (and the valid bit is set in the entry). When the read pointer 198 is advanced, the valid bit for the entry just read out is cleared, so this entry will not be reused. Or, the read pointer 198 is stalled (no action during phi4) if a stall condition exists.

The bus 202 containing the entry read from the instruction queue 35 includes the opcode field, as well as the microcode address field (sent to selector 195). This opcode field along with the data length field and the floating point unit 27 field is entered in an instruction context latch 203 on phi3 of S2, if the instruction queue 35 is selected as the next address source for the control store 43. When the entry read out has its valid bit cleared, the stall instruction context, forced out of the selector 200 with the stall address, is latched into the context latch 203. The output on lines 204 from the latch 203 is sent to the floating point unit 27 to define the floating point unit 27 instruction to be executed if the floating point unit 27 bit is set. On phi1 of the S3 segment the contents of the latch 203 are driven to slave context latch 205, and the contents of this slave latch are used during S3 by the execution unit 23.

Referring to FIG. 15, the microword at the control store output is 61-bits wide, and of this a 14-bit field (bits <14:0> is used in the microsequencer 42 via bus 24e, so the input to the microinstruction latch 24d is 47-bits wide, bits <60:15>. The microinstructions are of two general types, referred to as "standard" and "special", depending upon whether bit-60 is a one or a zero. In both cases, the microinstruction has a field, bits <59:56>, defining the ALU function (add, subtract, pass, compare, etc.) to be implemented for this cycle, and a MRQ field, bits <54:50> defining any memory requests that are to be made to the memory management unit 25. The A and B fields (bits <25:20> and <39:36>) of the microword define the A and B inputs to the ALU, and the DST field, bits <31:26>, defines the write destination for the ALU output, along with the MISC field containing other needed control bits. The L, W and V fields, bits <34:32>, define the data length, whether to drive the write bus, and the virtual address write enable. For shifter operations, the microword contains an SHF field <48:46> to define the shifter function and a VAL field, bits <44:40> to define the shift amount. Also, if bit-45 is a one, the microword contains a constant value in bits <44:35> for driving onto the B input of the ALU; the constant can be 8-bit or 10-bit, as defined in the MISC field, and if 8-bit a POS field defines the position of the constant. If of the special format, no shifter operation is possible, and two other MISC control fields are available.

The Execution Unit

Figure 16:
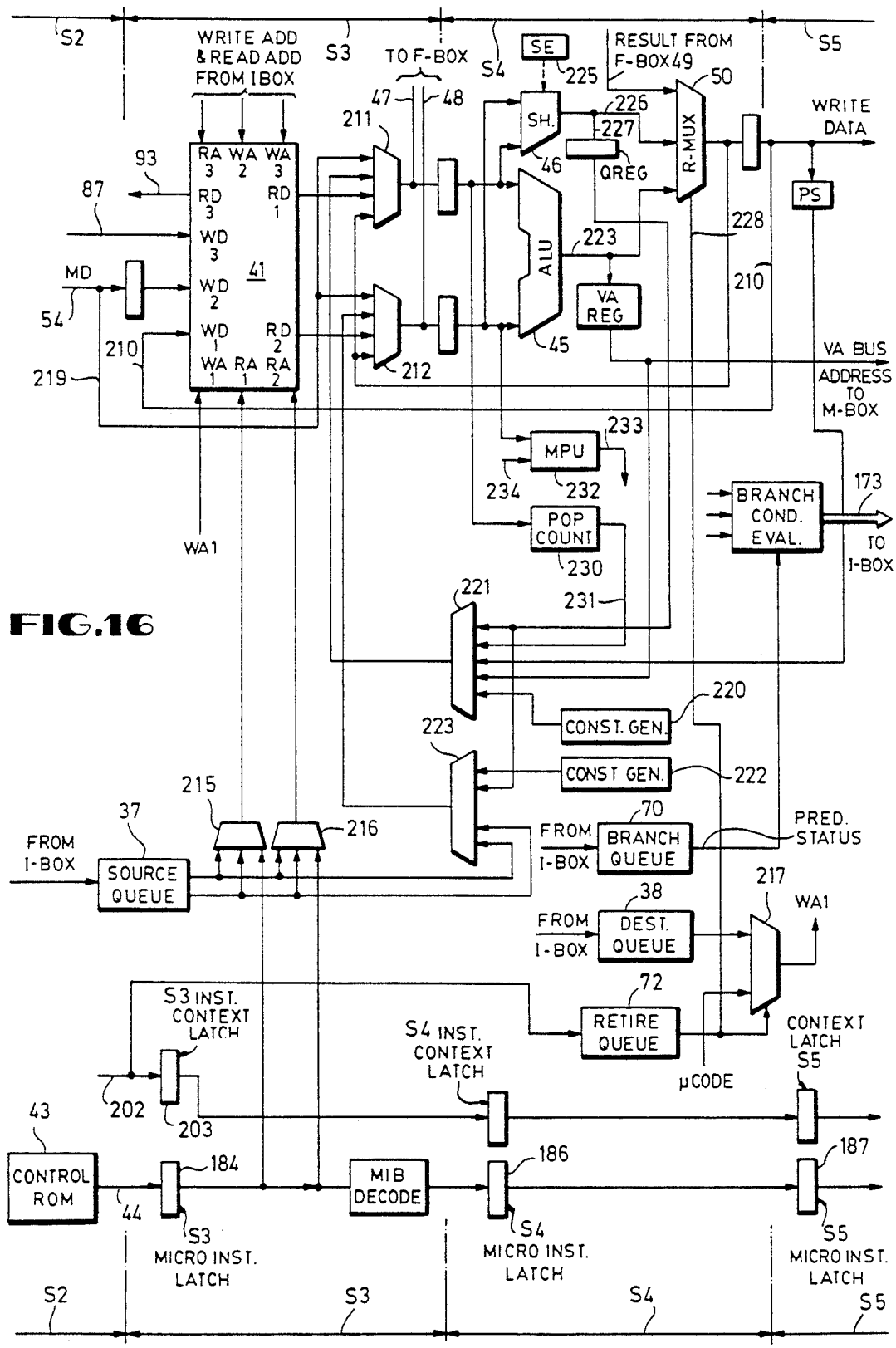
FIG. 16 is an electrical diagram in block form of the execution unit of the CPU of FIG. 1

Referring to FIG. 16, the E-box or execution unit 23 includes the register file 41 which has thirty-seven 32-bit registers, consisting of six memory data registers MD0-MD5, fifteen general purpose registers (GPRs) R0-R14, six working registers W, and CPU state registers. The MD registers receive data from memory reads initiated by the instruction unit 22, and from direct writes from the instruction unit 22. The working registers W hold temporary data under control of the microinstructions (not available to the macroinstruction set); these registers can receive data from memory reads initiated by the execution unit 23 and receive result data from the ALU 45, shifter 46, or floating point unit 27 operations. The GPRs are VAX architecture general-purpose registers (though the PC, R15, is not in this file 41) and can receive data from memory reads initiated by the execution unit 23, from the ALU 45, the shifter 46, or from the instruction unit 22. The state registers hold semipermanent architectural state, and can be written only by the execution unit 23.

The register file 41 has three read ports and three write ports. The read ports include three read-address inputs RA1, RA2 and RA3, and three read data outputs RD1, RD2 and RD3. The three write ports include write address inputs WA1, WA2 and WA3, and three write data inputs WD1, WD2 and WD3. Data input to the write ports of the register file 41 is from the memory data bus 54 to WD2, from the instruction unit 22 write bus 87 to WD3, or from the output of the ALU 45 on the write bus 210 to WD1. Data output from the register file 41 is to the selector 211 for the ALU Abus 212 from RD1 (in S3), to the selector 213 for the ALU Bbus 214 from RD2 (also in S3), and to the bus 93 going to the instruction unit 22 from RD3. The read addresses at RA1 and RA2 for the RD1 and RD2 outputs from register file 41 are received from selectors 215 and 216, each of which receives inputs from the source queue 37 or from the A and B fields of the microinstruction via bus 185; in a cycle, two entries in the source queue 37 can be the address inputs at RA1 and RA2 to provide the ALU A and B inputs (or floating point unit 27 inputs), or the microinstruction can define a specific register address as well as specify source queue addressing. The write address input WA1 (controlling the register to which the ALU output or write bus 210 is written) is defined by a selector 217 receiving an input from the destination queue 38 or from the DST field of the microinstruction via bus 185; the selector 217 is controlled by the retire queue 72 as well as the microinstruction. The WA2 input is from the memory management unit 25 via bus 218, defining which register the MD bus 54 at WD2 is written; this MD port is used by the memory management unit 25 to write memory or IPR read data into W registers or GPRs to complete execution unit 23 initiated reads, with the register file address being supplied to WA2 from the memory management unit 25 (the Mbox received the register file address when the memory operation was initiated). The complex specifier unit 40 (seen in FIG. 13) accesses the register file 41 by WA3/WD3 and RA3/RD3 for general address calculation and autoincrement and autodecrement operand specifier processing.

A bypass path 219 is provided from the MD bus 54 to the inputs of the selectors 211 and 213 allows the memory read data to be applied directly to the A or B ALU inputs without being written to the a register in the register file 41 then being read from this register in the same cycle. The data appears on MD bus 54 too late to be read in the same cycle. When the bypass path is enabled by microcode, the data is not written to the register.

The are two constant generators. A constant generator 220 for the A input of the ALU via selector 221, specified in the A field of the microinstruction, produces constants which are mainly used for generating the addresses of IPRs, and these are implementation dependent; generally an 8-bit value is produced to define an IPR address internally. A constant generator 222 for the B input of the ALU via selector 223 builds a longword constant by placing a byte value in one of four byte positions in the longword; the position and constant fields Pos and Constant in the microinstruction specify this value. Also, the constant source 222 can produce a low-order 10-bit constant specified by the microinstruction when a Const.10 field is present.

The ALU 45 is a 32-bit function unit capable of arithmetic and logical functions defined by the ALU field of the microword. The A and B inputs 212 and 214 are defined by the selectors 211 and 213 which are under control of the A and B fields of the microword. The ALU output 223 can be muxed onto the write bus 210 via Rmux 50 and is directly connected to the virtual address register 224. The ALU also produces condition codes (overflow, carry, zero, negative) based on the results of an operation, and these can be used to update the state registers. The operations which may be performed in the ALU include add, subtract, pass A or B, AND, OR, exclusive-OR, etc.

The shifter 46 receives 64-bits of input from the A and B inputs 212 and 214 and produces a 32-bit right shifted output to the Rmux 50. Shift operation is defined by the SHF field of the microinstruction, and the amount (0-to-32 bits) is defined by the VAL field or by a shift-counter register 225. The output 226 of the shifter 46 is muxed onto the write bus 210 via Rmux 50 and directly connected to the quotient or Q register 227.

The Rmux 50 coordinates execution unit 23 and floating point unit 27 result storage and retiring o f macroinstructions, selecting the source of execution unit 23 memory requests and the source of the next write bus 210 data and associated information. The Rmux selection takes place in S4, as does the driving of the memory request to the memory management unit 25. The new data on write bus 210 is not used until the beginning of S5, however. The Rmux 50 is controlled by the retire queue 72, which produces an output on lines 228 indicating whether the next macroinstruction to retire is being executed by the execution unit 23 or floating point unit 27, and the Rmux selects one of these to drive the write bus 210 and to drive the memory request signals. The one not selected (execution unit 23 or floating point unit 27) will stall if it has need to drive the write bus 210 or memory request. The read pointer in the retire queue 72 is not advanced, and therefore the Rmux selection cannot change, until the currently selected source (execution unit 23 or floating point unit 27) indicates that its macroinstruction is to be retired. The source (execution unit 23 or floating point unit 27) indicated by the retire queue 72 is always selected to drive the Rmux 50; if the execution unit 23 is selected the W field of the microinstruction in S4 selects either the ALU 45 or the shifter 46 as the source for the Rmux 50.

The 32-bit VA or virtual address register 224 is the source for the address for all execution unit 23 memory requests on VA bus 52, except destination queue 38 based stores which use the current PA queue 56 entry for an address. Unlike the entry in the PA queue 56, the VA register 224 address is not yet translated—it is a virtual address except when the memory operation doesn't require translation (as in IPR references or explicit physical memory references)) or when memory management is off. The VA register 224 can be loaded only from the output 223 of the ALU 45, and is loaded at the end of S4 when the V field of the microword specifies to load it. If a given microword specifies a memory operation in the MRQ field and loads the VA register 224, the new VA value will be received by the memory management unit 25 with the memory command.

The population counter 230 functions to calculate the number of ones (times four) in the low-order fourteen bits of the A bus 212, every cycle, producing a result on lines 231 to selector 221 so the result is a source available on the A bus 212 for the next microword. The population count function saves microcode steps in CALL, POP and PUSH macroinstructions as set forth in a copending application. The population counter 230 calculates a result in the range (1-to-14)*4, equal to four times the number of ones on the A bus early in S4. If microword N steers data to the A bus 212, microword N+1 can access the population counter result for that data by specifying this source in the A field. The population counter result on lines 231 is used to calculate the extent of the stack frame which will be written by the macroinstruction. The two ends of the stack frame are checked for memory management purposes before any writes are done.

The mask processing unit 232 holds and processes a 14-bit value loaded from bits <29:16> of the B bus 214, during S4 when the microword tells it to do so by the MISC field. The unit 232 outputs a set of bits with which the microinstruction sequencer 42 can carry out an eight-way branch. Each of these microbranches is to a store-register-to-stack sequence, with the value of the set of bits defining which register of the register file 43 to store. This set of 3-bits is applied to a microtest input to the microaddress latch 182 of FIG. 14 to implement the eight-way microbranch. The purpose of this is to allow microcode to quickly process bit masks in macroinstruction execution flows for CALL, Return, POP and PUSH. The mask processing unit 232 loads the fourteen bits during S4, evaluates the input producing the values shown in the following Table, for bits <6:0> and also separately for bits <13:7> of the B bus:

| Mask | | | | | | | Output |
|---|---|---|---|---|---|---|---|
| X | X | X | X | X | X | 1 | 0 0 0 |
| X | X | X | X | X | 1 | 0 | 0 0 1 |
| X | X | X | X | 1 | 0 | 0 | 0 1 0 |
| X | X | X | 1 | 0 | 0 | 0 | 0 1 1 |
| X | X | 1 | 0 | 0 | 0 | 0 | 1 0 0 |
| X | 1 | 0 | 0 | 0 | 0 | 0 | 1 0 1 |
| 1 | 0 | 0 | 0 | 0 | 0 | 0 | 1 1 0 |
| 0 | 0 | 0 | 0 | 0 | 0 | 0 | 1 1 1 | where X means "don't care". When the microcode does branch on one of these output values after they are loaded via lines to the microtest input to the microsequencer 42, the least significant bit which is a one in the current mask value in the mask processing unit 232 is reset to zero automatically, this reset occurring in S3, so that the next microword can branch on the new value of the mask. The microsequencer 42 signals that it did take a branch by input 234 to the mask processing unit 232. The advantage of the mask processing unit 232 is that a minimum number of microcode cycles is needed to find out which registers are to be saved to stack when a CALL or other such macroinstruction is executing. The mask loaded to the B bus contains a one for each of the fourteen GPRs that is to be saved to stack, and usually these are in the low-order numbers of bits <6:0>; say bit-1 and bit-2 are ones, and the rest zeros, then these will be found in two cycles (producing 000 and 001 outputs on lines 233), and the remainder of zeros can be determined in two cycles, one producing "111" on the output 233 for bits <6:2> of the first group and the next producing "111" on the output 233 for bits <13:7> collectively (all zeros) for the second group. Thus, ten microcycles are saved.

The mask processing unit 232 may be implemented, in one embodiment, by a decoder to evaluate the mask pattern according to the Table above and to produce the three-bit output indicated according to the position of the leading "1". In response to a branch-taken indication on the line 234 from the microsequencer, the decoder zeros the trailing "1" in the mask then in the unit, and performs another evaluation to produce the three-bit output value on lines 233.

The branch condition evaluator 235 uses the macroinstruction opcode, the ALU condition code bits and the shifter 46 result to evaluate the branch condition for all macroinstruction branches. This evaluation is done every cycle, but is used only if the microword specifies it in the MRQ field. The result of the evaluation is compared to the instruction unit 22 prediction made in the branch prediction unit 39. The instruction unit 22 prediction is indicated in the entry in the branch queue 70. If the instruction unit 22 prediction was not correct, the execution unit 23 signals the instruction unit 22 on one of the lines 173 and sends a branch-mispredict trap request to the microsequencer 42 as one of the inputs 193. A retire signal is asserted on one of the lines 173 to tell the instruction unit 22 that a branch queue entry for a conditional branch was removed from the branch queue 70. If the retire signal is asserted and the miss-predict signal is not, the instruction unit 22 releases the resource which is holding the alternate PC (the address which the branch should have gone to if the prediction had not been correct). If retire and miss-predict are both asserted, the instruction unit 22 begins fetching instructions from the alternate PC, and the microtrap in the microsequencer 42 will cause the execution unit 23 and floating point unit 27 pipelines to be purged and various instruction unit 22 and execution unit 23 queues to be flushed. Also, a signal to the memory management unit 25 flushes Mbox processing of execution unit 23 operand accesses (other than writes). The branch macroinstruction has entered S5 and is therefore retired even in the event of a misprediction; it is the macroinstructions following the branch in the pipeline which must be prevented from completing in the event of a mispredict microtrap via input 193.

The Memory Management Unit (M-Box)

Figure 17:
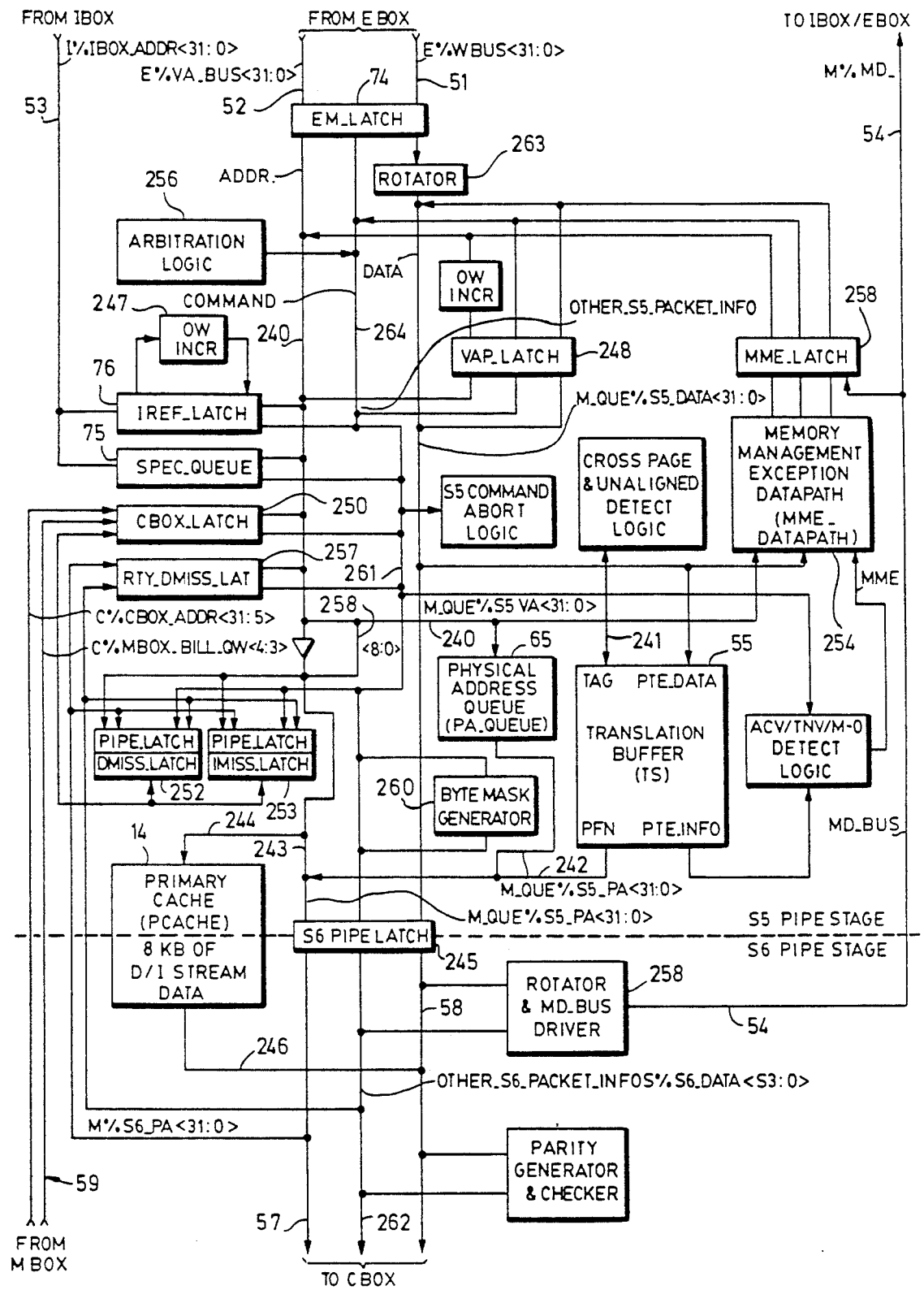
FIG. 17 is an electrical diagram of the memory management unit of the CPU of FIG. 1.

Referring to FIG. 17, the memory management unit 25 includes the TB 55 and functions along with the operating system memory management software to allocate physical memory. Translations of virtual addresses to physical addresses are performed in the memory management unit 25, access checks are implemented for the memory protection system, and the software memory management code is initiated when necessary (TB miss, page swapping, etc.). The memory management unit 25 also allocates access to the buses 19 or 20 when memory references are received simultaneously from the instruction unit 22, execution unit 23 and/or cache controller unit 26; that is, the memory management unit 25 prioritizes, sequences and processes all memory references in an efficient and logically correct manner, and transfers the requests and their corresponding data to and from the instruction unit 22, execution unit 23, cache controller unit 26 and primary cache 14. The memory management unit 25 also controls the primary cache 14, which provides a two-cycle access for most instruction stream and data stream requests.

The memory management unit 25 receives requests from several sources. Virtual addresses are received on bus 52 from the execution unit 23, and data on the write bus 51 from the execution unit 23; addresses from both of these sources are latched into the EM-latch 74. Instruction stream addresses are applied to the memory management unit 25 by the bus 53 from the instruction unit 22. Invalidate addresses from the cache controller unit 26 are applied by the bus 59. Data returned from the memory management unit 25 to the instruction unit 22 or execution unit 23, resulting from a primary cache 14 hit, or from the cache controller unit 26, after a reference was forwarded to the backup cache 15 or memory 12, is on the memory data bus 54. The incoming requests are latched, and the selected one of the requests is initiated by the memory management unit 25 in a given machine cycle.

A virtual address on an internal bus 240 is applied to the tag address input of the translation buffer 55. The tb is a 96-entry content-addressable memory storing the tags and page table entries for the ninety-six most-recently-used pages in physical memory. The virtual address applied to the virtual address bus 240 is compared to the tags in tb, and, if a match is found, the corresponding page table entry is applied by output 242 and the internal physical address bus 243 for forwarding to the primary cache 14 by address input 244. The physical address is also applied via pipe latch 245 to the physical address bus 57 going to the cache controller unit 26. If a primary cache 14 hit occurs, data from the primary cache 14 is applied from the output 246 to the data bus 58 from which it is applied to the memory data bus 54.

The incoming virtual addresses from the instruction unit 22 on bus 53 are applied to a latch 76 which stores all instruction stream read references requested by the instruction unit 22 until the reference successfully completes. An incrementer 247 is associated with the latch 76 to increment the quadword address for fetching the next block of instruction stream data.

The virtual addresses on bus 53 from the instruction unit 22 are also applied to the spec-queue 75 which is a two-entry FIFO to store data stream read and write references associated with source and destination operands decoded by the instruction unit 22. Each reference latched in the spec-queue 75 is stored until the reference successfully completes.

The EM-latch 74 stores references originating in the execution unit 23 before applying them to the internal virtual address bus 240; each such reference is stored until the memory management access checks are cleared, and the reference successfully completes. The address-pair latch 248 stores the address of the next quadword when an unaligned reference pair is detected; an incrementer 249 produces this next address by adding eight to the address on bus 240.

Incoming addresses on bus 59 from the cache controller unit 26 are latched in the cache controller unit 26 latch 250; these references are for instruction stream primary cache 14 fills, data stream primary cache 14 fills, or primary cache 14 hexaword invalidates. Each reference is stored in the cache controller unit 26 latch 250 until it completes. If a data stream primary cache 14 fill is being requested, the data will appear on the bus 58 from the cache controller unit 26.

The physical address queue 65 is an eight-entry FIFO which stores the physical addresses associated with destination specifier references made by the instruction unit 22 via a destination-address or read-modify command. The execution unit 23 will supply the corresponding data at some later time via a store command. When the store data is supplied, the physical address queue 65 address is matched with the store data and the reference is turned into a physical write operation. Addresses from the instruction unit 22 are expected in the same order as the corresponding data from the execution unit 23. The queue 65 has address comparators built into all eight FIFO entries, and these comparators detect when the physical address bits <8:3> of a valid entry matches the corresponding physical address of an instruction unit 22 data stream read.

A latch 252 stores the currently-outstanding data stream read address; a data stream read which misses in the primary cache 14 is stored in this latch 252 until the corresponding primary cache 14 block fill operation is completed. The latch 253 stores instruction stream read miss addresses in an analogous manner. Reads to IPRs are also stored in the latch 252, just as data stream reads. These two latches 252 and 253 have comparators built in to detect several conditions. If the hexaword address of an invalidate matches the hexaword address stored in either latch 252 or 253, the corresponding one of these latches sets a bit to indicate that the corresponding fill operation is no longer cachable in the primary cache 14. Address bits <11:5> address a particular index in the primary cache 14 (two primary cache 14 blocks); if address <8:5> of latch 252 matches the corresponding bits of the physical address of an instruction stream read, this instruction stream read is stalled until the data stream fill operation completes—this prevents the possibility of causing a data stream fill sequence to a given primary cache 14 block from simultaneously happening with an instruction stream fill sequence to the same block. Similarly, address bits <8:5> of the latch 253 are compared to data stream read addresses to prevent another simultaneous I-stream/D-stream fill sequence to the same primary cache 14 block. The address bits <8:5> of both latches 252 and 253 are compared to any memory write operation, which is necessary to prevent the write from interfering with the cache fill sequence.

The virtual address on the bus 240 is also applied to the memory management exception unit 254, which functions to examine the access rights of the PTE corresponding to the virtual address to make sure the protection level is not being violated, or the access rules are not being violated. If no exception is generated, the memory request is allowed to continue with no interruption, but if an exception is found by the unit 254 then the memory reference is aborted.

An important objective of the memory management unit 25 function is to return requested read data to the instruction unit 22 and execution unit 23 as quickly as possible in order to minimize macropipeline stalls. If the execution unit 23 pipeline is stalled because it is waiting for a memory operand to be loaded into its register file 41 (md-stall condition), then the amount of time the execution unit 23 remains stalled is related to how quickly the memory management unit 25 can return the data. In order to minimize memory management unit 25 read latency, a two-cycle pipeline organization of the memory management unit 25 is used as illustrated in FIG. 17a, allowing requested read data to be returned in a minimum of two cycles after the read reference is shipped to the memory management unit 25, assuming a primary cache 14 hit. In FIG. 17a, at the start of the S5 cycle, the memory management unit 25 drives the highest priority reference into the S5 pipe; the arbitration circuit 256 determines which reference should be driven into S5 (applied via bus 240 to the input 241 of TB 55) at the end of the previous cycle S4. The first half of the S5 cycle is used for the TB lookup and to translate the virtual address to a physical address via the TB. The primary cache 14 access is started during phi2 of S5 (before the T13 output is available, using the offset part <8:0> of the virtual address via path 257) and continues into phi1 of S6, with return data on bus 246. If the reference should cause data to be returned to the instruction unit 22 or execution unit 23, phi1-phi3 of the S6 cycle is used to rotate the read data in the rotator 258 (if the data is not right-justified) and to transfer the data back to the instruction unit 22 and/or execution unit 23 via the MD bus 54.

Thus, assuming an aligned read reference is issued in cycle x by the instruction unit 22 or execution unit 23, the memory management unit 25 can return the requested data in cycle x+2 provided that 1) the translated read address was cached in the TB 55, 2) no memory management exceptions occurred as detected by memory management exception unit 254, 3) the read data was cached in the primary cache 14, and 4) no other higher priority or pending reference inhibited the immediate processing of this read.

Due to the macropipeline structure of CPU 10, the memory management unit 25 can receive "out-of-order" references from the instruction unit 22 and execution unit 23. That is, the instruction unit 22 can send a reference corresponding to an opcode decode before the execution unit 23 has sent all references corresponding to the previous opcode. Issuing references "out-of-order" in a macropipeline introduces complexities in the memory management unit 25 to guarantee that all references will be processed correctly within the context of the instruction set, CPU architecture, the macropipeline, and the memory management unit 25 hardware. Many of these complexities take the form of restrictions on how and when references can be processed by the memory management unit 25.

A synchronization example is useful to illustrate several of the reference order restrictions. This example assumes that two processors (e.g., "processor-1" is the CPU 10 of FIG. 1 and "processor-2" is the CPU 28) are operating in a multiprocessor environment, and executing the following code:

| Processor-1 | Processor-2 |
| --- | --- |
| MOVL #1,C | 10$ BLBC T,10$ |

| Processor-1 | Processor-2 |
|---|---|
| MOVL #1,T | MOVL C,R0 |

Initially, processor-1 owns the critical section corresponding to memory location T. Processor-1 will modify memory location C since it currently has ownership. Subsequently, processor-1 will release ownership by writing a 1 into T. Meanwhile, processor-2 is "spinning" on location T waiting for T to become non-zero. Once T is non-zero, processor-2 will read the value of C. Several reference order restrictions for the memory management unit 25 as explained in the following paragraphs will refer to this example.

One restriction is "No D-stream hits under D-stream misses", which means that the memory management unit 25 will not allow a data-stream read reference, which hits in the primary cache 14, to execute as long as requested data for a previous data-stream read has not yet been supplied. Consider the code that processor-2 executes in the example above. If the memory management unit 25 allowed data-stream hits under data-stream misses, then it is possible for the instruction unit 22 read of C to hit in the primary cache 14 during a pending read miss sequence to T. In doing so, the memory management unit 25 could supply the value of C before processor-1 modified C. Thus, processor-2 would get the old C with the new T causing the synchronization code to operate improperly.

Note that, while data-stream hits under data-stream misses is prohibited, the memory management unit 25 will execute a data-stream hit under a data-stream fill operation. In other words, the memory management unit 25 will supply data for a read which hit in the primary cache 14 while a Primary cache 14 fill operation to a previous missed read is in progress, provided that the missed read data has already been supplied.

Instruction-stream and data-stream references are handled independently of each other. That is, instruction-stream processing can proceed regardless of whether a data-stream miss sequence is currently executing, assuming there is no Primary cache 14 index conflict.

Another restriction is "No instruction-stream hits under instruction-stream misses", which is the analogous case for instruction-stream read references. This restriction is necessary to guarantee that the instruction unit 22 will always receive its requested instruction-stream reference first, before any other instruction-stream data is received.

A third restriction is "Maintain the order of writes". Consider the example above: if the memory management unit 25 of processor-1 were to reorder the write to C with the write to T, then processor-2 could read the old value of C before processor-1 updated C. Thus, the memory management unit 25 must never re-order the sequence of writes generated by the execution unit 23 microcode.

A forth restriction is "Maintain the order of Cbox references". Again consider the example above: processor-2 will receive an invalidate for C as a result of the write done by processor-1 in the MOVL #1,C instruction. If this invalidate were not to be processed until after processor-2 did the read of C, then the wrong value of C has been placed in R0. Strictly speaking it must be guaranteed that the invalidate to C happens before the read of C. However, since C may be in the primary cache 14 of processor-2, there is nothing to stop the read of C from occurring before the invalidate is received. Thus from the point of view of processor-2, the real restriction here is that the invalidate to C must happen before the invalidate to T which must happen before the read of T which causes processor-2 to fall through the loop. As long as the memory management unit 25 does not re-order cache controller unit 26 references, the invalidate to C will occur before a non-zero value of T is read.

A fifth restriction is "Preserve the order of instruction unit 22 reads relative to any pending execution unit 23 writes to the same quadword address". Consider the following example of code executed in the CPU 10:

MOVL #1,C

MOVL C,R0

In the macropipeline, the instruction unit 22 prefetches specifier operands. Thus, the memory management unit 25 receives a read of C corresponding to the "MOVL C,R0" instruction. This read, however, cannot be done until the write to C from the previous instruction completes. Otherwise, the wrong value of C will be read. In general, the memory management unit 25 must ensure the instruction unit 22 reads will only be executed once all previous writes to the same location have completed.

A sixth restriction is "I/O Space Reads from the instruction unit 22 must only be executed when the execution unit 23 is executing the corresponding Instruction". Unlike memory reads, reads to certain I/O space addresses can cause state to be modified. As a result, these I/O space reads must only be done in the context of the instruction execution to which the read corresponds. Due to the macropipeline structure of the CPU 10, the instruction unit 22 can issue an I/O space read to prefetch an operand of an instruction which the execution unit 23 is not currently executing. Due to branches in instruction execution, the execution unit 23 may in fact never execute the instruction corresponding to the I/O space read. Therefore, in order to prevent improper state modification, the memory management unit 25 must inhibit the processing of I/O space reads issued by the instruction unit 22 until the execution unit 23 is actually executing the instruction corresponding to the I/O space read.

A seventh restriction is "Reads to the same Primary cache 14 block as a pending read/fill operation must be inhibited". The organization of the primary cache 14 is such that one address tag corresponds to four subblock valid bits. Therefore, the validated contents of all four subblocks must always correspond to the tag address. If two distinct Primary cache 14 fill operations are simultaneously filling the same Primary cache 14 block, it is possible for the fill data to be intermixed between the two fill operations. As a result, an instruction-stream read to the same Primary cache 14 block as a pending data-stream read/fill is inhibited until the pending read/fill operation completes. Similarly, a data-stream read to the same Primary cache 14 block as a pending instruction-stream read/fill is also inhibited until the fill completes.

An eighth restriction is "Writes to the same Primary cache 14 block as a pending read/fill operation must be inhibited until the read/fill operation completes". As in the seventh, this restriction is necessary in order to guarantee that all valid subblocks contain valid up-todate data. Consider the following situation: the memory management unit 25 executes a write to an invalid subblock of a Primary cache 14 block which is currently being filled; one cycle later, the cache fill to that same subblock arrives at the primary cache 14. Thus, the latest subblock data, which came from the write, is overwritten by older cache fill data. This subblock is now marked valid with "old" data. To avoid this situation, writes to the same Primary cache 14 block as a pending read/fill operation are inhibited until the cache fill sequence completes.

Referring to FIG. 17, there are in the memory management unit 25 seven different reference storage devices (e.g., EM-latch 74, Iref latch 75, Cbox latch 250, VAP latch 248, spec queue 76, the MME latch, etc.) which may be driven to the virtual address bus 240 in S5. To resolve which one is to be driven, reference arbitration is implemented by the arbitration circuit 256. The purpose of these seven devices is to buffer pending references, which originate from different sections of the chip, until they can be processed by the memory management unit 25. In order to optimize performance of the CPU pipeline, and to maintain functional correctness of reference processing in light of the memory management unit 25 circuitry and the reference order restrictions, the memory management unit 25 services references from these seven queues in a prioritized fashion.

During every memory management unit 25 cycle, the reference arbitration circuit 256 determines which unserviced references should be processed next cycle, according to an arbitration priority. The reference sources are listed below from highest to lowest priority:

1. The latch 250 with Cbox references
2. The retry-dmiss latch 257
3. The memory management exception latch 258
4. The virtual address pair latch 248
5. The Ebox-to-Mbox latch 74
6. The spec-queue 75
7. The instruction unit 22 reference latch 247

If nothing can be driven, the memory management unit 25 drives a NOP command into S5. This prioritized scheme does not directly indicate which pending reference will be driven next, but instead indicates in what order the pending references are tested to determine which one will be processed. Conceptually, the highest pending reference which satisfies all conditions for driving the reference is the one which is allowed to execute during the subsequent cycle.

This priority scheme is based upon certain reasoning. First, all references coming from the cache controller unit 26 are always serviced as soon as they are available. Since cache controller unit 26 references are guaranteed to complete in S5 in one cycle, we eliminate the need to queue up cache controller unit 26 references and to provide a back-pressure mechanism to notify the cache controller unit 26 to stop sending references. Secondly, a data-stream read reference in the retry-dmiss latch 257 is guaranteed to have cleared all potential memory management problems; therefore, any reference stored in this latch is the second considered for processing. Third, if a reference related to memory management processing is pending in the memory management exception latch 258, it is given priority over the remaining four sources because the memory management unit 25 must clear all memory management exceptions before normal processing can resume. Fourth, the virtual address pair latch 248 stores the second reference of an unaligned reference pair; since it is necessary to complete the entire unaligned reference before starting another reference, the latch 248 has next highest priority in order to complete the unaligned sequence that was initiated from a reference of lesser priority. Fifth, the EM-latch 74 stores references from the execution unit 23; it is given priority over the spec-queue 75 and instruction unit 22 reference latch 76 sources because execution unit 23 references are physically further along in the pipe than instruction unit 22 references—the presumed implication of this fact is that the execution unit 23 has a more immediate need to satisfy its reference requests than the instruction unit 22, since the execution unit 23 is always performing real work and the instruction unit 22 is prefetching operands that may, in fact, never be used. Sixth, the spec-queue 75 stores instruction unit 22 operand references, and is next in line for consideration; the spec-queue has priority over the instruction unit 22 reference latch 76 because specifier references are again considered further along in the pipeline than instruction-stream prefetching. Finally, seventh if no other reference can currently be driven, the instruction unit 22 reference latch 76 can drive an instruction-stream read reference in order to supply data to the instruction unit 22. If no reference can currently be driven into S5, the memory management unit 25 automatically drives a NOP command.

The arbitration algorithm executed in the circuit 256 is based on the priority scheme just discussed; the arbitration logic tests each reference to see whether it can be processed next cycle by evaluating the current state of the memory management unit 25. There are certain tests associated with each latch. First, since cache controller unit 26 references are always to be processed immediately, a validated latch 250 always causes the cache controller unit 26 reference to be driven before all other pending references. Second, a pending data-stream read reference will be driven from the retry latch 257 provided that the fill state of the primary cache 14 has changed since the latch 257 reference was last tried; if the primary cache 14 state has changed, it makes sense to retry the reference since it may now hit in the primary cache 14. Third, a pending MME reference will be driven when the contents of the memory management exception is validated. Fourth, a reference from the virtual address pair latch 248 will be driven when the content is validated. Fifth, a reference from the Ebox-to-Mbox latch 74 will be driven provided that the content is validated. Sixth, a validated reference in the spec-queue 75 will be driven provided that the spec-queue has not been stopped due to explicit execution unit 23 writes in progress. Seventh, a reference from the instruction unit 22 in latch 76 will be driven provided that this latch has not been stopped due to a pending read-lock/write-unlock sequence. If none of these seven conditions are satisfied, the memory management unit 25 will drive a NOP command onto the command bus 259 causing the S5 pipe to become idle.

READ processing in the memory management unit 25 will be examined, beginning with generic read-hit and read-miss/cache-fill sequences. Assuming a read operation is initiated and there is no TB miss (and no stall for any of a variety of different reasons), the memory management unit 25 operation is as follows. First, the byte mask generator 260 generates the corresponding byte mask by looking at bits $<2:0>$ of the virtual address on the bus 243 and the data length field $DL<1:0>$ on the command bus 261 and then drives the byte mask onto 8-bits of the control bus 261. Byte mask data is generated on a read operation in order to supply the byte alignment information to the cache controller unit 26 on an I/O space read.

When a read reference is initiated in the S5 pipe, the address is translated by the TB (assuming the address was virtual) to a physical address during the first half of the S5 cycle, producing a physical address on the bus 243. The primary cache 14 initiates a cache lookup sequence using this physical address during the second half of the S5 cycle. This cache access sequence overlaps into the following S6 cycle. During phi4 of the S5 cycle, the primary cache 14 determines whether the read reference is present in its array. If the primary cache 14 determined that the requested data is present, a "cache hit" or "read hit" condition occurs. In this event, the primary cache 14 drives the requested data onto data bus 246. A reference-enable signal on the bus 262 is de-asserted to inform the cache controller unit 26 that it should not process the S6 read since the memory management unit 25 will supply the data from the primary cache 14.

If the primary cache 14 determined that the requested data is not present, a "cache miss" or "read miss" condition occurs. In this event, the read reference is loaded into the latch 252 or latch 253 (depending on whether the read was instruction-stream or data-stream) and the cache controller unit 26 is instructed to continue processing the read by the memory management unit 25 assertion of the reference-enable signal on bus 262. At some point later, the cache controller unit 26 obtains the requested data from the backup cache 15 or from the memory 12. The cache controller unit 26 will then send four quadwords of data using the instruction-stream cache fill or data-stream cache fill commands. The four cache fill commands together are used to fill the entire Primary cache 14 block corresponding to the hexaword read address on bus 57. In the case of data-stream fills, one of the four cache fill commands will be qualified with a signal indicating that this quadword fill contains the requested data-stream data corresponding to the quadword address of the read. When this fill is encountered, it will be used to supply the requested read data to the memory management unit 25, instruction unit 22 and/or execution unit 23. If, however, the physical address corresponding to the cache fill command falls into I/O space, only one quadword fill is returned and the data is not cached in the primary cache 14. Only memory data is cached in the primary cache 14.

Each cache fill command sent to the memory management unit 25 is latched in the cache controller unit 26 latch 250; note that neither the entire cache fill address nor the fill data are loaded into this latch. The address in the I-miss or D-miss latches 252, 253, together with two quadword alignment bits latched in the cache controller unit 26 latch 257 are used to create the quadword cache fill address when the cache fill command is executed in S5. When the fill operation propagates into S6, the cache controller unit 26 drives the corresponding cache fill data onto data bus 58 in order for the primary cache 14 to perform the fill via input-output 246.

Data resulting from a read operation is driven on bus 58 by the primary cache 14 (in the cache hit case) or by the cache controller unit 26 (in the cache miss case). This data is then driven on MD bus 54 by the rotator 258 in right-justified form. Signals are conditionally asserted on the bus 262 with this data to indicate the destination(s) of the data as the virtual instruction cache 17, instruction unit 22 data, instruction unit 22 IPR write, execution unit 23 data or memory management unit 25 data.

In order to return the requested read data to the instruction unit 22 and/or execution unit 23 as soon as possible, the cache controller unit 26 implements a Primary cache 14 data bypass mechanism. When this mechanism is invoked, the requested read data can be returned one cycle earlier than when the data is driven for the S6 cache fill operation. The bypass mechanism works by having the memory management unit 25 inform the cache controller unit 26 that the next S6 cycle will be idle, and thus the bus 58 will be available to the cache controller unit 26. When the cache controller unit 26 is informed of the S6 idle cycle, it drives the bus 58 with the requested read data if read data is currently available (if no read data is available during a bypass cycle, the cache controller unit 26 drives some indeterminent data and no valid data is bypassed). The read data is then formatted by the rotator 258 and transferred onto the MD bus 54 to be returned to the instruction unit 22 and/or execution unit 23, qualified by the vic-data, Ibox-data or Ebox-data signals on the command bus 262.

Memory access to all instruction-stream code is implemented by the memory management unit 25 on behalf of the instruction unit 22. The instruction unit 22 uses the instruction-stream data to load its prefetch queue 32 and to fill the virtual instruction cache 17. When the instruction unit 22 requires instruction-stream data which is not stored in the prefetch queue 32 or the virtual instruction cache 17, the instruction unit 22 issues an instruction-stream read request which is latched by the Iref latch 76. The instruction unit 22 address is always interpreted by the memory management unit 25 as being an aligned quadword address. Depending on whether the read hits or misses in the primary cache 14, the amount of data returned varies. The instruction unit 22 continually accepts instruction-stream data from the memory management unit 25 until the memory management unit 25 qualifies instruction-stream MD-bus 54 data with the last-fill signal, informing the instruction unit 22 that the current fill terminates the initial I-read transaction.

When the requested data hits in the primary cache 14, the memory management unit 25 turns the Iref-latch 76 reference into a series of instruction-stream reads to implement a virtual instruction cache 17 "fill forward" algorithm. The fill forward algorithm generates increasing quadword read addresses from the original address in the Iref-latch 76 to the highest quadword address of the original hexaword address. In other words, the memory management unit 25 generates read references so that the hexaword virtual instruction cache 17 block corresponding to the original address is filled from the point of the request to the end of the block. The theory behind this fill forward scheme is that it only makes sense to supply instruction-stream data following the requested reference since instruction-stream execution causes monotonically increasing instruction-stream addresses (neglecting branches).

The fill forward scheme is implemented by the Iref-latch 76. Once the Iref-latch read completes in S5, the Iref-latch quadword address incrementor 247 modifies the stored address of the latch 76 so that its content becomes the next quadword I-read. Once this "new" reference completes in S5, the next I-read reference is generated. When the Iref-latch finally issues the I-read corresponding to the highest quadword address of the hexaword address, the forward fill process is terminated by invalidating the Iref-latch 76.

The fill forward algorithm described above is always invoked upon receipt of an I-read. However, when one of the I-reads is found to have missed in the primary cache 14, the subsequent I-read references are flushed out of the S5 pipe and the Iref-latch 76. The missed I-read causes the Imiss-latch 253 to be loaded and the cache controller unit 26 to continue processing the read. When the cache controller unit 26 returns the resulting four quadwords of Primary cache 14 data, all four quadwords are transferred back to the instruction unit 22 qualified by VIC-data. This, in effect, results in a virtual instruction cache 17 "fill full" algorithm since the entire virtual instruction cache 17 block will be filled. Fill full is done instead of fill forward because it costs little to implement. The memory management unit 25 must allocate a block of cycles to process the four cache fills; therefore, all the primary cache 14 fill data can be shipped to the virtual instruction cache 17 with no extra cost in memory management unit 25 cycles since the MD bus 54 would otherwise be idle during these fill cycles.

Note that the instruction unit 22 is unaware of what fill mode the memory management unit 25 is currently operating in. The virtual instruction cache 17 continues to fill instruction-stream data from the MD bus 54 whenever VIC-data is asserted regardless of the memory management unit 25 fill mode. The memory management unit 25 asserts the last-fill signal to the instruction unit 22 during the cycle which the memory management unit 25 is driving the last instruction-stream fill to the instruction unit 22. The last-fill signal informs the instruction unit 22 that it is receiving the final virtual instruction cache 17 fill this cycle and that it should not expect any more. In fill forward mode, the memory management unit 25 asserts last-fill when the quadword alignment equals "11" (i.e. the upper-most quadword of the hexaword). In fill full mode, the memory management unit 25 receives the last fill information from the cache controller unit 26 and transfers it to the instruction unit 22 through the last-fill signal.

It is possible to start processing instruction-stream reads in fill forward mode, but then switch to fill full. This could occur because one of the references in the chain of fill forward I-reads misses due to a recent invalidate or due to displacement of Primary cache 14 instruction-stream data by a data-stream cache fill. In this case, the instruction unit 22 will receive more than four fills but will remain in synchronization with the memory management unit 25 because it continually expects to see fills until last-fill is asserted.

Memory access to all data-stream references is implemented by the memory management unit 25 on behalf of the instruction unit 22 (for specifier processing), the memory management unit 25 (for PTE references), and the execution unit 23 (for all other data-stream references).

In general data-stream read processing behaves the same way as instruction-stream read processing except that there is no fill forward or fill full scheme. In other words, only the requested data is shipped to the initiator of the read. From the primary cache 14 point of view, however, a data-stream fill full scheme is implemented since four D-CF commands are still issued to the primary cache 14.

D-stream reads can have a data length of byte, word, longword or quadword. With the exception of the cross-page check function, a quadword read is treated as if its data length were a longword. Thus a data-stream quadword read returns the lower half of the referenced quadword. The source of most data-stream quadword reads is the instruction unit 22. The instruction unit 22 will issue a data-stream longword read to the upper half of the referenced quadword immediately after issuing the quadword read. Thus, the entire quadword of data is accessed by two back-to-back data-stream read operations.

A D-read-lock command on command bus 261 always forces a Primary cache 14 read miss sequence regardless of whether the referenced data was actually stored in the primary cache 14. This is necessary in order that the read propagate out to the cache controller unit 26 so that the memory lock/unlock protocols can be properly processed.

The memory management unit 25 will attempt to process a data stream read after the requested fill of a previous data-stream fill sequence has completed. This mechanism, called "reads under fills", is done to try to return read data to the instruction unit 22 and/or execution unit 23 as quickly as possible, without having to wait for the previous fill sequence to complete. If the attempted read hits in the primary cache 14, the data is returned and the read completes. If the read misses in the S6 pipe, the corresponding fill sequence is not immediately initiated for two reasons: (1) A data-stream cache fill sequence for this read cannot be started because the D-miss latch 253 is full corresponding to the currently outstanding cache fill sequence. (2) The data-stream read may hit in the primary cache 14 once the current fill sequence completes because the current fill sequence may supply the data necessary to satisfy the new data-stream read. Because the Dread has already propagated through the S5 pipe, the read must be stored somewhere in order that it can be restarted in S5. The retry-Dmiss latch 257 is the mechanism by which the S6 read is saved and restarted in the S5 pipe. Once the read is stored in the retry latch 257, it will be retried in S5 after a new data-stream primary cache 14 fill operation has entered the S5 pipe. The intent of this scheme is to attempt to complete the read as quickly as possible by retrying it between primary cache 14 fills and hoping that the last primary cache 14 fill supplied the data requested by the read. The retry latch 257 is invalidated when one of the two conditions is true: (1) the retried read eventually hits in the primary cache 14 without a primary cache 14 parity error, or (2) the retried read misses after the currently outstanding fill sequence completed. In this case, the read is loaded into the D-miss latch 252 and is processed as a normal data-stream miss.

Reads which address I/O space have the physical address bits <31:29> set. I/O space reads are treated by the memory management unit 25 in exactly the same way as any other read, except for the following differences:

(1) I/O space data is never cached in the primary cache 14—therefore, an I/O space read always generates a read-miss sequence and causes the cache controller unit 26 to process the reference, rather than the memory management unit 25.

(2) Unlike a memory space miss sequence, which returns a hexaword of data via four I_CF or D_CF commands, an I/O space read returns only one piece of data via one I_CF or D_CF command—thus the cache controller unit 26 always asserts last-fill on the first and only I_CF or D_CF I/O space operation; if the I/O space read is data-stream, the returned D-CF data is always less than or equal to a longword in length.

(3) I/O space data-stream reads are never prefetched ahead of execution unit 23 execution; an I/O space data-stream read issued from the instruction unit 22 is only processed when the execution unit 23 is known to be stalling on that particular I/O space read. instruction-stream I/O space reads must return a quadword of data.

Write processing in the memory management unit 25 is next examined. All writes are initiated by the memory management unit 25 on behalf of the execution unit 23. The execution unit 23 microcode is capable of generating write references with data lengths of byte, word, longword, or quadword. With the exception of cross-page checks, the memory management unit 25 treats quadword write references as longword write references because the execution unit 23 datapath only supplies a longword of data per cycle. The execution unit 23 writes can be unaligned.

The memory management unit 25 performs the following functions during a write reference: (1) Memory Management checks - The MME unit 254 of the memory management unit 25 checks to be sure the page or pages referenced have the appropriate write access and that the valid virtual address translations are available. (2) The supplied data is properly rotated via rotator 258 to the memory aligned longword boundary. (3) Byte Mask Generation - The byte mask generator 260 of the memory management unit 25 generates the byte mask of the write reference by examining the write address and the data length of the reference. (4) Primary cache 14 writes - The primary cache 14 is a write-through cache; therefore, writes are only written into the primary cache 14 if the write address matches a validated primary cache 14 tag entry. (5) The one exception to this rule is when the primary cache 14 is configured in force data-stream hit mode; in this mode, the data is always written to the primary cache 14 regardless of Whether the tag matches or mismatches. (6) All write references which pass memory management checks are transferred to the cache controller unit 26 via data bus 58; the Cbox processes writes in the Backup cache 15 and controls the protocols related to the write-back memory subsystem.

When write data is latched in the EM-latch 74, the 4-way byte barrel shifter 263 associated with the EM-latch 74 rotates the data into proper alignment based on the lower two bits of the corresponding address. The result of this data rotation is that all bytes of data are now in the correct byte positions relative to memory longword boundaries.

When write data is driven from the EM-latch 74, the internal data bus 264 is driven by the output of the barrel shifter 263 so that data will always be properly aligned to memory longword addresses. Note that, while the data bus 264 is a longword (32-bits) wide, the bus 58 is a quadword wide; the bus 58 is a quadword wide due to the quadword primary cache 14 access size. The quadword access size facilitates primary cache 14 and virtual instruction cache 17 fills. However, for all writes, at most half of bus 58 is ever used to write the primary cache 14 since all write commands modify a longword or less of data. When a write reference propagates from S5-S6, the longword aligned data on bus 264 is transferred onto both the upper and lower halves of bus 58 to guarantee that the data is also quadword aligned to the primary cache 14 and cache controller unit 26. The byte mask corresponding to the reference will control which bytes of bus 58 actually get written into the primary cache 14 or Backup cache 15.

Write references are formed through two distinct mechanisms. First, destination specifier writes are those writes which are initiated by the instruction unit 22 upon decoding a destination specifier of an instruction. When a destination specifier to memory is decoded, the instruction unit 22 issues a reference packet corresponding to the destination address. Note that no data is present in this packet because the data is generated when the execution unit 23 subsequently executes the instruction. The command field of this packet is either a destination-address command (when the specifier had access type of write) or a D-read-modify command (when the specifier had access type of modify). The address of this command packet is translated by the TB, memory management access checks are performed by MME unit 254, and the corresponding byte mask is generated by unit 260. The physical address, DL and other qualifier bits are loaded into the PA queue 65. When the Dest-Addr command completes in S5, it is turned into a NOP command in S6 because no further processing can take place without the actual write data. When the execution unit 23 executes the opcode corresponding to the instruction unit 22 destination specifier, the corresponding memory data to be written is generated. This data is sent to the memory management unit 25 by a Store command. The Store packet contains only data. When the memory management unit 25 executes the Store command in S5, the corresponding PA queue 65 packet is driven into the S5 pipe. The data in the EM-latch is rotated into proper longword alignment using the byte rotator and the lower two bits of the corresponding PA-queue address and are then driven into S5. In effect, the Dest-Addr and Store commands are merged together to form a complete physical address Write operation. This Write operation propagates through the S5/S6 pipeline to perform the write in the primary cache 14 (if the address hits in the primary cache 14) and in the memory subsystem.

An "explicit write" is one generated solely by the execution unit 23. That is, writes which do not result from the instruction unit 22 decoding a destination specifier but rather writes which are explicitly initiated and fully generated by the execution unit 23. An example of an explicit write is a write performed during a MOVC instruction. In this example, the execution unit 23 generates the virtual write address of every write as well as supplying the corresponding data. The physical address queue 65 is never involved in processing an explicit write. Explicit writes are transferred to the memory management unit 25 in the form of a Write command issued by the execution unit 23. These writes directly execute in S5 and S6 in the same manner as when a write packet is formed from the PA queue 65 contents and the Store data.

A write command which addresses I/O space has its physical address bits <31:29> set. I/O space writes are treated by the memory management unit 25 in exactly the same way as any other write, except I/O space data is never cached in the primary cache 14; therefore, an I/O space write always misses in the primary cache 14.

As mentioned above, byte mask generation is performed in the memory management unit 25. Since memory is byte-addressable, all memory storage devices must be able to selectively write specified bytes of data without writing the entire set of bytes made available to the storage device. The byte mask field of write reference packet specifies which bytes within the quadword primary cache 14 access size get written. The byte mask is generated in the memory management unit 25 by the byte mask generator 260 based on the three low-order bits of the address on bus 243 and the data length of the reference contained on the command bus 261 as the DL field. Byte mask data is generated on a read as well as a write in order to supply the byte alignment information to the cache controller unit 26 on bus 262 on an I/O space read.

The memory management unit 25 is the path by which the execution unit 23 transfers data to the MD bus 54 and thus to the instruction unit 22. A new PC value generated in the execution unit 23 is sent via bus 51 and a Load-PC command, and this value propagates through the memory management unit 25 to the MD bus 54. The MD bus is an input to the execution unit 23 to write to the register file 41, but the execution unit 23 does not write to the MD bus.

The Primary Cache (P-Cache)

Referring to FIG. 18, the primary cache 14 is a two-way set-associative, read allocate, no-write allocate, write-through, physical address cache of instruction stream and data stream data. The primary cache 14 has a one-cycle access and a one-cycle repetition rate for both reads and writes. The primary cache 14 includes an 8 Kbyte data memory array 268 which stores 256-hexaword blocks, and stores 256 tags in tag stores 269 and 270. The data memory array 268 is configured as two blocks 271 and 272 of 128 rows. Each block is 256-bits wide so it contains one hexaword of data (four quadwords or 32-bytes); there are four quadword subblocks per block with a valid bit associated with each subblock. A tag is twenty bits wide, corresponding to bits <31:12> of the physical address on bus 243. The primary cache 14 organization is shown in more detail in FIG. 18a; each index (an index being a row of the memory array 268) contains an allocation pointer A, and contains two blocks where each block consists of a 20-bit tag, 1-bit tag parity, four valid bits VB (one for each quadword), 256-bits of data, and 32-bits of data parity. A row decoder 273 receives bits <5:11> of the primary cache 14 input address from the bus 243 and selects 1-of-128 indexes (rows) 274 to output on column lines of the memory array, and column decoders 275 and 276 select 1-of-4 based on bits <3:4> of the address. So, in each cycle, the primary cache 14 selects two quadword locations from the hexaword outputs from the array, and the selected quadwords are available on input/output lines 277 and 278. The two 20-bit tags from tag stores 269 and 271 are simultaneously output on lines 279 and 280 for the selected index and are compared to bits <31:12> of the address on bus 243 by tag compare circuits 281 and 282. The valid bits are also read out and checked; if zero for the addressed block, a miss is signaled. If either tag generates a match, and the valid bit is set, a hit is signalled on line 283, and the selected quadword is output on bus 246. A primary cache 14 miss results in a quadword fill; a memory read is generated, resulting in a quadword being written to the block 271 or 272 via bus 246 and bus 277 or 278. At the same time data is being written to the data memory array, the address is being written to the tag store 269 or 270 via lines 279 or 280. When an invalidate is sent by the cache controller unit 26, upon the occurrence of a write to backup cache 15 or memory 12, valid bits are reset for the index.

The primary cache 14 must always be a coherent cache with respect to the backup cache 15. The primary cache 14 must always contain a strict subset of the data cached in the backup cache 15. If cache coherency were not maintained, incorrect computational sequences could result from reading "stale" data out of the primary cache 14 in multiprocessor system configurations.

An invalidate is the mechanism by which the primary cache 14 is kept coherent with the backup cache 15, and occurs when data is displaced from the backup cache 15 or when backup cache 15 data is itself invalidated. The cache controller unit 26 initiates an invalidate by specifying a hexaword physical address qualified by the Inval command on bus 59, loaded into the cache controller unit 26 latch 250. Execution of an Inval command guarantees that the data corresponding to the specified hexaword address will not be valid in the primary cache 14. If the hexaword address of the Inval command does not match to either primary cache 14 tag in tag stores 269 or 270 in the addressed index 274, no operation takes place. If the hexaword address matches one of the tags the four corresponding subblock valid bits are cleared to guarantee that any subsequent primary cache 14 accesses of this hexaword will miss until this hexaword is re-validated by a subsequent primary cache 14 fill sequence. If a cache fill sequence to the same hexaword address is in progress when the Inval is executed, a bit in the corresponding miss latch 252 or 253 is set to inhibit any further cache fills from loading data or validating data for this cache block.

When a read miss occurs because no validated tag field matches a read address, the value of the allocation bit A is latched in the miss latch 252 or 253 corresponding to the read miss. This latched value will be used as the bank select input during the subsequent fill sequence. As each fill operation takes place, the inverse of the allocation value stored in the miss latch is written into the allocation bit A of the addressed primary cache 14 index 274. During primary cache 14 read or write operations, the value of the allocation bit is set to point to the opposite bank that was just referenced because this is now the new "not-last-used" bank 271 or 272 for this index.

The one exception to this algorithm occurs during an invalidate. When an invalidate clears the valid bits of a particular tag within an index, it only makes sense to set the allocation bit to point to the bank select used during the invalidate regardless of which bank was last allocated. By doing so, it is guaranteed that the next allocated block within the index will not displace any valid tag because the allocation bit points to the tag that was just invalidated.

A primary cache 14 fill operation is initiated by an instruction stream or data stream cache fill reference. A fill is a specialized form of a write operation, functionally identical to a primary cache 14 write except for the following differences:

(1) The bank 271 or 272 within the addressed primary cache 14 index 274 is selected by this algorithm: if a validated tag field 269 or 270 within the addressed index 274 matches the cache fill address, then the block corresponding to this tag is used for the fill operation—if this is not true, then the value of the corresponding allocation bit A selects which block will be used for the fill.

(2) The first fill operation to a block causes all four valid bits of the selected bank to be written such that the valid bit of the corresponding fill data is set and the other three are cleared. All subsequent fills cause only the valid bit of the corresponding fill data to be set.

(3) Any fill operation causes the fill address bits <31:12> to be written into tie tag field of the selected bank. Tag parity is also written in an analogous fashion.

(4) A fill operation causes the allocation bit A to be written with the complement of the value latched by the corresponding miss latch 252 or 253 during the initial read miss event.

(5) A fill operation forces every bit of the corresponding byte mask field to be set. Thus, all eight bytes of fill data are always written into the primary cache 14 array on a fill operation.

A primary cache 14 invalidate operation is initiated by the Inval reference, and is interpreted as a NOP by the primary cache 14 if the address does not match either tag field in the addressed index 274. If a match is detected on either tag, an invalidate will occur on that tag. Note that this determination is made only on a match of the tag field bits rather than on satisfying all criteria for a cache hit operation (primary cache 14 hit factors in valid bits and verified tag parity into the operation). When an invalidate is to occur, the four valid bits of the matched tag are written with zeros and the allocation bit A is written with the value of the bank select used during the current invalidate operation.

The Cache Controller Unit (C-Box)

Figure 19:
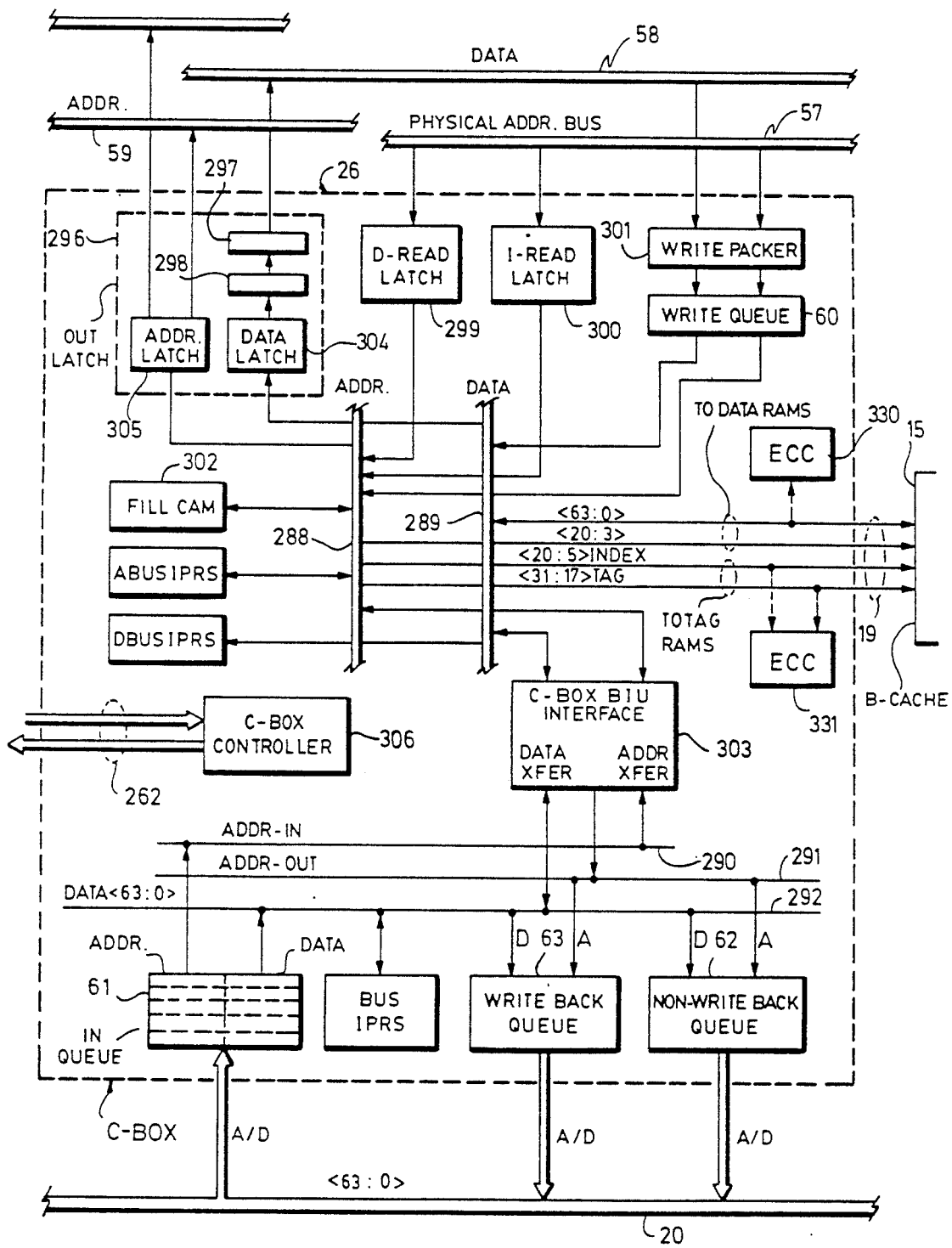
FIG. 19 is an electrical diagram in block form of the cache controller unit or C-box in the CPU of FIG. 1.

Referring to FIG. 19, the cache controller unit 26 includes datapath and control for interfacing to the memory management unit 25, the backup cache 15 and the CPU bus 20. The upper part of FIG. 19 which primarily interfaces to the memory management unit 25 and the backup cache 15 is the cache controller and the lower portion of the Figure which primarily interfaces to the CPU bus 20 is the bus interface unit. The cache controller unit 26 datapath is organized around a number of queues and latches, an internal address bus 288 and internal data bus 289 in the cache control portion, and two internal address buses 290 and 291 and an internal data bus 292 in the bus interface unit. Separate access to the data RAMs 15x and the tag RAMs 15y of the backup cache 15 is provided from the internal address and data buses 288 and 289 by lines 19a and 19b and lines 19c and 19d in the bus 19. The interface to the memory management unit 25 is by physical address bus 57, data bus 58, and the invalidate and fill address bus 59.

The output latch 296 is one entry deep and holds both address and data for fill data or addresses for invalidates being sent to the memory management unit 25 on buses 58 and 59. The two fill-data pipes 297 and 298 are 64-bit latches for pipeline data being sent to the memory management unit 25. The data-read latch 299 is one entry deep and holds the address of a data stream read request coming from the memory management unit 25 on the physical address bus 57. The instruction-read latch 300 is one entry deep and holds the address of an instruction stream read request coming from the memory management unit 25 via physical address bus 57. The write packer 301 is one entry deep and hold both address and data, and functions to compress sequential memory writes to the same quadword. The write queue 60 is eight entries deep and holds both addresses and data for write requests coming from the memory management unit 25 via data bus 58 and physical address bus 57 (via the write packer 301). The fill CAM 302 is two entries deep and holds addresses for read and write misses which have resulted in a read to memory; one may hold the address of an in-progress D-read-lock which has no memory request outstanding. On the bus 20 side, the input queue or in-queue 61 is ten entries deep and holds address or data for up to eight quadword fills and up to two cache coherency transactions from the CPU bus 20. The writeback queue 63 is two entries deep (with a data field of 256-bits) and holds writeback addresses and data to be driven on the CPU bus 20; this queue holds up to two hexaword writebacks. The writeback queue 63 is also used for quadword write-disowns. The non-writeback queue 62 is two entries deep for addresses and data, and holds all non-write-disown transactions going to the CPU bus 20; this includes reads, I/O space transactions, and normal writes which are done when the backup cache 15 is off or during the error transition mode. Note that some of these queues contain address and data entries in parallel (the out latch 296, the write packer 301, the write queue 60, and the writeback and non-writeback queues 63 and 62), some contain only data (fill-data pipes 297 and 298), and some contain only addresses (data-read latch 299, instruction-read latch 300 and the fill CAM 302). Since the CPU bus 20 is a multiplexed bus, two cycles on the bus 20 are needed to load the address and data from an entry in the non-write-back queue 62 to the bus 20, for example. Also, the bus 20 is clocked at a cycle time of three times that of the buses 288, 289 and 292.

For a write request, write data enters the cache controller unit 26 from the data bus 58 into the write queue 60 while the write address enters from the physical address bus 57; if there is a cache hit, the data is written into the data RAMs of the backup cache 15 via bus 289 using the address on bus 288, via bus 19. When a writeback of the block occurs, data is read out of the data RAMs via buses 19 and 289, transferred to the writeback queue 63 via interface 303 and buses 291 and 292, then driven out onto the CPU bus 20. A read request enters from the physical address bus 57 and the latches 299 or 300 and is applied via internal address bus 288 to the backup cache 15 via bus 19, and if a hit occurs the resulting data is sent via bus 19 and bus 289 to the data latch 304 in the output latch 296, from which it is sent to the memory management unit 25 via data bus 58. When read data returns from memory 12, it enters the cache controller unit 26 through the input queue 61 and is driven onto bus 292 and then through the interface 303 onto the internal data bus 289 and into the data RAMs of the backup cache 15, as well as to the memory management unit 25 via output latch 296 and bus 58 as before.

If a read or write incoming to the cache controller unit 26 from the memory management unit 25 does not result in a backup cache 15 hit, the miss address is loaded into the fill CAM 302, which holds addresses of outstanding read and write misses; the address is also driven through the interface 303 to the non-writeback queue 62 via bus 291; it enters the queue 62 to await being driven onto the CPU bus 20 in its turn. Many cycles later, the data returns on the CPU bus 20 (after accessing the memory 12) and enters the input queue 61. The CPU 10 will have started executing stall cycles after the backup cache 15 miss, in the various pipelines. Accompanying the returning data is a control bit on the control bus in the CPU bus 20 which says which one of the two address entries in the fill CAM 302 is to be driven out onto the bus 288 to be used for writing the data RAMs and tag RAMs of the backup cache 15.

When a cache coherency transaction appears on the CPU bus 20, an address comes in through the input queue 61 and is driven via bus 290 and interface 303 to the bus 288, from which it is applied to the tag RAMs of the backup cache 15 via bus 19. If it hits, the valid bit is cleared, and the address is sent out through the address latch 305 in the output latch 296 to the memory management unit 25 for a primary cache 14 invalidate (where it may or may not hit, depending upon which blocks of backup cache 15 data are in the primary cache 14). If necessary, the valid and/or owned bit is cleared in the backup cache 15 entry. Only address bits <31:5> are used for invalidates, since the invalidate is always to a hexaword.

If a writeback is required due to this cache coherency transaction, the index is driven to the data RAMs of the backup cache 15 so the data can be read out. The address is then driven to the writeback queue 62 for the writeback; it is followed shortly by the writeback data on the data buses.

A five-bit command bus 262 from the memory management unit 25 is applied to a controller 306 to define the internal bus activities of the cache controller unit 26. This command bus indicates whether each memory request is one of eight types: instruction stream read, data stream read, data stream read with modify, interlocked data stream read, normal writ e, write which releases lock, or read or write of an internal or external processor register. These commands affect the instruction or data read latches 299 and 300, or the write packer 301 and the write queue 60. Similarly, a command bus 262 goes back to the memory management unit 25, indicating that the data being transmitted during the cycle is a data stream cache fill, an instruction stream cache fill, an invalidate of a hexaword block in the primary cache 14, or a NOP. These command fields also accompany the data in the write queue, for example.

The Floating Point Execution Unit (F-Box)

Figure 20:
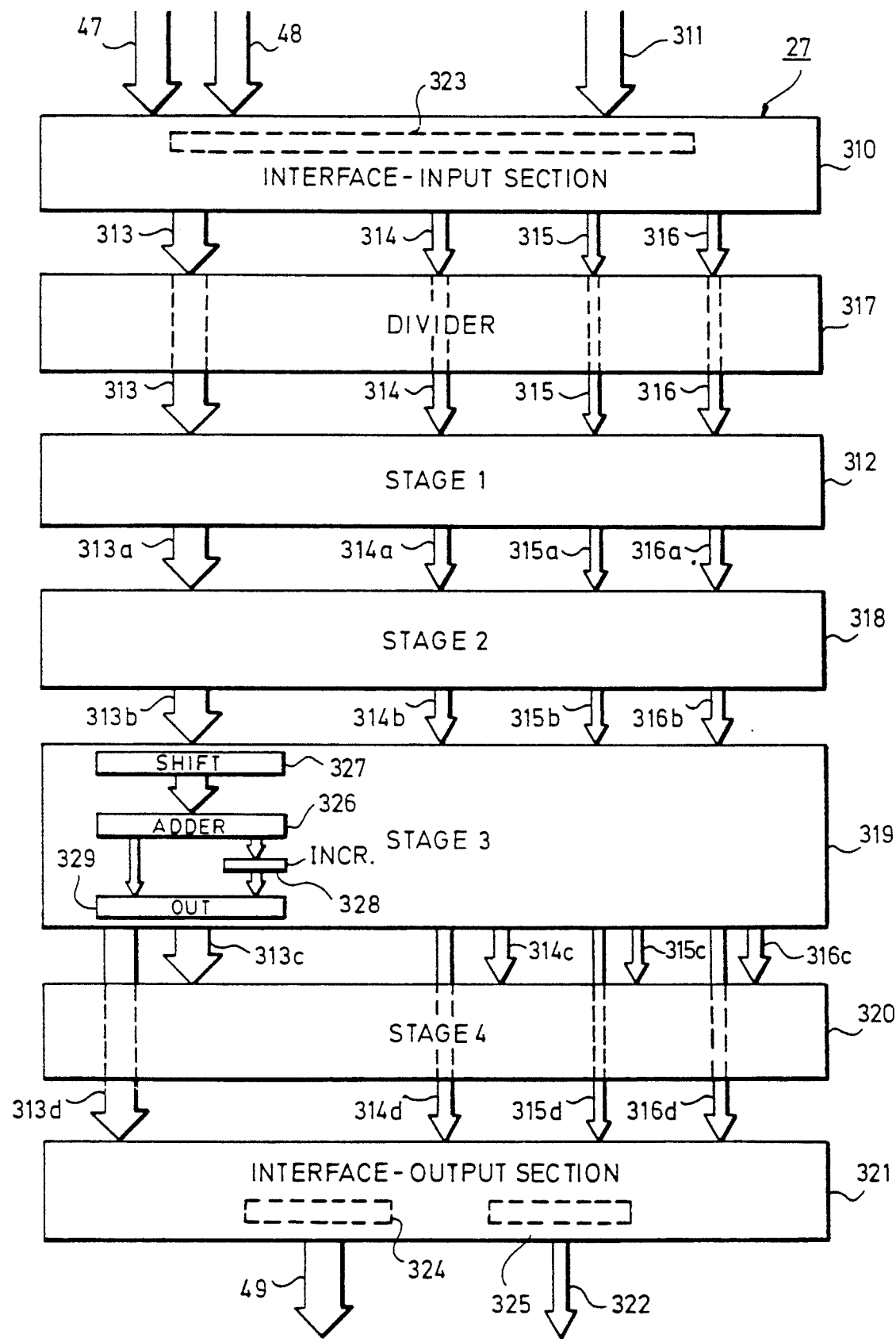
FIG. 20 is an electrical diagram in block form of the floating point execution unit or F-box in the CPU of FIG. 1.

Referring to FIG. 20, the floating point unit 27 is a four-stage pipelined floating point processor, interacting with three different segments of the main CPU pipeline, these being the microsequencer 42 in S2 and the Execution unit 23 in S3 and S4. The Floating point unit 27 runs semiautonomously with respect to the rest of the CPU 10, and it supports several operations. First, it provides instruction and data support for floating point instructions in the instruction set; i.e., an instruction of the floating point type (including various data types) is recognized by the Instruction unit 22 and sent to the Floating point unit 27 for execution instead of to the Execution unit 23. Second, longword integer multiply instructions are more efficiently executed in the Floating point unit 27 than in the Execution unit 23, so when the Instruction unit 22 recognizes these instructions the command and data is sent to the Floating point unit 27. The Floating point unit 27 is pipelined, so, except for the divide instructions, the Floating point unit 27 can start a new single precision floating point instruction every cycle, and start a new double precision floating point instruction or an integer multiply instruction every two cycles. The Execution unit 23 can supply to the Floating point unit 27 two 32-bit operands, or one 64-bit operand, every machine cycle on two input operand buses 47 and 48. The Floating point unit 27 drives the result operand to the Execution unit 23 on the 32-bit result bus 49.

In FIG. 20, the two 32-bit data busses 47 and 48 are applied to an interface section 310, and control bits from the microinstruction bus and instruction context are applied by an input 311. Ibis interface section 310 functions to oversee the protocol used in interfacing with the execution unit 23. The protocol includes the sequence of receiving the opcode and control via lines 311, operands via lines 47 and 48, and also outputting the result via bus 49 along with its accompanying status. The opcode and operands are transferred from the interface section 310 to the stage one unit 312 (for all operations except division) by lines 313, 314, 315 and 316. That is, the divider unit 317 is bypassed by all operations except division. The lines 313 carry the fraction data of the floating point formatted data, the lines 314 carry the exponent data, the lines 315 carry the sign, and the lines 316 carry control information. The divider 317 receives its inputs from the interface 313 and drives its outputs to stage one unit 317, and is used only to assist the divide operation, for which it computes the quotient and the remainder in redundant format.

The stage one unit 312 receives its inputs from either the divider 317 or the interface section 310 via lines 313, 314, 315 and 316 and drives its outputs 313a, 314a, 315a, and 316a to the stage two section 318. Stage one is used for determining the difference between the exponents of the two operands, subtracting the fraction fields, performing the recoding of the multiplier and forming three times the multiplicand, and selecting the inputs to the first two rows of the multiplier array.

The stage two unit 318 receives its inputs from the stage one unit 312, and drives its outputs to the stage three unit 319 via lines 313b, 314b, 315b and 316b. The stage two unit functions are right shift for alignment, multiplying the fraction fields of the operands, and zero and leading one detection of the intermediate fraction results.

The stage three unit 319 receives most of its inputs from the stage two unit 318, and drives its outputs to the stage four unit 320 via lines 313c, 314c, 315c, and 316c or, conditionally, drives it outputs to the output interface section 321 via lines 313d, 314d, 315d and 316d. The primary functions of the stage three unit 319 are left shifting (normalization), and adding the fraction fields for the aligned operands or the redundant multiply array outputs. The stage three unit 319 can also perform a "mini-round" operation on the least significant bits of the fraction for Add, Subtract and Multiply floating point instructions; if the mini-round does not produce a carry, and if there are no possible exceptions, then stage three drives the result directly to the output section 321, bypassing stage four unit 320 and saving a cycle of latency.

The stage four unit 320 receives its inputs from the stage three unit 319 and drives its outputs to the output interface section 321. Ibis stage four is used for performing the terminal operations such as rounding, exception detection (overflow, underflow, etc.), and determining the condition codes.

The floating point unit 27 depends upon the execution unit 23 for the delivery of instruction opcodes and operands via busses 47, 48 and 311, and for the storing of results sent by the bus 49 and control lines 322. However, the floating point unit 27 does not require any assistance from the execution unit 23 in executing the floating point unit 27 instructions. The floating point macroinstructions are decoded by the instruction unit 22 just like any other macroinstruction and the microsequencer 24 is dispatched to an execution flow which transfers the source operands, fetched during the S3 pipeline stage, to the floating point unit 27 early in the S4 stage. Once all the operands are delivered, the floating point unit 27 executes the macroinstruction. Upon completion, the floating point unit 27 requests to transfer the results back to the execution unit 23. When the current retire queue entry in the execution unit 23 indicates a floating point unit 27 result and the floating point unit 27 has requested a result transfer via lines 322, then the result is transferred to the execution unit 23 via bus 49, late in S4 of the pipeline, and the macroinstruction is retired in S5.

The floating point unit 27 input interface 310 has two input operand registers 323 which can hold all of the data for one instruction, and a three segment opcode pipeline. If the floating point unit 27 input is unable to handle new opcodes or operands then an input-stall signal is asserted by the floating point unit 27 to the execution unit 23, causing the next floating point unit 27 data input operation to stall the CPU pipeline at the end of its S3 pipe stage.

The floating point unit 27 output interface 321 has a format mux and two result queues, these being the data queue 324 and the control queue 325. The format mux is used to transform the result into VAX storage format. The queues 324 and 325 are used to hold results and control information whenever result transfers to the execution unit 23 become stalled.

Whenever the floating point unit 27 indicates that it is ready to receive new information by negating the input-stall signal, the execution unit 23 may initiate the next opcode or operand transfer. The floating point unit 27 receives instructions from the microsequencer (S2 of the CPU pipeline) on a 9-bit opcode bus (part of control lines 311).

The stage three unit 319 is used primarily to left shift an input, or to perform the addition of two inputs in an adder 326. This stage contains a control section and portions of the fraction, exponent and sign datapaths. In addition, this stage three unit has the capability to bypass the stage four unit's rounding operation for certain instructions. The fraction datapath portion of stage three consists of a left shifter 327, an adder 326, and mini-rounding incrementers 328. The left shifter 327 is used for subtraction-like operations. The adder 326 is used by all other operations either to pass an input to the output 329 (by adding zero), or to add two vectors—for example, the two input operands (correctly aligned) for addition/subtraction, or the sum and carry vectors for multiplication. The mini-rounding incrementers 328 are used to round the fraction result during a stage four bypass operation.

For certain instructions and conditions, stage three unit 319 can supply the result to the output interface 321 directly, which is referred to as a stage four bypass and which improves the latency of the floating point unit 27 by supplying a result one full cycle earlier than the stage four result is supplied. In order to bypass stage four, stage three must perform the required operations that stage four would normally perform under the same conditions. This includes rounding the fraction, as well as supplying the correct exponent and generation of the condition codes and status information that is related to the result. This bypass is only attempted for Add, Subtract and Multiply floating point instructions. Stage three performs the rounding operation through the use of the incrementers 328, which only act on the least significant bits. That is, due to timing constraints, these incrementers 328 are much smaller in width than the corresponding rounding elements in the full-width rounding done in stage four. Because of the limited size of the incrementers 328, not all fraction datums can be correctly rounded by stage three. The mini-round succeeds if the incrementer 328 for an instruction being bypassed does not generate a carry out. If the mini-round fails, the unmodified fraction via output 329 and lines 313c to stage four, and the bypass is aborted.

Stage three unit 319 and stage four unit 320 share common busses to drive the results to output interface 321. Stage four will drive the lines 313d, 314d, 315d and 316d, during phi3, if it has valid data. Stage three will drive the lines 313d, 314d, 315d and 316d, during phi3, if it can successfully bypass an instruction and stage four does not have valid data. When stage three has detected that a bypass may be possible it signals the output interface 321 by asserting a bypass-request on one of control lines 316d. The following conditions must be met in order to generate a stage four bypass request: a bypass-enable signal must be asserted; the instruction must be an Add, Subtract, or Multiply; the stage three input data must be valid; a result must not have been sent to stage four in the previous cycle; there are no faults associated with the data. In order to abort a stage four bypass, a bypass-abort signal must be asserted during phi2. Either of two conditions abort a stage four bypass, assuming the bypass request was generated: a mini-round failure, meaning the incrementer 328 produced a carry out of its most significant bit position; or exponent overflow or underflow is detected on an exponent result in the exponent section of stage three.

The ability to bypass the last stage of the pipeline of the floating point unit 27 for most instructions serves to increase performance by a significant amount. Analysis shows that a majority of the instructions executed by the floating point unit 27 will satisfy the requirements for a bypass operation, and so the average execution time is reduced by one cycle.

Internal Processor Registers

Each of the components of the CPU 10 as discussed above has certain internal processor registers, as is the usual practice. For example, the execution unit 23 contains the PSL or processor state latch and several others, the memory management unit 25 has processor registers to hold state and control or command, as does the floating point unit 27 and the cache controller unit 26, etc. These registers are numbered less than 256, so an 8-bit address can be used to address these registers. The 8-bit address is generated by the microcode from control ROM 43. Internal to the chip of CPU 10, the address of a processor register is carried on an 8-bit part of an internal address bus, and control lines are routed to specify that the current reference is to a processor register rather than being a memory reference or an I/O reference, for example. Some of the processor registers are off-chip, however, and must be accessed by the bus 20. The bus 20 uses memory mapped I/O and generally has a minimum of extra control lines to say what special transaction is driven onto the bus. Thus, to avoid having to add processor register signal lines to the bus 20, and to have memory-mapped access to the external processor registers, the internal 8-bit address (plus its control signal signifying a processor register access) is translated in the C-box controller 306 to a full-width address by adding bits to <31:30>, for example, of the outgoing address onto bus 20, to specify an external processor register. The external address is the combination of the internal low-order 8-bit address, just as generated by the microcode, plus the added high-order bits to specify on the bus 20 that a processor register is being accessed.

The CPU Bus

Figure 21:
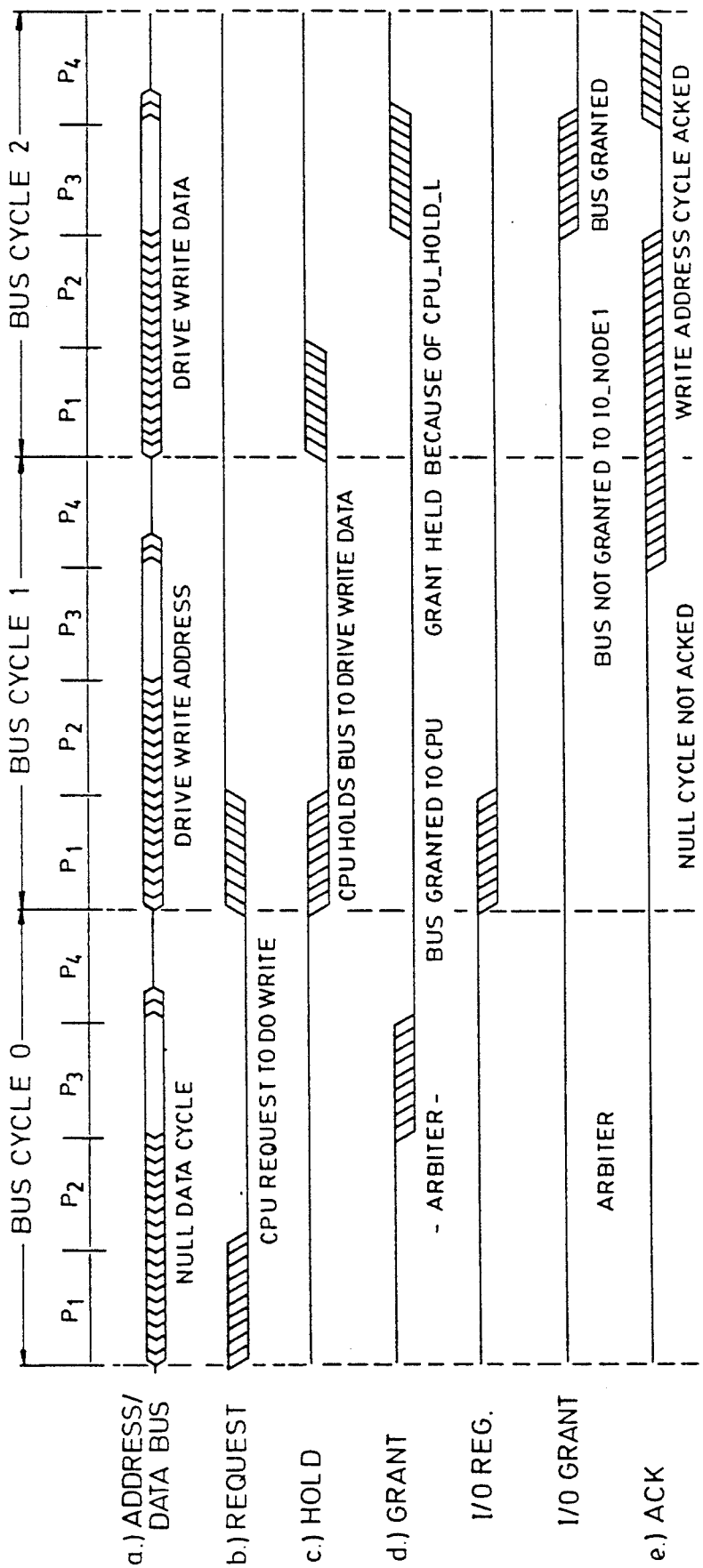
FIG. 21 is a timing diagram of events occuring on the CPU bus in the system of FIG. 1.

The CPU bus 20 is a pended, synchronous bus with centralized arbitration. By "pended" is meant that several transactions can be in process at a given time, rather than always waiting until a memory request has been fulfilled before allowing another memory request to be driven onto the bus 11. The Cache controller unit 26 of the CPU 10 may send out a memory read request, and, in the several bus cycles before the memory 12 sends back the data in response to this request, other memory requests may be driven to the bus 20. The ID field on the command bus portion of the bus 20 when the data is driven onto the bus 20 specifies which node requested the data, so the requesting node can accept only its own data. In FIG. 21, a timing diagram of the operation of the bus 20 during three cycles is shown. These three cycles are a null cycle-0 followed by a write sequence; the write address is driven out in cycle-1, followed by the write data in cycle-2. FIG. 21a shows the data or address on the 64-bit data/address bus. FIGS. 21b–21e show the arbitration sequence. In cycle-0 the CPU 10 asserts a request to do a write by a request line being driven low from P2 to P4 of this cycle, seen in FIG. 21b. As shown in FIG. 21d, the arbiter in the bus interface 21 asserts a CPU-grant signal beginning at P2 of cycle-0, and this line is held down (asserted) because the CPU 10 asserts the CPU-hold line as seen in FIG. 21c. The hold signal guarantees that the CPU 10 will retain control of the bus, even if another node such as an I/O 13a or 13b asserts a request. The hold signal is used for multiple-cycle transfers, where the node must keep control of the bus for consecutive cycles. After the CPU releases the hold line at the end of P4 of cycle-1, the arbiter in the interface unit 21 can release the grant line to the CPU in cycle-2. The acknowledge line is asserted by the bus interface 21 to the CPU 10 in the cycle after it has received with no parity errors the write address which was driven by the CPU in cycle-1. Not shown in FIG. 21 is another acknowledge which would be asserted by the bus interface 21 in cycle-3 if the write data of cycle-2 is received without parity error. The Ack must be asserted if no parity error detected in the cycle following data being driven.

Figure 22:
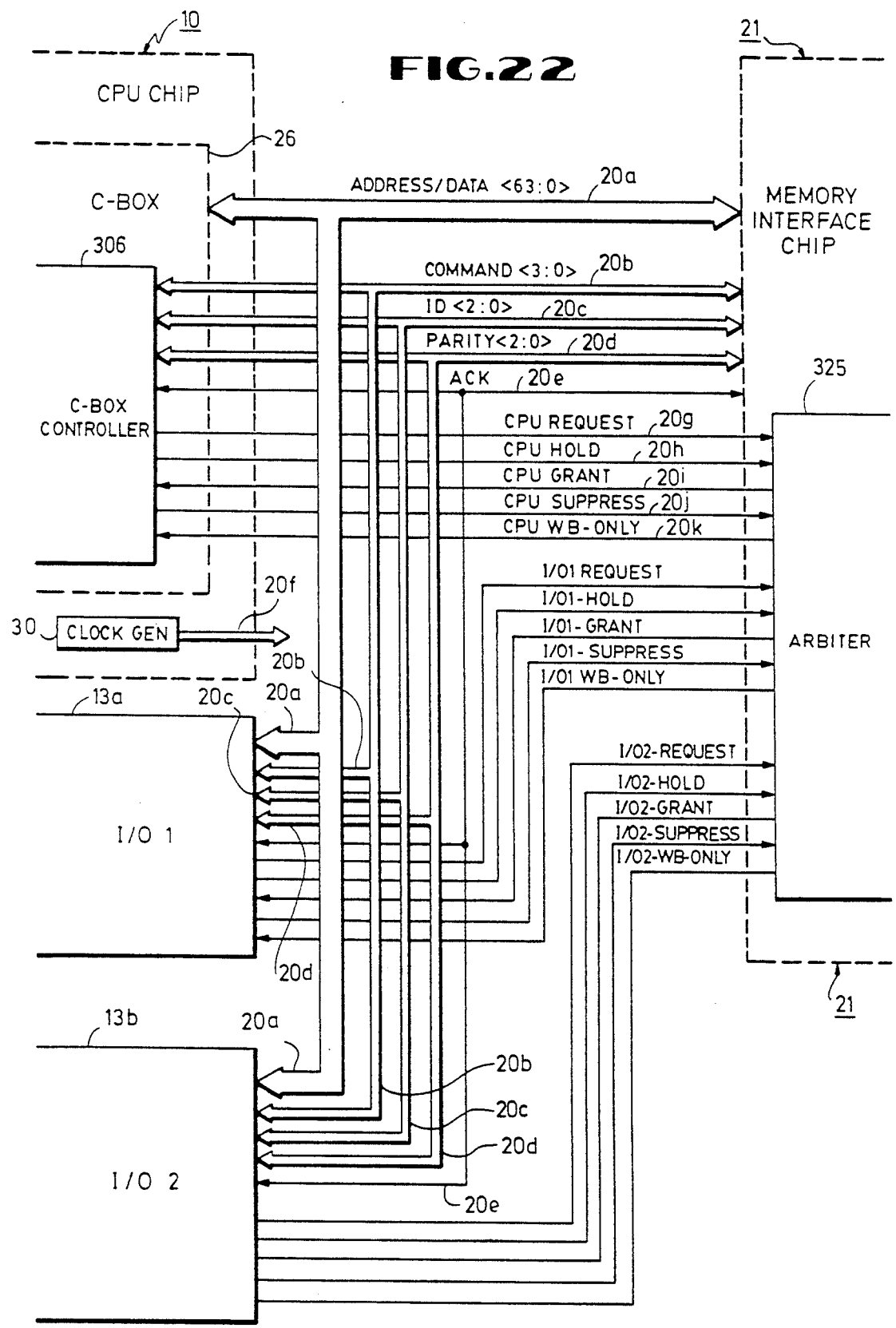
FIG. 22 is an electrical diagram of the conductors used in the CPU bus in the system of FIG. 1.

Referring to FIG. 22, the bus 20 consists of a number of lines in addition to the 64-bit, multiplexed address-/data lines 20a which carry the addresses and data in alternate cycles as seen in FIG. 21a. The lines shared by the nodes on the bus 20 (the CPU 10, the I/O 13a, the I/O 13b and the interface chip 21) include the address-/data bus 20a a four-bit command bus 20b which specifies the current bus transaction during a given cycle (write, instruction stream read, data stream read, etc.), a three-bit ID bus 20c which contains the identification of the bus commander during the address and return data cycles (each commander can have two read transactions outstanding), a three-bit parity bus 20d, and the acknowledge line 20e. All of the command encodings for the command bus 20b and definitions of these transactions are set forth in Table A, below. The CPU also supplies the four-phase bus clocks of FIG. 3 from the clock generator 30 on lines 20f.

In addition to these shared lines in the bus 20, each of the three active nodes CPU 10, I/O 13a and I/O 131b individually has the request, hold and grant lines 20g, 20h and 20i as discussed above, connecting to the arbiter 325 in the memory interface chip 21. A further function is provided by a suppress line 20j, which is asserted by the CPU 10, for example, in order to suppress new transactions on the bus 20 that the CPU 10 treats as cache coherency transactions. It does this when its two-entry cache coherency queue 61 is in danger of overflowing. During the cycle when the CPU 10 asserts the suppress line 20j, the CPU 10 will accept a new transaction, but transactions beginning with the following cycle are suppressed (no node will be granted command of the bus). While the suppress line 20j is asserted, only fills and writebacks are allowed to proceed from any nodes other than the CPU 10. The CPU 10 may continue to put all transactions onto the bus 20 (as long as WB-only line 20k is not asserted). Because the in-queue 61 is full and takes the highest priority within the cache controller unit 26, the CPU 10 is mostly working on cache coherency transactions while the suppress line 20j is asserted, which may cause the CPU 10 to issue write-disowns on the bus 20. However, the CPU 10 may and does issue any type of transaction while its suppress line 20j is asserted. The I/O nodes 13a and 13b have a similar suppress line function.

The writeback-only or WB-only line 20k, when asserted by the arbiter 325, means that the node it is directed to (e.g., the CPU 10) will only issue write-disown commands, including write disowns due to write-unlocks when the cache is off. Otherwise, the CPU 10 will not issue any new requests. During the cycle in which the WB-only line 20k is asserted to the CPU 10, the system must be prepared to accept one more non-writeback command from the CPU 10. Starting with the cycle following the assertion of WB-only, the CPU 10 will issue only writeback commands. The separate writeback and non-writeback queues 63 and 62 in the cache controller unit 26 of FIG. 19 allow the queued transactions to be separated, so when the WB-only line 20k is asserted the writeback queue 62 can be emptied as needed so that the other nodes of the system continue to have updated data available in memory 12.

When any node asserts its suppress line 20j, no transactions other than writebacks or fills must be driven onto the bus 20, starting the following cycle. For example, when the CPU 10 asserts its suppress line 20j, the arbiter 325 can accomplish this by asserting WB-only to both I/O 13a and I/O 13b, so these nodes do not request the bus except for fills and writebacks. Thus, assertion of suppress by the CPU 10 causes the arbiter 325 to assert WB-only to the other two nodes 13a and 13b. Or, assertion of suppress by I/O 13a will cause the arbiter 325 to assert WB-only to CPU 10 and I/O 13b. The Hold line 20h overrides the suppress function.

The rules executed by the arbiter 325 are as follows: (1) any node may assert its request line 20g during any cycle; (2) a node's grant line 20i must be asserted before that node drives the bus 20; (3) a driver of the bus 20 may only assert its hold line 20h if it has been granted the bus for the current cycle; (4) if a node has been granted the bus 20, and it asserts hold, it is guaranteed to be granted the bus 20 in the following cycle; (5) hold line 20h may be used in two cases, one to hold the bus for the data cycles of a write, and the other to send consecutive fill cycles; (6) hold must be used to retain the bus for the data cycles of a write, as the cycles must be contiguous with the write address cycle; (7) hold must not be used to retain the bus 20 for new transactions, as arbitration fairness would not be maintained; (8) if a node requests the bus 20 and is granted the bus, it must drive the bus during the granted cycle with a valid command—NOP is a valid command—the CPU 10 takes this a step further and drives NOP if it is granted the bus when it did not request it; (9) any node which issues a read must be able to accept the corresponding fills as they cannot be suppressed or slowed; (10) if a node's WB-only line 20k is asserted, it may only drive the bus 20 with NOP, Read Data Return, Write Disown, and other situations not pertinent here; (11) if a node asserts its Suppress line 20j, the arbiter 325 must not grant the bus to any node except that one in the next cycle—at the same time the arbiter must assert the appropriate WB-only lines (in the following cycle, the arbiter must grant the bus normally); (12) the rules for Hold override the rules for Suppress; (13) the bus 20 must be actively driven during every cycle.

The bus 20a bits <63:0>, is employed for information transfer. The use of this field <63:0> of bus 20a is multiplexed between address and data information. On data cycles the lines <63:0> of bus 20a represent 64-bits of read or write data. On address cycles the lines <63:0> of bus 20a represent address in bits <31:0>, byte enable in bits <55:40>, and length information in bits <63:62>. There are several type of bus cycles as defined in Table A. Four types of data cycles are: Write Data, Bad Write Data, Read Data Return, and Read Data Error. During write data cycles the commander (e.g., the cache controller unit 26 of the CPU 10) first drives the address cycle onto bus 20, including its ID on ID bus 20c, and then drives data on bus 20a in the next cycle, again with its ID. The full 64-bits of data on bus lines 20a are written during each of four data cycles for hexaword writes; for octaword and quadword length writes, the data bytes which are written correspond to the byte enable bits which were asserted during the address cycle which initiated the transaction. During Read Data Return and Read Data Error cycles the responder drives on lines 20c the ID of the original commander (i.e., the node, such as CPU 10, which originated the read).

The address cycle on bus 20a is used by a commander (i.e., the originating node, such as CPU 10) to initiate a bus 20 transaction. On address cycles the address is driven in the lower longword <31:0> of the bus, and the byte enable and transaction length are in the upper longword. The address space supported by the bus 20 is divided into memory space and I/O space. The lower 32-bits of the address cycle bits <31:0> define the address of a bus 20 read or write transaction. The bus 20 supports a 4-Gigabyte ($2^{32}$ byte) address space. The most significant bits of this address (corresponding to lines <31:29>) select 512-Mb I/O space (<31:29>=111) or 3.5-Gb memory space (<31:29>=000 ... 110). The division of the address space in the I/O region is further defined to accommodate the need for separate address spaces for CPU 10 node and I/O nodes 13a and 13b. Address bits <31:0> are all significant bits in an address to I/O space. Although the length field <63:62> on the bus 20 always specifies quadword for I/O space reads and writes, the actual amount of data read or written may be less than a quadword. The byte enable field <55:40> is used to read or write the requested bytes only. If the byte enable field indicates a 1-byte read or write, every bit of the address is significant. The lower bits of the address are sometimes redundant in view of the byte enable field, but are provided on the bus 20a so that the I/O adapters do not have to deduce the address from the byte enable field.

All reads have significant bits in their address down to the quadword (bit <3> of the address. Although fills (which are hexaword in length) may be returned with quadwords in any order, there is a performance advantage if memory 12 returns the requested quadword first. The bus 20 protocol identifies each quadword using one of the four Read Data Return commands on bus 20b, as set forth in Table A, so that quadwords can be placed in correct locations in backup cache 15 by the cache controller unit 26, regardless of the order in which they are returned. Quadword, octaword and hexaword writes by the CPU 10 are always naturally aligned and driven onto the bus 20 in order from the lowest-addressed quadword to the highest.

The Byte Enable field is located in bits <55:40> of the bus 20a during the address cycle. It is used to supply byte-level enable information for quadword-length Own-Reads, I-stream-Reads, D-stream-Reads, and octaword-length Writes, and Write-Disowns. Of these types of transactions using byte enables, the CPU 10 generates only quadword I-stream-Reads and D-stream-Reads to I/O space, quadword Writes to I/O space, and quadword Writes and Write-Disowns to memory space.

The length field at bits <63:62> of the address cycle on the bus 20a is used to indicate the amount of data to be read or written for the current transaction, i.e., hexaword, quadword or octaword (octaword is not used in a typical embodiment).

The Bad Write Data command appearing on the bus 20b, as listed in Table A, functions to allow the CPU 10 to identify one bad quadword of write data when a hexaword writeback is being executed. The cache controller unit 26 tests the data being read out of the backup cache 15 on its way to the bus 20 via writeback queue 62. If a quadword of the hexaword shows bad parity in this test, then this quadword is sent by the cache controller unit 26 onto the bus 20 with a Bad Write Data command on the bus 20b, in which case the memory 12 will receive three good quadwords and one bad in the hexaword write. Otherwise, since the write block is a hexaword, the entire hexaword would be invalidated in memory 12 and thus unavailable to other CPUs. Of course, error recovery algorithms must be executed by the operating system to see if the bad quadword sent with the Bad Write Data command will be catastrophic or can be worked around.

As described above, the bus 20 is a 64-bit, pended, multiplexed address/data bus, synchronous to the CPU 10, with centralized arbitration provided by the interface chip 21. Several transactions may be in process at a given time, since a Read will take several cycles to produce the read-return data from the memory 12 and meanwhile other transactions may be interposed. Arbitration and data transfer occur simultaneously (in parallel) on the bus 20. Four nodes are supported: the CPU 10, the system memory (via bus 11 adn interface chip 21) and two I/O nodes 13a and 13b. On the 64-bit bus 20a, data cycles (64-bits of data) alternate with address cycles containing 32-bit addresses plus byte masks and data length fields; a parallel command and arbitration bus carries a command on lines 20b, an identifier field on lines 20c defining which node is sending, and an Ack on line 20e; separate request, hold, grant, suppress and writeback-only lines are provided to connect each node to the arbiter 325.

Error Transition Mode

The backup cache 15 for the CPU 10 is a "writeback" cache, so there are times when the backup cache 15 contains the only valid copy of a certain block of data, in the entire system of FIG. 1. The backup cache 15 (both tag store and data store) is protected by ECC. Check bits are stored when data is written to the cache 15 data RAM or written to the tag RAM, then these bits are checked against the data when the cache 15 is read, using ECC check circuits 330 and 331 of FIG. 19. When an error is detected by these ECC check circuits, an Error Transition Mode is entered by the C-box controller 306; the backup cache 15 can't be merely invalidated, since other system nodes 28 may need data owned by the backup cache 15. In this error transition mode, the data is preserved in the backup cache 15 as much as possible for diagnostics, but operation continues; the object is to move the data for which this backup cache 15 has the only copy in the system, back out to memory 12, as quickly as possible, but yet without unnecessarily degrading performance. For blocks (hexawords) not owned by the backup cache 15, references from the memory management unit 25 received by the cache controller unit 26 are sent to memory 12 instead of being executed in the backup cache 15, even if there is a cache hit. For blocks owned by the backup cache 15, a write operation by the CPU 10 which hits in the backup cache 15 causes the block to be written back from backup cache 15 to memory 12, and the write operation is also forwarded to memory 12 rather than writing to the backup cache 15; only the ownership bits are changed in the backup cache 15 for this block. A read hit to a valid-owned block is executed by the backup cache 15. No cache fill operations are started after the error transition mode is entered. Cache coherency transactions from the system bus 20 are executed normally, but this does not change the data or tags in the backup cache 15, merely the valid and owned bits. In this manner, the system continues operation, yet the data in the backup cache 15 is preserved as best it can be, for later diagnostics.

Thus, when the cache controller unit 26 detects uncorrectable errors using the ECC circuits 330 and 331, it enters into Error Transition Mode (ETM). The goals of the cache controller unit 26 operation during ETM are the following: (1) preserve the state of the cache 15 as much as possible for diagnostic software; (2) honor memory management unit 25 references which hit owned blocks in tie backup cache 15 since this is the only source of data in the system; (3) respond to cache coherency requests received from the bus 20 normally.

Once the cache controller unit 26 enters Error Transition Mode, it remains in ETM until software explicitly disables or enables the cache 15. To ensure cache coherency, the cache 15 must be completely flushed of valid blocks before it is re-enabled because some data can become stale while the cache is in ETM.

Table B describes how the backup cache 15 behaves while it is in ETM. Any reads or writes which do not hit valid-owned during ETM are sent to memory 12: read data is retrieved from memory 12, and writes are written to memory 12, bypassing the cache 15 entirely. The cache 15 supplies data for Ireads and Dreads which hit valid-owned; this is normal cache behavior. If a write hits a valid-owned block in the backup cache 15, the block is written back to memory 12 and the write is also sent to memory 12. The write leaves the cache controller unit 26 through the non-writeback queue 62, enforcing write ordering with previous writes which may have missed in the backup cache 15. If a Read-Lock hits valid-owned in the cache 15, a writeback of the block is forced and the Read-Lock is sent to memory 12 (as an Owned-Read on the bus 20). This behavior enforces write ordering between previous writes which may have missed in the cache and the Write-Unlock which will follow the Read-Lock.

The write ordering problem alluded to is as follows: Suppose the cache 15 is in ETM. Also suppose that under ETM, writes which hit owned in the cache 15 are written to the cache while writes which miss are sent to memory 12. Write A misses in the cache 15 and is sent to the non-writeback queue 62, on its way to memory 12. Write B hits owned in the cache 15 and is written to the cache. A cache coherency request arrives for block B and that block is placed in the writeback queue 63. If Write A has not yet reached the bus 20, Writeback B can pass it since the writeback queue has priority over the non-writeback queue. If that happens, the system sees write B while it is still reading old data in block A, because write A has not yet reached memory.

Referring again to Table B, note that a Write-Unlock that hits owned during ETM is written directly to the cache 15. There is only one case where a Write-Unlock will hit owned during ETM: if the Read-Lock which preceded it was performed before the cache entered ETM. (Either the Read-Lock itself or an invalidate performed between the Read-Lock and the Write-Unlock caused the entry into ETM.) In this case, we know that no previous writes are in the non-writeback queue because writes are not put into the non-writeback queue when we are not in ETM. (There may be I/O space writes in the non-writeback queue but ordering with I/O space writes is not a constraint.) Therefore there is not a write ordering problem as in the previous paragraph.

Table B shows that during ETM, cache coherency requests are treated as they are during normal operation, with one exception as indicated by a note. Fills as the result of any type of read originated before the cache entered ETM are processed in the usual fashion. If the fill is as a result of a write miss, the write data is merged as usual, as the requested fill returns. Fills caused by any type of read originated during ETM are not written into the cache or validated in the tag store. During ETM, the state of the cache is modified as little as possible. Table C shows how each transaction modifies the state of the cache.

System Bus Interface

Figure 23:
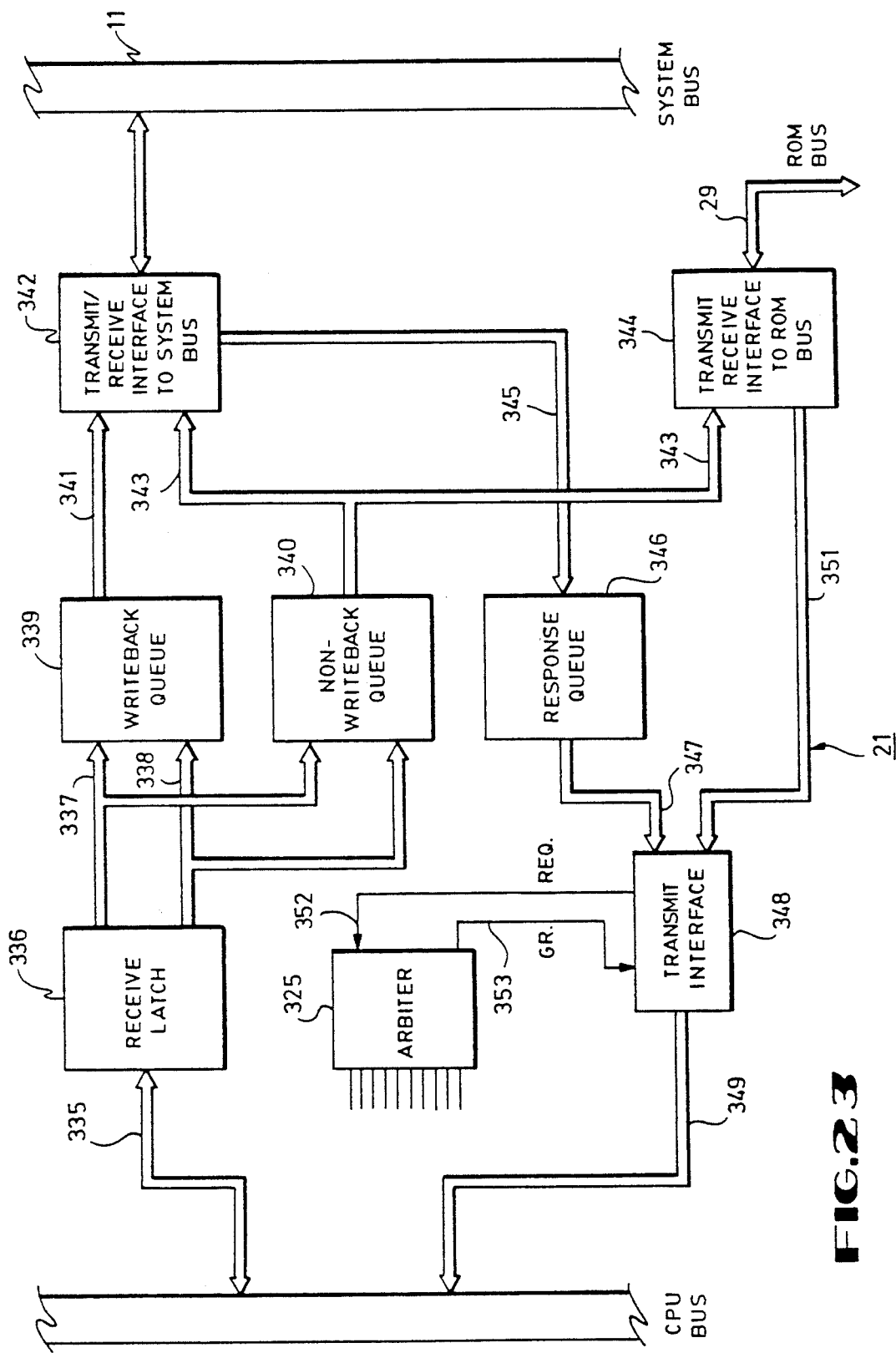
FIG. 23 is an electrical diagram in block form of the bus interface and arbiter unit of the computer system of FIG. 1.

Referring to FIG. 23, the interface unit 21 functions to interconnect the CPU bus 20 with the system bus 11. The system bus 11 is a pended, synchronous bus with centralized arbitration. Several transactions can be in progress at a given time, allowing highly efficient use of bus bandwidth. Arbitration and data transfers occur simultaneously, with multiplexed data and address lines. The bus 11 supports writeback caches by providing a set of ownership commands, as discussed above. The bus 11 supports quadword, octaword and hexaword reads and writes to memory 12. In addition, the bus 11 supports longword-length read and write operations to I/O space, and these longword operations implement byte and word modes required by some I/O devices.

Operating at a bus cycle of 64-nsec, the bus 11 has a bandwidth of 125-Mbytes/sec.

The information on the CPU bus 20 is applied by an input bus 335 to a receive latch 336; this information is latched on every cycle of the bus 20. The bus 335 carries the 64-bit data/address, the 4-bit command, the 3-bit ID and 3-bit parity as discussed above. The latch 336 generates a data output on bus 337 and a control output on bus 338, applied to a writeback queue 339 and a non-writeback queue 340, so the writebacks can continue even when non-writeback transactions are suppressed as discussed above. From the writeback queue 339, outputs 341 are applied only to an interface 342 to the system bus 11, but for the non-writeback queue 340 outputs 343 are applied to either the interface 342 to the system bus 11 or to an interface 344 to the ROM bus 29. Writebacks will always be going to memory 12, whereas non-writebacks may be to memory 12 or to the ROM bus 29. Data received from the system bus 11 at the transmit/receive interface 342 is sent by bus 345 to a response queue 346 as described below in more detail, and the output of this response queue in applied by a bus 347 to a transmit interface 348, from which it is applied to the bus 20 by an output 349 of the interface 348. The incoming data on bus 345, going from system bus 11 to the CPU 10, is either return data resulting from a memory read, or is an invalidate resulting from a write to memory 12 by another processor 28 on the system bus 11. Incoming data from the ROM bus 29 is applied from the transmit/receive interface 344 by bus 351 directly to the interface 348, without queueing, as the data rate is low on this channel. The arbiter 325 in the interface chip 21 produces the grant signals to the CPU 10 as discussed above, and also receives request signals on line 352 from the transmit interface 348 when the interface 348 wants command of the bus 20 to send data, and provides grant signals on line 353 to grant the bus 20 to interface 348.

Figure 25:
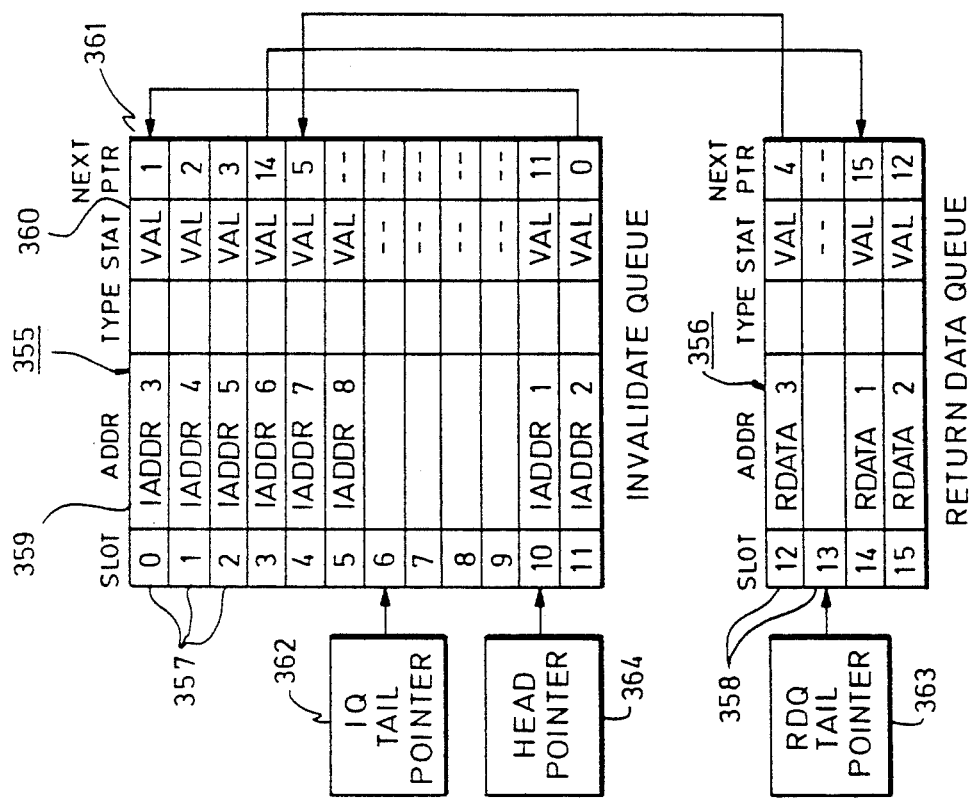
FIG. 25 is a representation of an invalidate queue and a return queue and the combined linking of the next entry to be sent to the CPU.
Figure 24:
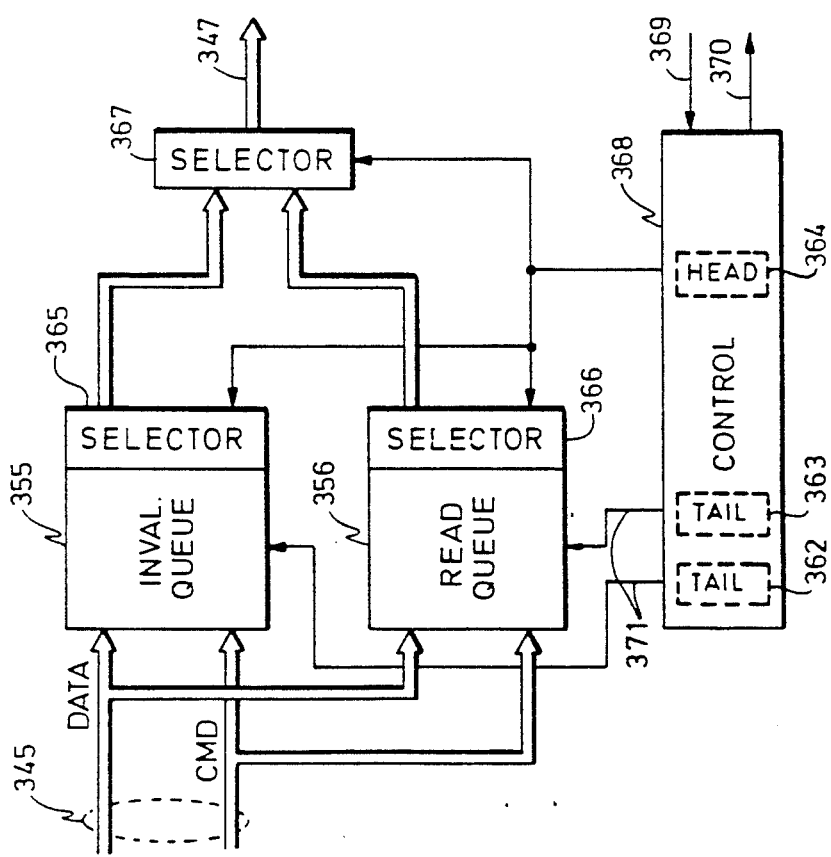
FIG. 24 is an electrical diagram in block form of the invalidate queue and return queue in the bus interface and arbiter unit of FIG. 23.

Referring to FIG. 24, the response queue 346 employs separate queues 355 and 356 for the invalidates and for return data, respectively. The invalidate queue 355 may have, for example, twelve entries or slots 357 as seen in FIG. 25, whereas the return data queue would have four slots 358. There would be many more invalidates than read data returns in a multiprocessor system. Each entry or slot 357 in the invalidate queue includes an invalidate address 359, a type indicator, a valid bit 360, and a next pointer 361 which points to the slot number of the next entry in chronological sequence of receipt. A tail pointer 362 is maintained for the queue 355, and a separate tail pointer 363 is maintained for the queue 356; when a new entry is incoming on the bus 345 from the system bus 11, it is loaded to one of the queues 355 or 356 depending upon its type (invalidate or read data), and into the slot 357 or 358 in this queue as identified by the tail pointer 362 or 363. Upon each such load operation, the tail pointer 362 or 363 is incremented, wrapping around to the beginning when it reaches the end. Entries are unloaded from the queues 355 and 356 and sent on to the transmitter 348 via bus 347, and the slot from which an entry is unloaded is defined by a head pointer 364. The head pointer 364 switches between the queues 355 and 356; there is only one head pointer. The entries in queues 355 and 356 must be forwarded to the CPU 10 in the same order as received from the system bus 11. The head pointer 364 is an input to selectors 365, 366 and 367 which select which one of the entries is output onto bus 347. A controller 368 containing the head pointer 364 and the tail pointer 362 and 363 sends a request on line 369 to the transmitter 348 whenever an entry is ready to send, and receives a response on line 370 indicating the entry has been accepted and sent on to the bus 20. At this time, the slot just sent is invalidated by line 371, and the head pointer 364 is moved to the next pointer value 361 in the slot just sent. The next pointer value may be the next slot in the same queue 355 or 356, or it may point to a slot in the other queue. Upon loading an entry in the queues 355 or 356, the value in next pointer 361 is not inserted until the following entry is loaded since it is not known until than whether this will be an invalidate or a return data entry.

The interface chip 21 provides the memory interface for CPU 10 by handling CPU memory and I/O requests on the system bus 11. On a memory Read or Write miss in the backup cache 15, the interface 21 sends a Read on system bus 11 followed by a cache fill operation to acquire the block from main memory 12. The interface chip 21 monitors memory Read and Write traffic generated by other nodes on the system bus 11 such as CPUs 28 to ensure that the CPU 10 caches 14 and 15 remain consistent with main memory 12. If a Read or Write by another node hits the cache 15, then a Writeback or Invalidate is performed by the CPU 10 chip as previously discussed. The interface chip 21 also handles interrupt transactions to and from the CPU.

The system bus 11 includes a suppress signal as discussed above with respect to the CPU bus 20 (i.e., line 20$j$), and this is used to control the initiation of new system bus 11 transactions. Assertion of suppress on the system bus 11 blocks all bus commander requests, thus suppressing the initiation of new system bus 11 transactions. This bus 11 suppress signal may be asserted by any node on bus 11 at the start of each bus 11 cycle to control arbitration for the cycle after the next system bus 11 cycle. The interface chip 21 uses this suppress signal to inhibit transactions (except Writeback and Read Response) on the system bus 11 when its invalidate queue 355 is near full in order to prevent an invalidate queue 355 overflow.

The interface chip 21 participates in all bus 20 transactions, responding to Reads and Writes that miss in the backup cache 15, resulting in a system bus 11 Ownership Read operation and a cache fill. The interface chip 21 latches the address/data bus 20$a$, command bus 20$b$, ID bus 20$c$, and parity 20$d$, into the latch 336 during every bus 20 cycle, then checks parity and decodes the command and address. If parity is good and the address is recognized as being in interface chip 21 space, then Ack line 20$e$ is asserted and the information is moved into holding registers in queues 339 or 340 so that the latches 336 are free to sample the next cycle. Information in these holding registers will be saved for the length of the transaction.

The arbiter 325 for the bus 20 is contained in the interface chip 21. The two nodes, CPU 10 and interface chip 21, act as both Commander and Responder on the bus 20. Both the CPU 10 and interface chip 21 have read data queues which are adequate to handle all outstanding fill transactions. CPU-suppress line 20$j$ inhibits grant for one bus 20 cycle during which the WB-Only signal is asserted by interface chip 21 on line 20$k$.

If the in-queue 61 in the cache controller unit 26 fills up, it asserts CPU-suppress line 20$j$ and interface chip 21 stops sending invalidates to the bus 20 (the system bus 11 is suppressed only if the input queue 355 of the interface chip 21 fills up). Interface chip 21 continues to send fill data until an invalidate is encountered.

When the interface chip 21 writeback queue 339 fills up, it stops issuing Grant to CPU 10 on line 20i. If the interface chip 21 non-writeback queue 340 fills up, it asserts WB-Only to CPU 10 on line 20k.

The following CPU 10 generated commands are all treated as a Memory Read by the interface chip 21 (the only difference, seen by the interface chip 21, is how each specific command is mapped to the system bus 11: (1) Memory-space instruction-stream Read hexaword; (2) Memory-space data-stream Read hexaword (ownership); and (3) Memory-space data-stream Read hexaword (no lock or ownership). When any of these Memory Read commands occur on the bus 20 and if the Command/Address parity is good, the interface chip 21 places the information in a holding register.

For Read Miss and Fill operations, when a read misses in the CPU 10 CPU, the request goes across the bus 20 to the interface chip 21. When the memory interface returns the data, the CPU 10 cache controller unit 26 puts the fill into the in-queue 61. Since the block size is 32-bytes and the bus 20 is 8-bytes wide, one hexaword read transaction on the %us 20 results from the read request. As fill data returns, the cache controller unit 26 keeps track of how many quadwords have been received with a two-bit counter in the fill CAM 302. If two read misses are outstanding, fills from the two misses may return interleaved, so each entry in the fill CAM 302 has a separate counter. When the last quadword of a read miss arrives, the new tag is written and the valid bit is set in the cache 15. The owned bit is set if the fill was for an Ownership Read.

For Write Miss operations, if the CPU 10 tag store lookup in cache 15 for a write is done and the ownership bit is not set, an ownership read is issued to the interface chip 21. When the first quadword returns through the in-queue 61, the write data is merged with the fill data, ECC is calculated, and the new data is written to the cache RAMs 15. When the fourth quadword returns, the valid bit and the ownership bit are set in the tag store for cache 15, and the write is removed from the write queue.

For CPU Memory Write operations, the following four CPU 10 generated commands are treated as Memory Writes by the interface chip 21 (the only difference, seen by the interface chip 21, is how each specific command is mapped to the system bus 11: (1) Memory-space Write Masked quadword (no disown or unlock); (2) Memory-space Write Disown quadword; (3) Memory-space Write Disown hexaword; and (4) Memory-space Bad Write Data hexaword.

For deallocates due to CPU Reads and Writes, when any CPU 10 tag lookup for a read or a write results in a miss, the cache block is deallocated to allow the fill data to take its place. If the block is not valid, no action is taken for the deallocate. If the block is valid but not owned, the block is invalidated. If the block is valid and owned, the block is sent to the interface chip 21 on the bus 20 and written back to memory 12 and invalidated in the tag store. The Hexaword Disown Write command is used to write the data back. If a writeback is necessary, it is done immediately after the read or write miss occurs. The miss and the deallocate are contiguous events and are not interrupted for any other transaction.

For Read-Lock and Write-Unlock operations, the CPU 10 cache controller unit 26 receives Read Lock/Write Unlock pairs from the memory management unit 25; it never issues those commands on the bus 20, but rather uses Ownership Read-Disown Write instead and depends on use of the ownership bit in memory 12 to accomplish interlocks. A Read lock which does not produce an owned hit in the backup cache 15 results in an ORead on the bus 20, whether the cache 15 is on or off. When the cache is on, the Write Unlock is written into the backup cache 15 and is only written to memory 12 if requested through a coherence transaction. When the cache 15 is off, the Write Unlock becomes a Quadword Disown Write on the bus 20.

Regarding Invalidates, the interface chip 21 monitors all read and write traffic by other nodes 28 to memory 12 in order to maintain cache coherency between the caches 14 and 15 and main memory 12 and to allow other system bus 11 nodes access to memory locations owned by the CPU 10. The interface chip 21 will forward the addresses of these references over the bus 20 to the CPU 10 cache controller unit 26. The cache controller unit 26 will lookup the address in the tag store of cache 15 and determine if the corresponding cache subblock needs to be invalidated or written back. There is no filtering mechanism for invalidates, which means that the bus 20 must be used for every potential invalidate.

The CPU 10 does not confirm cache coherency cycles and instead expects the interface chip 21 to assert Ack for its own invalidate cycles. A cache coherency cycle is a read or write not driven by the CPU 10. When the interface chip 21 detects a memory reference by another node 28 on the system bus 11, it places the address into the responder queue 346. This address is driven onto the bus 20 and implicitly requests the cache controller unit 26 to do a cache lookup.

The invalidate queue 355 is twelve entries deep in the example. The interface chip 21 uses the system bus 11 suppress line to suppress bus 11 transactions in order to keep the responder queue 355 from overflowing. If (for example) ten or more entries in the responder 355 queue are valid, the interface chip 21 asserts the suppress line to system bus 11. Up to two more bus 11 writes or three bus 11 reads can occur once the interface chip 21 asserts the suppress signal. The suppression of system bus 11 commands allows the interface chip 21 and CPU 10 cache controller unit 26 to catch up on invalidate processing and to open up queue entries for future invalidate addresses. When the number of valid entries drops below nine (for example), the interface chip 21 deasserts the suppress line to system bus 11.

A potential problem exists if an invalidate address is received which is in the same cache subblock as an outstanding cacheable memory read. The cache controller unit 26 tag lookup will produce a cache miss since that subblock has not yet been validated. Since the system bus 11 request that generated this invalidate request may have occurred after the command cycle went on the system bus 11, this invalidate must be processed. The CPU 10 cache controller unit 26 maintains an internal state which will force this cache subblock to be invalidated or written back to memory once the cache fill completes. The cache controller unit 26 will process further invalidates normally while waiting for the cache fill to complete.

Previous VAX systems used a non-pended bus and had separate invalidate and return data queues performing the functions of the queues 355 and 356. These prior queues had no exact "order of transmission" qualities, but rather "marked" the invalidates as they came into the appropriate queue such that they were processed before any subsequent read.

The CPU 10, however, uses pended busses 11 and 20, and invalidates travel along the same path as the return data. It is necessary to retain strict order of transmission, so that invalidates and return data words must be sent to the CPU 10 for processing in exactly the same order that they entered the queue 346 from the system bus 11. This goal could be accomplished by simply having one unified queue, large enough to handle either invalidates or return data words, but this would unduly increase the chip size for the interface chip 21. Specifically, in practice, one unified queue means that each slot would have to be large enough to accommodate the return data, since that word is the larger of the two. In fact, the return data word and its associated control bits are more than twice as large as the invalidate address and its control bits. The invalidate portion of the queue will also have to be around twice the size of the return data portion. Thus, around ⅔ of the queue would be only half utilized, or ⅓ of the queue being wasted.

In addition, the system bus 11 protocol mandates that return data must have room when it is finally delivered from the memory 12. If the queue is unified, invalidates might take up space that is needed for the return data. Assuming that one hexaword of return data is expected at any particular time (since the major source of return data will be hexaword ownership reads), four queue slots must be guaranteed to be free.

The bus protocol uses the bus suppression mechanism as previously discussed to inhibit new invalidates while allowing return data to be delivered. Due to the inherent delay in deciding when the suppression signal must be asserted, and a further lag in it's recognition in the arbitration unit 325, there must be three or four extra invalidate slots to accommodate invalidates during this suppression dead zone. If we wish to allow four slots for real invalidates, the invalidate portion of the queue must be seven or eight slots in length. Any fewer slots would mean frequent system bus 11 suppression. This means as many as twelve slots would be needed for the combined data/invalidate queue, each slot large enough to accommodate the data word and its associated control bits. We could have fewer slots and suppress earlier, or more slots and make the queue even larger. Either way, the queue is growing twice as fast as it has to, given our goal. If we wish to allow more than one outstanding read, the queue must be 15 or 16 slots, since a brute force approach is necessary.

According to this feature of the inventive concepts, the invalidate and read data queues are split into separate entities 355 and 356, each being only as large (in depth and length) as necessary for its task. The problem, of course, is how to guarantee strict order of transmission. This is to be done using a hardware linked list between the two queues implemented in this example by the next pointer fields 361 and the head pointer 364. Each slot entry has a "next" pointer 361 that instructs the unload logic where to look for the next data entity (either invalidate or read data).

This same function can be done using a universal pointer for each slot, or by merely having a flag that says "go to the other queue now until switched back". Since the invalidate queue 335 and the read data queue 356 are each completely circular within themselves, strict ordering is preserved within the overall responder queue 346.

The approach of FIGS. 17 and 18 has several advantages over the use of single queue, without greatly increasing the complexity of the design. The advantages all pertain to providing the necessary performance, while reducing the chip size. The specific main advantages are: (1) The same performance obtained with a large, unified queue can be realized with far less space using the split queue method; (2) Each queue can be earmarked for a specific type of data, and there can be no encroaching of one data type into the other. As such, the two types of queues (invalidate and return data) can be tuned to their optimum size. For example, the invalidate queue might be seven (small) slots while the read data queue might be five or six (large) slots. This would provide a smooth read command overlap, while allowing invalidates to be processed without unduly suppressing the system bus 11; (3) The read data queue 356 can be increased to accommodate two outstanding reads without worrying about the size of the invalidate queue, which can remain the same size, based upon its own needs.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments which fall within the true scope of the invention.

TABLE A

CPU Bus Command Encodings and Definitions

| Command Field | Abbrev. | Bus Transaction | Type | Function |
|---|---|---|---|---|
| 0000 | NOP | No Operation | Nop | No Operation |
| 0010 | WRITE | Write | Addr | Write to memory with byte enable if quadword or octaword |
| 0011 | WDISOWN | Write Disown | Addr | Write memory; cache disowns block and returns ownership to memory |
| 0100 | IREAD | Instruction Stream Read | Addr | Instruction-stream read |
| 0101 | DREAD | Data Stream Read | Addr | Data-stream read (without ownership) |
| 0110 | OREAD | D-Stream Read Ownership | Addr | Data-stream read claiming ownership for the cache |
| 1001 | RDE | Read Data Error | Data | Used instead of Read Data Return in the case of an error. |
| 1010 | WDATA | Write Data Cycle | Data | Write data is being transferred |
| 1011 | BADWDATA | Bad Write Data | Data | Write data with errors is being transferred |
| 1100 | RDR0 | Read Data0 Return (fill) | Data | Read data is returning |

TABLE A-continued

CPU Bus Command Encodings and Definitions

| Command Field | Abbrev. | Bus Transaction | Type | Function |
|---|---|---|---|---|
| | | | | corresponding to QW 0 of a hexaword. |
| 1101 | RDR1 | Read Data1 Return (fill) | Data | Read data is returning corresponding to QW 1 of a hexaword. |
| 1110 | RDR2 | Read Data2 Return (fill) | Data | Read data is returning corresponding to QW 2 of a hexaword. |
| 1111 | RDR3 | Read Data3 Return (fill) | Data | Read data is returning corresponding to QW 3 of a hexaword. |

TABLE B

Backup cache behavior during ETM

| Cache Transaction | Cache Response Miss | Valid hit | Owned hit |
|---|---|---|---|
| CPU IREAD,DREAD, Read Modify | Read from memory | Read from memory | Read from cache |
| CPU READ_LOCK | Read from memory | Read from memory | Force block writeback, read from memory |
| CPU Write | Write to memory | Write to memory | Force block writeback, write to memory |
| CPU WRITE_UNLOCK | Write to memory | Write to memory | Write to cache |
| Fill (from read started before ETM) | Normal cache behavior | | |
| Fill (from read started during ETM) | Do not update backup cache; return data to Mbox | | |
| NDAL cache coherency request | Normal cache behavior* | | |

*Except that cache coherency transaction due to ORead or Write always results in an invalidate to PCache, to maintain PCache coherency whether or not BCache hit, because PCache is no longer a subset

TABLE C

Backup cache state changes during ETM

| Cache Transaction | Cache State Modified Miss | Valid hit | Owned hit |
|---|---|---|---|
| CPU IREAD,DREAD, Read Modify | None. | None. | None. |
| CPU READ_LOCK | None. | None. | Clear VALID & OWNED; change TS_ECC accordingly. |
| CPU Write | None. | None. | Clear VALID & OWNED; change TS_ECC accordingly. |
| CPU | None. | None. | Write new data, change DR_ECC accordingly. |
| Fill (from read started before ETM) | Write new TS_TAG, TS_VALID, TS_OWNED, TS_ECC, DR_DATA, DR_ECC | | |
| Fill (from read started during ETM) | None. | | |
| NDAL cache coherency request | Clear VALID & OWNED; change TS_ECC accordingly | | |

What is claimed is:

1. A method of operating a computer system of the type having a CPU and a cache associated with said CPU, and having a memory connected to said CPU by a system bus, comprising the steps of:
   receiving via said system bus return data items from said memory and invalidates for data in said cache;
   separately buffering said return data items and said invalidates in entries in first and second buffers, respectively, said first and second buffers being of different sizes;
   maintaining in each said entry of each one of said first and second buffers an identification of a location in either of said first and second buffers of a next entry in combined order of receipt of said data items and said invalidates;
   sending said entries from said first or second buffers to said CPU in an order defined in response to said identification which is in said combined order of receipt regardless of whether said next entry is in the first buffer or the second buffer.

2. A method according to claim 1 wherein said system is a multiprocessor system including additional CPUs, and including the step of accessing said memory by said additional CPUs to generate said invalidates.

3. A method according to claim 2 including the step of storing said return data entries in first multibit registers in said first buffer, and the step of storing said invalidate entries in second multibit registers in said second buffer, and wherein said first multibit registers are much larger than said second multibit registers.

4. A method according to claim 1 wherein said entries are loaded to said first and second buffers from said system bus in response to a position of separate tail pointers for said first and second buffers.

5. A method according to claim 1 wherein said step of sending includes the step of identifying the entry to be sent next by a head point.

6. A method according to claim 5 wherein said head pointer is changed to point to one of the first and second buffers in response to said identification.

7. A method of operating a computer system, comprising the steps of:
   making read requests by a CPU to a system memory;

storing a subset of said system memory in a cache operated by said CPU;

receiving and buffering return data from said system memory and invalidates for data in said cache, said buffering including:

separately buffering said return data and said invalidates in first and second buffers of different sizes;

maintaining in each entry of said first and second buffers an identification of a location in either of said first and second buffers of a next entry in combined order of receipt;

maintaining a single pointer to the combined next entry of said first and second buffers to be sent to said CPU, said pointer being set in response to said identification and referencing said next entry regardless of whether it is in said first buffer or said second buffer.

8. A method according to claim 7 wherein said system is a multiprocessor system including additional CPUs, and including the step of accessing said memory by said additional CPUs to generate said invalidates.

9. A method according to claim 7 wherein said step of receiving and buffering includes a step of storing said return data in first multibit registers in said first buffer, and includes the step of storing said invalidates in second multibit registers in said second buffer, and wherein said first multibit registers are much larger than said second multibit registers, and said second buffer is larger than said first buffer.

10. A method according to claim 7 wherein said entries are loaded to said first and second buffers from said system bus in response to a position of separate tail pointers for said first and second buffers.

11. A method according to claim 7 wherein said head pointer is changed to point to one of the first and second buffers in response to said identification.

12. A bus interface device for connecting a CPU to a system bus, the CPU including a cache, the bus interface device receiving read data and invalidates from said system bus, comprising:

a first buffer for receiving said invalidates from said system bus for forwarding to said cache, each invalidate being loaded to said first buffer as an entry;

a second buffer for receiving said return data from said system bus for forwarding to said cache, each item of return data being loaded to said second buffer as an entry;

each said entry in said first buffer and said second buffer storing a location of a next combined chronological entry in either said first or second buffers; and a pointer responsive to said stored location to identify a combined next one of said entries of said first or second buffers to be sent to said CPU regardless of whether said next one is in the first buffer or the second buffer.

13. A device according to claim 12 wherein said system is a multiprocessor system including additional CPUs accessing said memory to generate said invalidates.

14. A device according to claim 12 wherein said return data is contained in second multibit registers in said second buffer and said invalidates are contained in first multibit registers in said first buffer, and wherein said second multibit registers are much larger than said first multibit registers.

15. A device according to claim 14 wherein said second buffer is larger than said first buffer.

16. A device according to claim 12 further comprising means for loading entries to said first and second buffers from said system bus in response to a position of separate tail pointers for said first and second buffers.

17. A device according to claim 12 including means for changing said pointer to point to one of the first and second buffers in response to said stored location.

18. An interface device for connecting a processor to a bus, the interface device receiving from said bus first data items having a first data type and receiving from said bus second data items having a second data type, said interface device forwarding said first and second data items to said processor in order of receipt, comprising:

a first buffer for receiving said first data items of said first data type from said bus, each said first data item of first data type being loaded to said first buffer as an entry;

a second buffer for receiving said second data items of said second data type from said bus, each said second data item of second data type being loaded to said second buffer as an entry;

each one of said entries in said first buffer and in said second buffer storing a location of a combined next chronological entry in either said first or second buffers; and a pointer responsive to said stored location to identify a combined next one of said entries of said first or second buffers to be forwarded to said processor regardless of whether said next one is in the first buffer or the second buffer.

19. A device according to claim 18 wherein said first data items of said first data type are cache invalidates.

20. A device according to claim 19 wherein said second data items of second data type are read data returns.

* * * * *